(12) United States Patent
Ishizaka et al.

(10) Patent No.: US 7,707,849 B2
(45) Date of Patent: May 4, 2010

(54) UNIT FOR EJECTOR TYPE REFRIGERATION CYCLE

(75) Inventors: Naohisa Ishizaka, Okazaki (JP); Hirotsugu Takeuchi, Nagoya (JP); Yoshiaki Takano, Kosai (JP); Mika Gocho, Obu (JP); Hiroshi Oshitani, Toyota (JP); Haruyuki Nishijima, Nagoya (JP); Makoto Ikegami, Anjo (JP); Naoki Yokoyama, Anjo (JP); Etsuhisa Yamada, Kariya (JP)

(73) Assignee: Denso Corporation, Kariya (JP)

( * ) Notice: Subject to any disclaimer, the term of this patent is extended or adjusted under 35 U.S.C. 154(b) by 434 days.

(21) Appl. No.: 11/659,620

(22) PCT Filed: Apr. 4, 2006

(86) PCT No.: PCT/JP2006/307092

§ 371 (c)(1),
(2), (4) Date: Feb. 7, 2007

(87) PCT Pub. No.: WO2006/109617

PCT Pub. Date: Oct. 19, 2006

(65) Prior Publication Data

US 2008/0264097 A1    Oct. 30, 2008

(30) Foreign Application Priority Data

Apr. 5, 2005   (JP) ............................. 2005-108800
Jul. 28, 2005  (JP) ............................. 2005-219340
Mar. 9, 2006   (JP) ............................. 2006-064370

(51) Int. Cl.
*F25B 1/06*    (2006.01)
*F25B 19/02*   (2006.01)
*F25B 49/00*   (2006.01)
*F25B 5/00*    (2006.01)
*F04B 23/04*   (2006.01)

(52) U.S. Cl. ............................. 62/500; 62/170; 62/198; 62/199; 62/200; 417/77

(58) Field of Classification Search ........... 62/198–200, 62/500, 170; 417/77
See application file for complete search history.

(56) References Cited

U.S. PATENT DOCUMENTS 4,430,868 A  *  2/1984  Kern et al. ..................... 62/515

(Continued)

FOREIGN PATENT DOCUMENTS

DE    103 21 196 A1   11/2003

(Continued)

OTHER PUBLICATIONS

Machine translation of JP 06-137695 to Takeuchi, Refrigerating Cycle, May 20, 1994, PAJ, detailed description.*

(Continued)

*Primary Examiner*—Wiliam E. Tapolcai
*Assistant Examiner*—Filip Zec
(74) *Attorney, Agent, or Firm*—Harness, Dickey & Pierce, PLC

(57) ABSTRACT

A first evaporator connected to an outlet side of an ejector, a second evaporator connected to a refrigerant suction port of the ejector, a throttle mechanism arranged on an inlet side of a refrigerant flow of the second evaporator and for reducing the pressure of the refrigerant flow are provided. Furthermore, the ejector, the first evaporator, the second evaporator and the throttle mechanism are assembled integrally with each other to construct an integrated unit having one refrigerant inlet and one refrigerant outlet. Hence, mounting performance of an ejector type refrigeration cycle can be improved.

42 Claims, 31 Drawing Sheets

U.S. PATENT DOCUMENTS

| | | | | |
|---|---|---|---|---|
| 4,748,826 | A * | 6/1988 | Laumen | 65/268 |
| 5,493,875 | A * | 2/1996 | Kozinski | 62/503 |
| 6,477,857 | B2 | 11/2002 | Takeuchi et al. | |
| 6,574,987 | B2 | 6/2003 | Takeuchi et al. | |
| 6,729,149 | B2 * | 5/2004 | Takeuchi | 62/191 |
| 6,799,435 | B2 * | 10/2004 | Saito et al. | 62/500 |
| 6,866,092 | B1 * | 3/2005 | Molivadas | 165/104.21 |
| 7,040,117 | B2 | 5/2006 | Nishida et al. | |
| 2003/0209030 | A1 | 11/2003 | Nishida et al. | |
| 2005/0083654 | A1 * | 4/2005 | Tsoi | 361/699 |
| 2005/0178150 | A1 | 8/2005 | Oshitani et al. | |
| 2005/0268644 | A1 | 12/2005 | Oshitani et al. | |

FOREIGN PATENT DOCUMENTS

| | | | |
|---|---|---|---|
| JP | 06137695 A * | 5/1994 | |
| JP | 7-329549 A | 12/1995 | |
| JP | 2002-022295 | 1/2002 | |
| JP | 3265649 B2 | 1/2002 | |
| JP | 3322263 B1 | 9/2002 | |
| JP | 2003-262413 | 9/2003 | |
| JP | 2003-329336 A | 11/2003 | |
| JP | 2005-308380 A | 11/2005 | |
| JP | 2005-308384 A | 11/2005 | |
| KR | 1999-0027371 | 7/1999 | |
| KR | 2004-0045044 | 6/2002 | |

OTHER PUBLICATIONS

Machine translation of JP 2003-329336 to Nishida, Gas-Liquid separator for steam-compression type refrigerating cycle and ejector cycle, Nov. 19, 2003, PAJ, detailed description.*

Machine translation of JP 07-329549 to Okazaki, Air-conditioner for a vehicle, Dec. 19, 1995, PAJ, detailed description.*

Notice of Preliminary Rejection dated Mar. 14, 2008 in Korean Application No. 10 2007-7005177 with English translation thereof.

Office Action dated May 9, 2008 in Chinese Application No. 2006 8000 0758.9 with English translation thereof.

Office Action dated Oct. 21, 2008 in Japanese Application No. 2006-064370.

Office Action dated Oct. 31, 2008 in Chinese Application No. 2006 8000 0758.9.

Third Office Action issued on Feb. 27, 2009 in the corresponding Chinese patent application No. 2006 8000 0758.9.

Office Action dated Jun. 2, 2009 in the corresponding Japanese patent application No. 2008-322082 with English translation.

* cited by examiner

UNIT FOR EJECTOR TYPE REFRIGERATION CYCLE

CROSS REFERENCE TO RELATED APPLICATIONS

This application is a U.S. National Stage Application of International application No. PCT/JP2006/30702, filed Apr. 4, 2006. This application claims the benefit of Japanese Application Nos. 2005-108800, filed Apr. 5, 2005, 2005-219340, filed Jul. 28, 2005 and 2006-064370, filed Mar. 9, 2006. The disclosure(s) of the above applications are incorporated herein by reference.

TECHNICAL FIELD

The present invention relates to a unit for an ejector type refrigeration cycle having an ejector using as means for reducing the pressure of refrigerant and means for circulating refrigerant.

BACKGROUND ART

Conventionally, there is known an ejector type refrigeration cycle having an ejector that is used as means for reducing the pressure of refrigerant and means for circulating refrigerant. This ejector type refrigeration cycle can be effectively used for, for example, an air conditioner for a vehicle or a refrigeration device that is mounted in a vehicle and is used for freezing or cooling a space in the vehicle. Moreover, this ejector type refrigeration cycle can be effectively used for a stationary refrigeration system, for example, an air conditioner, a refrigerator and a freezer.

The ejector type refrigeration cycle of this kind is known in patent document 1 and the like. In this patent document 1 is disclosed an ejector type refrigeration cycle in which: a first evaporator is arranged on the outlet side of an ejector using as means for reducing the pressure of refrigerant and means for circulating refrigerant; a vapor/liquid separator is arranged on the outlet side of this first evaporator; and a second evaporator is arranged between the liquid refrigerant outlet side of this vapor/liquid separator and the refrigerant suction port of the ejector.

According to the ejector type refrigeration cycle of patent document 1, by the use of a pressure drop caused by a high-speed flow of refrigerant that is developed at the time of expansion, vapor-phase refrigerant discharged from the second evaporator is drawn and the velocity energy of refrigerant at the time of expansion is converted to pressure energy in the diffuser part (pressure increasing part) of the ejector to increase the pressure of refrigerant, thereby the driving force of a compressor can be reduced. For this reason, the operating efficiency of the cycle can be enhanced.

Moreover, it is possible to perform the action of absorbing heat from (cooling) separate spaces by using the first and second evaporators or the same space by using the first and second evaporators.

[Patent Document 1] Japanese Patent No. 3322263

PROBLEMS TO BE SOLVED BY THE INVENTION

The patent document 1 does not disclose how to assemble respective constituent parts specifically at the time of embodying the ejector type refrigeration cycle.

In view of the above-mentioned point, one object of the present invention is to improve the mounting performance of an ejector type refrigeration cycle.

Moreover, another object of the present invention is to enhance a cooling performance in an ejector type refrigeration cycle.

MEANS FOR SOLVING THE PROBLEMS

According to an example of the present invention, a unit for an ejector type refrigeration cycle includes: an ejector (14) that sucks refrigerant from a refrigerant suction port (14b) by a refrigerant flow ejected from a nozzle part (14a) and having a high velocity, mixes refrigerant from the nozzle part (14a) and the refrigerant drawn from the refrigerant suction port (14b), and discharges the mixed refrigerant; and an evaporator (15, 18) that evaporates the refrigerant to be drawn by the ejector (14) or the refrigerant discharged from the ejector (14). Furthermore, the evaporator (15, 18) is assembled integrally with the ejector (14) to construct an integrated unit (20).

According to this, the whole of the integrated unit (20) including the ejector (14) and at least one evaporator (15, 18) can be handled as an integrated body. For this reason, a mounting work when the ejector type refrigeration cycle is mounted in an object to be mounted, such as a vehicle, can be performed very efficiently.

Moreover, since the integrated unit (20) is constructed to shorten the lengths of the passages for connecting the respective parts, it is also possible to reduce cost and to reduce an installation space.

Here, "an integral assemble" of the ejector (14) and at least one evaporator (15, 18) means that both of these parts are assembled (combined) mechanically as "an integrated structure". This "integral assemble" can be changed in various manners as will be described later.

For example, the evaporator of the integrated unit (20) is an evaporator (18) connected to the refrigerant suction port (14b) of the ejector and for evaporating refrigerant drawn into the refrigerant suction port.

In this case, since the integrated unit (20) is constructed to be able to shorten the length of a passage between the outlet side of the evaporator (18) and the refrigerant suction port (14b), a pressure loss at the outlet side of the evaporator (18) can be reduced. With this, the evaporation pressure of the evaporator (18) can be reduced and the cooling performance of the evaporator (18) can be enhanced.

Further, a throttle mechanism (17, 17a, 17b) may be arranged on the inlet side of a refrigerant flow of the evaporator (18) connected to the refrigerant suction port (14b) so as to reduce the pressure of the refrigerant flow, and the throttle mechanism may be combined (assembled) in the integrated unit (20).

According to this, the integrated unit (20) including throttle mechanism (17, 17a, 17b) can be constructed.

Still further, the unit may be provided with a first evaporator (15), which is connected to the outlet side of the ejector (14) and evaporates refrigerant discharged from the ejector, and a second evaporator (18) connected to the refrigerant suction port (14b). In this case, the first evaporator (15) is assembled in the integrated unit (20).

According to this, cooling performance can be exerted by a combination of two evaporators (15), (18) on the discharge side of the ejector and on the suction side of the ejector. The integrated unit (20) including the first evaporator (15) and the second evaporator (18) can be constructed to be able to produce the effect of improving workability in mounting.

Since the number of parts to be integrated is increased, the effect of improving workability in mounting, the effect of reducing an installation space, and the effect of reducing cost can be produced more effectively.

The integrated unit (20) can be so constructed as to have one refrigerant inlet (25) and one refrigerant outlet (26).

According to this, the whole integrated unit (20) can be connected to the other refrigerant circuit parts only by one refrigerant inlet (25) and one refrigerant outlet (26). This can be very useful for enhancing the efficiency of a mounting work.

Alternatively, the integrated unit (20) is provided with one refrigerant inlet (25) and one refrigerant outlet (26), and the refrigerant inlet (25) can be branched into a first passage (25a) connected to the inlet side of the ejector (14) and a second passage (26) connected to the inlet side of the throttle mechanism (17, 17a, 17b).

According to this, refrigerant branched on the inlet side of the ejector (14) can be supplied to the second passage (16). For this reason, refrigerant can be supplied to the second evaporator (18) not only by the refrigerant drawing capacity of the ejector (14) but also by the capacity of the compressor. As a result, even at the time of low load in which an input to the ejector (14) becomes small, the flow rate of refrigerant of the second evaporator (18) and the cooling performance of the second evaporator (18) can be secured easily. Moreover, at the same time, the flow rate of refrigerant of the second evaporator (18) can be adjusted independently by the throttle mechanism (17, 17a, 17b).

Moreover, the refrigerant inlet (25) and the refrigerant outlet (26) are formed in one connection block (23).

According to this, it is possible to perform the joint function of the outlet and inlet of refrigerant using the one connection block (23).

Moreover, the first evaporator (15) can be arranged on the upstream side of an airflow and the second evaporator (18) can be arranged on the downstream side of the air flow.

According to this, a temperature difference between a refrigerant temperature and an air temperature can be secured sufficiently by both of the first and second evaporators (15, 18) and the cooling performances of the first and second evaporators (15, 18) can be effectively improved.

Moreover, when the ejector (14) is arranged in a tank (18b) for distributing refrigerant to or for collecting refrigerant from a plurality of refrigerant passages of the evaporators (15, 18), a further reduction in an installation space can be realized.

In addition, the connecting of the ejector (14) to the refrigerant passages of the evaporators (15, 18) can be also performed simply without a connection pipe. Further, since low-pressure low-temperature refrigerant flows in the tank (18b) of the evaporators (15, 18), the incidental effect of eliminating the need for performing a heat insulation to the outer surface of the ejector (14) can be produced.

An exclusive tank (34) for mounting the ejector (14) may be formed in the evaporators (15, 18) and the ejector (14) may be arranged in the exclusive tank (34).

Alternatively, an external cassette part (36) may be mounted on the outside portion of the evaporators (15, 18), and the ejector (14) may be arranged in the external cassette part (36).

According to this, the modification of arranging the ejector (14) in the evaporator tank (18b) does not need to be made to the evaporator. For this reason, the integrated unit (20) of the present invention can be constructed by the use of an already-existing evaporator structure.

When the throttle mechanism (17a) is arranged in the tank (18b) for distributing refrigerant to or for collecting refrigerant from a plurality of refrigerant passages of the evaporators (15, 18), a further reduction in an installation space can be realized.

The evaporator (18) connected to the refrigerant suction port (14b) may be provided with a plurality of tanks (18b, 18c) for distributing refrigerant to or for collecting refrigerant from a plurality of refrigerant passages. In this case, when the ejector (14) and the throttle mechanism (17a) are arranged in the same tank (18b) of the plurality of tanks (18b, 18c), a reduction in an installation space can be realized more effectively.

Alternatively, when the evaporator (18) connected to the refrigerant suction port (14b) is provided with a tank (18b, 18c) for distributing refrigerant to or for collecting refrigerant from a plurality of refrigerant passages, the throttle mechanism (17a) may be arranged outside the tank (18b, 18c).

For example, the throttle mechanism may be a capillary tube (17a). Alternatively, the throttle mechanism may be a fixed throttle hole (17b).

The evaporator (18) connected to the refrigerant suction port (14b) may be provided with a tank (18b, 18c) for distributing refrigerant to or for collecting refrigerant from a plurality of refrigerant passages. In this case, the ejector (14) can be arranged in an inside space (27) constructing an outlet portion of a refrigerant passage of the evaporator (18), in an inside space of the tank (18b, 18c).

According to this, the inside space (27) in the tank constructing the outlet portion of a refrigerant passage of the evaporator (18) can be connected directly to the refrigerant suction port (14b) of the ejector without a connection pipe. Therefore, the assembling operation of an integrated unit (20) can be simplified.

Moreover, because it is possible to avoid a pressure loss of a refrigerant flow from being caused by a connection pipe, the evaporation pressure of the evaporator (18) can be reduced by as much amount as this reduction in a pressure loss and hence the cooling performance of the evaporator (18) can be enhanced.

In a unit for an ejector type refrigeration cycle, the first evaporator (15) and the second evaporator (18) have tanks (15b, 15c, 18b, 18c), respectively, for distributing refrigerant to or for collecting refrigerant from a plurality of refrigerant passages, the ejector (14) is arranged in an inside space (27) constructing an outlet portion of a refrigerant passage of the second evaporator (18) in an inside space of the tank (18b, 18c) of the second evaporator (18), a connection bock (24) for fixing a refrigerant outlet side portion of the ejector (14) is arranged in an inside space of the tank (18b, 18c) of the second evaporator (18), the connection block (24) has a connection hole (24c) communicating with a refrigerant outlet passage of the ejector (14) formed therein, and the communication hole (24c) communicates with an inside space (32) constructing an inlet portion of a refrigerant passage of the first evaporator (15) in an inside space of the tank (15b, 15c) of the first evaporator (15).

According to this, it is possible for a connection block (24) for fixing a refrigerant outlet portion of the ejector (14), to have a communication function for communicating a refrigerant outlet side passage of the ejector (14) with the tank inside apace (32) constructing the inlet portion of a refrigerant passage of the first evaporator (15).

Alternatively, in the unit for an ejector type refrigeration cycle, the first evaporator (15) and the second evaporator (18) have tanks (15b, 15c, 18b, 18c), respectively, for distributing refrigerant to or for collecting refrigerant from a plurality of refrigerant passages, the ejector (14) is arranged in an inside space (27) constructing an outlet portion of a refrigerant passage of the second evaporator (18) in an inside space of the tank (18b, 18c) of the second evaporator (18), a communication space (52d) separated from a refrigerant passage of the second evaporator (18) is partitioned off at an end portion opposite to the inside space (27) where the ejector (14) is arranged of the tank (18b, 18c) of the second evaporator (18), and a refrigerant outlet side passage of the ejector (14) communicates with an inside space (32) constructing an inlet portion of a refrigerant passage of the first evaporator (15) in an inside space of the tank (15b, 15c) of the first evaporator (15) via the communication space (52d).

Accordingly, by using the communication space (52d) partitioned from the refrigerant passage of the second evaporator (18), the refrigerant outlet side passage of the ejector (14) and the inlet portion of the refrigerant passage of the first evaporator (15) can communicate with each other.

According to a second example of the present invention, a unit for an ejector type refrigeration cycle includes: an ejector (14) that sucks refrigerant from a refrigerant suction port (14b) by a refrigerant flow ejected from a nozzle part (14a) and having a high velocity, and mixes refrigerant from the nozzle part (14a) and the refrigerant drawn from the refrigerant suction port (14b), and discharges the mixed refrigerant; and a first evaporator (15) that is connected to an outlet side of the ejector and evaporates the refrigerant discharged from the ejector; a second evaporator (18) that is connected to the refrigerant suction port (14b) of the ejector (14) and evaporates the refrigerant to be drawn by the ejector (14); and a capillary tube (17a) located at an inlet side of the second evaporator (18) in a refrigerant flow, and decompresses the refrigerant flow. In this unit, the first evaporator (15), the second evaporator (18), the ejector (14) and the capillary tube (17a) can be assembled integrally with each other to construct an integrated unit (20).

According to this, cooling performance can be performed by a combination of two evaporators (15, 18) on the ejector outlet side and on the ejector suction side, and the integrated unit (20) including these two evaporators (15, 18), the ejector (14) and the capillary tube (17a) forming a throttle mechanism for the second evaporator can be constructed. Therefore, the effect of enhancing workability in a mounting operation can be obtained further effectively.

The first evaporator (15) and the second evaporator (18) may have tanks (15b, 15c, 18b, 18c), respectively, for distributing refrigerant to or for collecting refrigerant from a plurality of refrigerant passages. In this case, the tank (15b, 15c) of the first evaporator (15) and the tank (18b, 18c) of the second evaporator (18) are arranged adjacent to each other in an air flow direction to form a valley portion (51) between the tank (15b, 15c) of the first evaporator (15) and the tank (18b, 18c) of the second evaporator (18). Furthermore, the capillary tube (17a) can be disposed in the valley portion (51) and can be fixed to an outer surface of the tanks (15b, 15c, 18b, 18c).

According to this, because the small pipe shape of the capillary tube (17a) can be housed in a depressed dead space formed in the valley portion (51), the integrated unit (20) can be reduced in size effectively even in a construction in which the capillary tube (17a) is arranged outside a tank.

In the unit for an ejector type refrigeration cycle, the ejector (14) may be provided with a mixing part (14c) for mixing refrigerant jetted from the nozzle part (14a) and having a high velocity with refrigerant drawn into the refrigerant suction port (14b), and a pressure increasing part (14d) for converting velocity energy of the refrigerant mixed in the mixing part (14c) to pressure energy.

Furthermore, a heat exchange core part (15a, 18a) of the evaporator (15, 18) may be constructed of a lamination structure of flat tubes (21) and corrugated fins (22).

Alternatively, the heat exchange core part (15a, 18a) of the evaporator (15, 18) may be constructed of a heat exchange structure of a plate fin type in which tubes (221) are inserted into and bonded to hole portions (221) of a plate-shaped plate fin (200).

Alternatively, the heat exchange core part (15a, 18a) of the evaporator (15, 18) may be constructed of a heat exchange structure of a serpentine type having a tube (230) bent in a serpentine shape.

Incidentally, reference signs in the parentheses of the above-mentioned respective means and the respective means as claimed in claims show relationships corresponding to specific means described in the embodiments to be described.

BEST MODE FOR CARRYING OUT THE INVENTION

First Embodiment

Hereinafter, a unit for an ejector type refrigeration cycle according to the present invention and an ejector type refrigeration cycle using the same will be described. The unit for an ejector type refrigeration cycle is referred to as an evaporator unit for an ejector type refrigeration cycle or an evaporator unit mounted with an ejector.

The unit for an ejector type refrigeration cycle is connected to a condenser and a compressor, which are other constituent parts of a refrigeration cycle, via piping so as to construct a refrigeration cycle having an ejector.

The unit for an ejector type refrigeration cycle is used for cooling air as an indoor unit in one embodiment. Moreover, the unit for an ejector type refrigeration cycle can be used as an outdoor unit in another embodiment.

FIGS. 1 to 4 show a first embodiment of the present invention. FIG. 1 shows an example of applying an ejector type refrigeration cycle 10 according to the first embodiment to a refrigeration cycle for a vehicle. In the ejector type refrigeration cycle 10 according to the first embodiment, a compressor 11 for drawing and compressing refrigerant is rotated and driven by an engine for running a vehicle (not shown) via an electromagnetic clutch 11a, a belt, and the like.

Either a variable displacement type compressor capable of adjusting a refrigerant discharge capacity by changing a discharge capacity or a fixed displacement type compressor that changes the rate of operation of a compressor by the intermittent operation of the electromagnetic clutch 11a to adjust a refrigerant discharge capacity may be used as this compressor 11. Moreover, if an electrically operated compressor is used as the compressor 11, a refrigerant discharge capacity can be adjusted by adjusting the number of revolutions of an electric motor.

A radiator 12 is arranged on the refrigerant discharge side of this compressor 11. The radiator 12 exchanges heat between high-pressure refrigerant discharged from the compressor 11 and outside air (i.e., air outside a vehicle compartment) blown by a cooling fan (not shown) so as to cool the high-pressure refrigerant.

Here, in this embodiment, refrigerant whose high pressure is not higher than a critical pressure such as fron-based refrigerant and HC-based refrigerant is used as the refrigerant of the ejector type refrigeration cycle 10 so as to construct a vapor compression type subcritical pressure cycle. For this reason, in this embodiment, the radiator 12 acts as a condenser for condensing refrigerant.

A liquid receiver 12a is arranged on the outlet side of the radiator 12. This liquid receiver 12a is shaped like a longitudinally elongated tank, as well known, and constructs a liquid/vapor separator that separates refrigerant into vapor and liquid to store extra liquid refrigerant in the cycle. At the outlet of the liquid receiver 12a, liquid refrigerant is derived from the bottom side of the inside of the tank shape. Here, the liquid receiver 12a is integrated with the radiator 12 in this example.

Moreover, the radiator 12 may adopt a well-known construction including: a heat exchanger part for condensing, located on the upstream side of a refrigerant flow; the liquid receiver 12a that introduces refrigerant from this heat exchanger part for condensing and separates the refrigerant into vapor and liquid; and a heat exchange part that supercools saturated liquid refrigerant from this liquid receiver 12a.

A temperature type expansion valve 13 is arranged on the exist side of the liquid receiver 12a. This temperature type expansion valve 13 is pressure reducing means for reducing the pressure of the liquid refrigerant from the liquid receiver 12a and has a temperature sensing part 13a arranged in the suction side passage of the compressor 11.

The temperature type expansion valve 13, as well known, detects the degree of superheat of refrigerant on the suction side of the compressor 11 on the basis the temperature and pressure of the refrigerant on the suction side of the compressor 11 (refrigerant on the outlet side of an evaporator to be described later), and adjusts the degree of opening of a valve (refrigerant flow rate) in such a way that the degree of superheat of the refrigerant on the suction side of the compressor 11 becomes a previously set value.

An ejector 14 is arranged on the outlet side of the temperature type expansion valve 13. This ejector 14 is pressure reducing means for reducing the pressure of refrigerant and is also refrigerant circulating means (e.g., momentum transfer type pump) for circulating refrigerant (transporting fluid) by the action of drawing (action of entraining) a refrigerant flow ejected at high speeds.

The ejector 14 is provided with: a nozzle part 14a that has a narrowed passage area and throttles refrigerant (middle-pressure refrigerant) after passing the expansion valve 13 so as to reduce the pressure of the refrigerant and expand the refrigerant; and a refrigerant suction port 14b that is arranged in the same space as the refrigerant jet port of the nozzle part 14a and draws vapor-phase refrigerant flowing from a second evaporator 18 to be described later.

Further, a mixing part 14c for mixing a high-speed refrigerant flow from the nozzle part 14a with the refrigerant drawn by the refrigerant suction port 14b is provided on the downstream portion of the refrigerant flow of the nozzle part 14a and the refrigerant suction port 14b. A diffuser part 14d forming a pressure increasing part is arranged on the downstream side of the refrigerant flow of the mixing part 14c. This diffuser part 14d is formed in the shape of increasing the area of the passage of refrigerant gradually, and reduces the velocity of a refrigerant flow to increase the pressure of refrigerant. In other words, the diffuser part 14d converts the velocity energy of refrigerant to pressure energy so as to increase the pressure of refrigerant.

A first evaporator 15 is connected to the outlet side of the diffuser part 14d of the ejector 14 and the outlet side of this first evaporator 15 is connected to the suction side of the compressor 11.

In contrast, a refrigerant branch passage 16 is branched from the inlet side of the ejector 14 (i.e., a portion between the outlet side of the temperature type expansion valve 13 and the inlet side of the ejector 14), and the downstream side of this refrigerant branch passage 16 is connected to the refrigerant suction port 14b of the ejector 14. A reference sign Z denotes a branch point of the refrigerant branch passage 16.

A throttle mechanism 17 is arranged in this refrigerant branch passage 16, and the second evaporator 18 is arranged at a position downstream from this throttle mechanism 17 in the refrigerant flow of this refrigerant branch passage 16. The throttle mechanism 17 is pressure reducing means having a function for adjusting a refrigerant flow rate to the second evaporator 18 and, for example, can be constructed of a fixed throttle such as a capillary tube or an orifice.

In this embodiment, two evaporators 15, 18 are combined with each other into an integrated unit structure by the construction to be described later. These two evaporators 15, 18 are housed in a case (not shown) and air (i.e., air to be cooled) is blown into an air passage formed in this case by a common electrically operated blower 19 as shown by an arrow A, whereby this blown air is cooled by these two evaporators 15, 18.

The cold air having been cooled by the two evaporators 15, 18 are sent into a common space to be cooled (not shown) so as to cool the common space to be cooled by the two evaporators 15, 18. Here, among these two evaporators 15, 18, the first evaporator 15 connected to the main passage on the downstream side of the ejector 14 is arranged on the upstream side of an air flow A (on the windward side) and the second evaporator 18 connected to the refrigerant suction port 14b of the ejector 14 is arranged on the downstream side of the air flow A (on the leeward side).

For example, when the ejector type refrigeration cycle 10 of this embodiment is used for a refrigeration cycle device for air-conditioning a vehicle, a space in a vehicle compartment becomes a space to be cooled. Moreover, when the ejector type refrigeration cycle 10 of this embodiment is used for a refrigeration cycle device for a refrigeration vehicle, a space in a freezing and refrigerating chamber of the refrigeration vehicle becomes a space to be cooled.

In this embodiment, as an example, the ejector 14, the first and second evaporators 15, 18 and the throttle mechanism 17 are assembled (combined) with each other so as to form an integrated unit 20. Next, an example of this integrated unit 20 will be described with reference to FIG. 2 to FIG. 4. FIG. 2 is a schematic perspective view to show a general construction of the integrated unit 20, FIG. 3 is a longitudinal sectional view (in the direction of length) of the upper tank parts of the first and second evaporators 15, 18, and FIG. 4 is a lateral sectional view of the upper tank part of the second evaporator 18.

First, an example of an integrated structure of the two evaporators 15, 18 will be described with reference to FIG. 2. In the example shown in FIG. 2, the two evaporators 15, 18 are completely integrated into one evaporator structure. On this account, the first evaporator 15 constructs an upstream side part of the air flow A of the one evaporator structure, and the second evaporator 18 constructs a downstream side part of the air flow A of the one evaporator structure.

The first evaporator 15 and the second evaporator 18 are identical to each other in a basic heat-exchanging construction, and have heat exchange core parts 15a, 18a and tank parts 15b, 15c, 18b, 18c located on both top and bottom sides of these heat exchange core parts 15a, 18a, respectively.

Here, the heat exchange core parts 15a, 18a have a plurality of tubes 21 extending in the up and down direction, respectively. Passages, through which medium to be heat-exchanged or air to be cooled in this embodiment passes, are formed between the plurality of tubes 21. Fins 22 are arranged between these plurality of tubes 21, and the tubes 21 can be bonded to the fins 22.

The heat exchange parts 15a, 18a are formed of a lamination structure of the tubes 21 and the fins 22. These tubes 21 and the fins 22 are arranged alternately in layers in the left and right direction of the heat exchange core parts 15a, 18a in FIG. 2. In the other embodiment may be adopted a construction not having the fin 22.

Here, although only a part of the lamination structure of the tubes 21 and fins 22 is shown in FIG. 2, the lamination structure of the tubes 21 and the fins 22 are constructed in the whole area of the heat exchange core parts 15a, 18a and air blown by the electrically operated blower 19 is passed through the hollow space of this lamination structure.

The tube 21 constructs a refrigerant passage and is made of a flat tube whose sectional shape is flat along the direction A of the air flow. The fin 22 is a corrugated fin formed by bending a thin plate material in a wavy shape and is bonded to the flat outer surfaces of the tubes 21 to expand the area of air-side heat transfer surface.

The tubes 21 of the heat exchange core parts 15a and the tubes 21 of the heat exchange core part 18a construct refrigerant passages separate from each other. The tank parts 15b, 15c on both top and bottom sides of the first evaporator 15 and the tank parts 18b, 18c on both top and bottom sides of the second evaporator 18 construct refrigerant passage spaces separate from each other.

The tank parts 15b, 15c located on both top and bottom sides of the first evaporator 15 have tube fitting hole part (not shown), and both top and bottom end portions of the tubes 21 of the heat exchange core part 15a are inserted into and are bonded to the tube fitting hole part, such that the both top and bottom end portions of the tubes 21 communicate with the inner space of the tank parts 15b, 15c.

Similarly, the tank parts 18b, 18c located on both top and bottom sides of the second evaporator 18 have tube fitting hole part (not shown), and both top and bottom end portions of the tubes 21 of the heat exchange core part 18a are inserted into and are bonded to the tube fitting hole part, such that the both top and bottom end portions of the tubes 21 communicate with the inner space of the tank parts 18b, 18c.

With this, the tank parts 15b, 15c, 18b, 18c located on both top and bottom sides play a role of distributing a refrigerant flow to the plurality of tubes 21 of their corresponding heat exchange core parts 15a, 18a and a role of collecting a refrigerant flow from the plurality of tubes 21.

Two top tanks 15b, 18b and two bottom tanks 15c, 18c are adjacent to each other, so that the two top tanks 15b, 18b can be formed integrally and the two bottom tanks 15c, 18c can be formed integrally. Of course, the two top tanks 15b, 18b may be formed as separate parts and the two bottom tanks 15c, 18c may be formed as separate parts.

Aluminum of metal excellent in heat conduction and brazing ability can be used as the specific material of the constituent parts of the evaporator, such as the tubes 21, the fins 22 and the tank parts 15b, 15c, 18b, 18c. When the respective parts are formed of this aluminum material, the entire construction of the first and second evaporators 15, 18 can be combined and integrated by brazing.

In this embodiment, first and second connection blocks 23, 24 of the refrigerant passage shown in FIG. 3 and a capillary tube 17a constructing the throttle mechanism 17 are also assembled integrally with the first and second evaporators 15, 18 by brazing.

In contrast, the elector 14 has a fine passage of high accuracy formed in the nozzle part 14a. Accordingly, if the ejector 14 is brazed to the evaporator structure by brazing, the nozzle part 14a is thermally deformed by high temperature at the time of brazing (brazing temperature of aluminum: nearly 600° C.) to cause a problem that the shape and size of the passage of the nozzle part 14a can not be kept as specified in design.

Thus, the ejector 14 is combined and integrated with the evaporator structure after the evaporators 15, 18, the first and second connection blocks 23, 24, and the capillary tube 17a are brazed integrally to each other.

Next, the combining and brazing structure of the ejector 14 will be now described. The capillary tube 17a and the first and second connection blocks 23, 24 can be formed of the aluminum material like the constituent parts of the evaporator structure. The first connection block 23, as shown in FIG. 3, is a part brazed and fixed to the side surface in the direction of the length of one of the top tanks 15b, 18b of the first and second evaporators 15, 18 and constructs one refrigerant inlet 25 and one refrigerant outlet 26 of the integrated unit 20 shown in FIG. 1.

The refrigerant inlet 25 is branched into a main passage 25a forming a first passage toward the inlet side of the ejector 14 and a branch passage 16 forming a second passage toward the inlet side of the capillary tube 17a in the middle in the direction of the thickness of the first connection block 23. This branch passage 16 corresponds to the inlet portion of the branch passage 16 shown in FIG. 1. Hence, a branch point Z in FIG. 1 is constructed within the first connection block 23.

In contrast to this, the refrigerant outlet 26 is constructed of a simple passage hole (circular hole or the like) passing in the direction of the thickness of the first connection block 23.

The branch passage 16 of the first connection block 23 is bonded air-tightly to the one end (i.e., left end in FIG. 2 and FIG. 3) of the capillary tube 17a by brazing.

The second connection block 24 is a part arranged nearly in the center in the direction of the length of the inner space in the top tank 18b of the second evaporator 18 and brazed to the inner wall surface of the top tank 18b. This second connection block 24 plays a role of partitioning the inner space of the top tank 18b into two spaces, that is, a left space 27 and a right space 28 in the direction of the length of the tank.

The other end side (right end side) of the capillary tube 17a, as shown in FIG. 3, passes through the support hole 24a of the second connection block 24 and opens to the right space 28 of the top tank 18b. The gap between the outer peripheral surface of the capillary tube 17a and the support hole 24a is hermetically sealed by brazing and hence both of the above-mentioned left and right spaces 27, 28 are held to be separated.

Within the ejector 14, the nozzle part 14a is formed of material such as stainless steel or brass, and parts other than the nozzle part 14a (i.e., housing part forming the refrigerant suction port 14b, the mixing part 14c, and the diffuser part 14d) are constructed of metallic material such as copper or aluminum but may be formed of resin (non-metallic material). The ejector 14 is inserted into the top tank 18b, through the refrigerant inlet 25 of the first connection block 23 and the hole shape of the main passage 25a, after the combining process (brazing process) of brazing the first and second evaporators 15, 18 and the like integrally.

Here, the tip portion in the direction of the length of the ejector 14 is a portion corresponding to the outlet portion of the diffuser part 14d in FIG. 1 and this ejector tip portion is inserted into the circular depressed portion 24b of the second connection block 24 and is fixed in a sealed manner by the use of an O-ring 29a. The ejector tip portion communicates with the communication hole portion 24c of the second connection block 24.

A partition plate 30 is arranged nearly in the center in the direction of the length of the inner space of the top tank 15b of the first evaporator 15 and the inner space in the top tank 15b is partitioned by this partition plate 30 into two spaces in the direction of the length, that is, a left space 31 and a right space 32.

The communication hole portion 24c of the second connection block 24 communicates with the right space 32 of the top tank 15b of the first evaporator 15 through the through hole 33a of an intermediate wall surface 33 of both top and bottom tanks 15, 18b. The left end portion (left end portion in FIG. 3) in the direction of the length of the ejector 14 is a portion corresponding to the inlet portion of the nozzle part 14a in FIG. 1 and is fitted in the inner wall surface of the main passage 25a of the first connection block 23 and is fixed in a sealed manner by the use of an O-ring 29b.

Here, the ejector 14 is fixed in the direction of the length, for example, by the use of fixing means by screwing (not shown). The O-ring 29a is held by the groove portion (not shown) of the second connection block 24 and the O-ring 29b is held by the groove portion (not shown) of the first connection block 23.

The first connection block 23 is brazed to the side surface walls of the top tanks 15b, 18b in a state where the refrigerant outlet 26 communicates with the left space 31 of the top tank 15b and where the main passage 25a communicates with the left space 27 of the top tank 18b and where the branch passage 16 communicates with the one end portion of the capillary tube 17a. Moreover, the refrigerant suction port 14b of the ejector 14 communicates with the left space 27 of the top tank 18b of the second evaporator 18.

In this embodiment, the inside of the top tank 18b of the second evaporator 18 is partitioned into the left and right spaces 27, 28 by the second connection block 24. Here, the left space 27 is used as a collection tank for collecting refrigerant from the plurality of tubes 21, and the right space 28 is used as a distribution tank for distributing refrigerant to the plurality of tubes 21.

The ejector 14 is formed in a slender circular shape extending in the axial direction of the nozzle part 14a, and is arranged in parallel to the top tank part 18b in such a way that the direction of the length of the slender circular shape of the ejector 14 corresponds to the direction of the length of the top tank 18b.

With this construction, the ejector 14 and the evaporator 18 can be arranged compactly, thereby the entire unit can be formed into a compact size. Further, the ejector 14 is arranged in the left space 27 forming a collection tank and is set in such a way as to make its refrigerant suction port 14b open in the left space forming the collection tank. This construction can reduce refrigerant piping.

This construction provides the advantage of realizing the collection of refrigerant from the plurality of tubes 21 and the supply of refrigerant (i.e., suction refrigerant) to the ejector 14 by one tank.

Moreover, in this embodiment, the first evaporator 15 is arranged adjacent to the second evaporator 18, and the downstream end portion of the ejector 14 is arranged next to the distribution tank of the first evaporator 15 (right space 32 of the top tank part 15b). This construction provides the advantage of supplying refrigerant flowing out of the ejector 14 to the first evaporator 15 through an extremely short simple refrigerant passage (hole portions 24c, 33a) even in an arrangement configuration in which the ejector 14 is built in the tank on the second evaporator 18 side.

In the above-mentioned construction, describing the refrigerant passage of the whole integrated unit 20 more specifically with reference to FIG. 2 and FIG. 3, the refrigerant inlet 25 of the first connection block 23 is branched into the main passage 25a and the branch passage 16. Refrigerant in the main passage 25a passes through the ejector 14 (i.e., in this order of nozzle part 14a→mixing part 14c→diffuser part 14d), thereby being reduced in pressure, and this low-pressure refrigerant reduced in pressure passes through the communication hole portion 24c of the second connection block 24 and the through hole 33a of the intermediate wall surface 33, and flows into the right space 32 of the top tank 15b of the first evaporator 15 as shown by an arrow "a".

The refrigerant in the right space 32 flows down, as shown by an arrow "b", in the plurality of tubes 21 on the right side of the heat exchange core part 15a and flows into the right portion in the bottom tank 15c. The bottom tank 15c has no partition plate, so the refrigerant moves to the left side portion from the right side portion of the bottom tank 15c, as shown by an arrow "c".

The refrigerant in the left side portion of the bottom tank 15c flows up in the plurality of tubes 21 on the left side portion of the heat exchange core part 15a, as shown by an arrow "d", and flows into the left space 31 of the top tank 15b and further flows from here into the refrigerant outlet 26 of the first connection block 23, as shown by an arrow "e".

In contrast to this, refrigerant in the branch passage 16 of the first connection block 23 first passes through the capillary tube 17a, thereby being reduced in pressure, and the low-pressure refrigerant reduced in pressure flows into the right space 28 of the top tank 18b of the second evaporator 18 as shown by an arrow "f".

The refrigerant in the right space 28 flows down, as shown by an arrow "g", in the plurality of tubes 21 on the right portion of the heat exchange core part 18a and flows into the right portion in the bottom tank 18c. The bottom tank 18c has no partition plate, so the refrigerant moves to the left portion from the right portion of the bottom tank 18c, as shown by an arrow "h".

The refrigerant in the left portion of the bottom tank 18c flows up in the plurality of tubes 21 on the left portion of the heat exchange core part 18a, as shown by an arrow "i", and flows into the left space 27 of the top tank 18b. The refrigerant suction port 14b of the ejector 14 communicates with this left space 27, so the refrigerant in the let space 27 is drawn into the ejector 14 through the refrigerant suction port 14b.

The integrated unit 20 has the above-mentioned refrigerant passage construction. Hence, as the whole of the integrated unit 20, it is only necessary to make one refrigerant inlet 25 in the first connection block 23 and one refrigerant outlet 26 in the first connection block 23.

Next, the operation of the first embodiment will be described. When the compressor 11 is driven by a vehicle engine, refrigerant of high temperature and high pressure, compressed and discharged by the compressor 11, flows into the radiator 12. The refrigerant of high temperature is cooled by outside air in the radiator 12, thereby being condensed. The high-pressure refrigerant flowing out of the radiator 12 flows into the liquid receiver 12a and is separated into vapor and liquid in the liquid receiver 12a, such that the liquid refrigerant is derived from the liquid receiver 12a and is passed through the expansion valve 13.

In this expansion valve 13, the degree of opening of the valve (refrigerant flow rate) is adjusted in such a way that the degree of superheat of refrigerant at the outlet of the first evaporator 15 (i.e., refrigerant drawn by compressor) becomes a set value and the high-pressure refrigerant is reduced in pressure. Refrigerant after passing through the expansion valve 13 (i.e., refrigerant of intermediate pressure)

flows into the one refrigerant inlet 25 formed in the first connection block 23 of the integrated unit 20.

Here, a refrigerant flow is branched into a refrigerant flow toward the nozzle part 14*a* of the ejector 14 from the main passage 25*a* of the first connection block 23 and a refrigerant flow toward the capillary tube 17*a* from the refrigerant branch passage 16 of the first connection block 23.

The refrigerant flow flowing into the ejector 14 is reduced in pressure and is expanded by the nozzle part 14*a*. Hence, the pressure energy of refrigerant is converted to velocity energy by the nozzle part 14*a* and refrigerant is ejected at high speeds from the jet port of the nozzle part 14*a*. Refrigerant (vapor-phase refrigerant) after passing through the second evaporator 18 of the branch refrigerant passage 16 is drawn from the refrigerant suction port 14*b* by the pressure drop of refrigerant at this time.

Refrigerant ejected from the nozzle part 14*a* and refrigerant drawn from the refrigerant port 14*b* are mixed with each other in the mixing part 14*c* on the downstream side of the nozzle part 14*a* and flow into the diffuser part 14*d*. In this diffuser part 14*d*, the velocity (expansion) energy of refrigerant is converted to pressure energy by the expansion of the area of the passage, whereby the pressure of refrigerant is increased.

Refrigerant flowing out from the diffuser part 14*d* of the ejector 14 flows through the refrigerant passage shown by arrows "a" to "e" in FIG. 2 in the first evaporator 15. During this time, in the heat exchange core part 15*a* of the first evaporator 15, low-pressure refrigerant at a low temperature absorbs heat from air blown in the direction of an arrow A and evaporates. Vapor-phase refrigerant after evaporation is drawn by the compressor 11 through the one refrigerant outlet 26 and then is compressed again.

In contrast, refrigerant flow flowing into the refrigerant branch passage 16 is reduced in pressure by the capillary tube 17*a*, thereby becoming low-pressure refrigerant, and this low-pressure refrigerant flows through the refrigerant passage shown by the arrows "f" to "i" in FIG. 2 in the second evaporator 18. During this time, in the heat exchange core part 18*a* of the second evaporator 18, low-pressure refrigerant at a low temperature absorbs heat from air after passing through the first evaporator 15 and evaporates. Vapor-phase refrigerant after evaporation is drawn into the ejector 14 through one refrigerant suction port 14*b*.

As described above, according to this embodiment, refrigerant on the downstream side of the diffuser part 14*d* of the ejector 14 is supplied to the first evaporator 15 and refrigerant of the branch passage 16 can be supplied also to the second evaporator 18 through the capillary tube (throttle mechanism) 17*a*, so the first and second evaporators 15, 18 can have a cooling function at the same time. For this reason, cold air cooled by both of the first and second evaporators 15, 18 is blown out into a space to be cooled so as to cool the space to be cooled.

At this time, the evaporation pressure of refrigerant in the first evaporator 15 is pressure boosted by the diffuser part 14*d*. In contrast, the outlet of the second evaporator 18 is connected to the refrigerant suction port 14*b* of the ejector 14 and hence the lowest pressure immediately after being reduced in pressure in the nozzle part 14*a* can be applied to the second evaporator 18.

With this, the evaporation pressure of refrigerant (evaporation temperature of refrigerant) in the second evaporator 18 can be lower than the evaporation pressure of refrigerant (evaporation temperature of refrigerant) in the first evaporator 15. Moreover, the first evaporator 15 having a higher evaporation temperature of refrigerant is arranged on the upstream side in the flow direction A of blown air and the second evaporator 18 having a lower evaporation temperature of refrigerant is arranged on the downstream side. Accordingly, both of the temperature difference between the evaporation temperature of refrigerant in the first evaporator 15 and the temperature of blown air and the temperature difference between the evaporation temperature of refrigerant in the second evaporator 18 and the temperature of blown air can be secured.

For this reason, both of the cooling capacities of the first and second evaporators 15, 18 can be effectively obtained. Thus, the capacity of cooling a common space to be cooled can be effectively enhanced by a combination of the first and second evaporators 15, 18. Moreover, the suction pressure of the compressor 11 is increased by the pressure increasing action of the diffuser part 14*d* and hence the driving power of the compressor 11 can be effectively reduced.

Moreover, the flow rate of refrigerant of the second evaporator 18 can be adjusted independently by the capillary tube (throttle mechanism) 17 without depending on the function of the ejector 14, thereby the flow rate of refrigerant flowing to the first evaporator 15 can be adjusted by a throttle characteristic of the ejector 14. For this reason, the flow rates of refrigerants flowing to the first and second evaporators 15, 18 can be adjusted easily in response to their heat loads.

Generally, under conditions of small cycle heat load, a pressure difference in the cycle becomes small and hence an input to the ejector 14 becomes small. In this case, in the cycle of patent document 1, the flow rate of refrigerant passing through the second evaporator 18 depends only on the refrigerant suction capacity of the ejector 14, so the phenomena of a decrease in the input of the ejector 14→a decrease in the refrigerant drawing capacity of the ejector 14→a decrease in the flow rate of refrigerant in the second evaporator 18 occur, which results in making it difficult to secure the cooling performance of the second evaporator 18.

In contrast to this, according to this embodiment, refrigerant after passing through the expansion valve 13 is branched on the upstream side of the ejector 14 and this branched refrigerant is passed through the refrigerant branch passage 16 and is drawn in the refrigerant suction port 14*b*, such that the refrigerant branch passage 16 is connected in parallel to the ejector 14 in the refrigerant flow.

For this reason, refrigerant can be supplied to the refrigerant branch passage 16 by the use of not only the refrigerant drawing capacity of the ejector 14 but also the refrigerant drawing and discharging capacity of the compressor 11. With this, even if the phenomena of a decrease in the input of the ejector 14 and a decrease in the refrigerant drawing capacity of the ejector 14 occur, the degree of decrease in the flow rate of refrigerant in the second evaporator 18 can be made smaller than in the cycle of patent document 1. Hence, even under a low heat load condition, the cooling performance of the second evaporator 18 can be easily secured.

FIG. 5 is a comparative example in which an integrated unit 20 is not constructed in the ejector type refrigeration cycle 10 similar to this embodiment. That is, in the comparative example in FIG. 5, the ejector 14, the first evaporator 15, the second evaporator 18 and the throttle mechanism 17 (specifically, capillary tube 17*a* forming a fixed throttle) are constructed as respective independent parts and are fixed separately to the chassis part such as a vehicle body and are combined with each other by piping.

For this reason, according to the comparative example in FIG. 5, in particular, the low-pressure parts such as the ejector 14 and the respective evaporators 15, 18 need to be fixed to the vehicle body or the like, respectively. Further, the piping for connecting the inlet side and the outlet side of the ejector 14, the piping for connecting the inlet side and the outlet side of the throttle mechanism 17, and the piping for connecting the outlet side of the second evaporator 18 and the refrigerant suction port 14b of the ejector 14 are required additionally as compared with this embodiment.

As a result, when the ejector type refrigeration cycle 10 is mounted in the vehicle, piping connection portions are increased in number so as to increase the cost required to mount the cycle 10. In addition, In FIG. 5, the above-mentioned respective parts are constructed as separate parts and the respective parts are connected by piping. In this case, an installation space of the ejector cycle 10 needs to be increased, and the mounting performance of the ejector cycle 10 in the vehicle is deteriorated. Moreover, the cycle parts are increased in number, thereby causing an increase in cost.

In contrast to this, according to this embodiment, the ejector 14, the first and second evaporators 15, 18, and the capillary tube 17a forming a fixed throttle are assembled as one structured body, that is, the integrated unit 20, as shown in FIG. 2. With this, as the whole of the integrated unit 20, it is necessary to provide the integrated unit 20 with only one refrigerant inlet 25 and only one refrigerant outlet 26.

As a result, when the ejector type refrigeration cycle 10 is mounted in the vehicle, as the whole of the integrated unit 20 having the above-mentioned various parts (14, 15, 18, 17a) built therein, the work of connecting piping can be finished only by connecting one refrigerant inlet 25 to the outlet side of the expansion valve 13 and by connecting one refrigerant outlet 26 to the suction side of the compressor 11.

At the same time, by adopting a construction in which the ejector 14 and the capillary tube 17a are built in the tank of the evaporator, the whole integrated unit 20 can be reduced in size and be combined compactly, whereby an installation space can be reduced.

For this reason, the mounting performance of the ejector type refrigeration cycle 10 having the plurality of evaporators 15, 18 in the vehicle can be improved substantially as compared with the comparative example in FIG. 5. The cycle parts can be reduced in number and hence cost can be reduced as compared with the comparative example in FIG. 5.

Further, the adoption of the integrated unit 20 can produce the incidental effect of improving a cooling performance and the like as described below. That is, the integrated unit 20 can shorten the lengths of connection passages between the above-mentioned respective various parts (14, 15, 18, 17a) to small amounts and hence can reduce pressure loss in the refrigerant passage and at the same time can effectively decrease heat exchange between the low-pressure refrigerant and the ambient atmosphere. With this, the cooling performances of the first and second evaporators 15, 18 can be enhanced.

In particular, the evaporator pressure of the second evaporator 18 can be reduced by such a decrease in pressure loss that is produced by eliminating the piping for connecting the outlet side of the second evaporator 18 and the refrigerant suction port 14b of the ejector 14, so the cooling performance of the second evaporator 18 can be enhanced effectively without increasing the power of the compressor.

Moreover, because the ejector 14 is arranged in a low-temperature atmosphere in the tank of the evaporator structure, the heat insulation process (applying heat insulating material) of the ejector 14 can be eliminated.

Second Embodiment

In the first embodiment, the capillary tube 17a is arranged between the branch passage 16 of the first connection block 23 of the integrated unit 20 and the inlet side of the second evaporator 18, such that refrigerant at the inlet of the second evaporator 18 is reduced in pressure by the capillary tube 17a. However, in a second embodiment, as shown in FIG. 6 to FIG. 8, the capillary tube 17a is not employed as pressure reducing means of the second evaporator 18 but instead a fixed throttle hole 17b such as an orifice for throttling a passage area to a specified amount is arranged in the branch passage 16 within the first connection block 23. With this, a connection pipe 160 having a larger passage diameter than the capillary tube 17a is arranged in a portion where the capillary tube 17a is arranged in the first embodiment.

The second embodiment is different from the first embodiment in that low-pressure refrigerant having pressure reduced by the fixed throttle hole 17b formed in the branch passage 16 of the first connection block 23 is introduced into the right space of the top tank 18b of the second evaporator 18 through the connection pipe 160. The second embodiment is the same as the first embodiment in other refrigerant passages. Hence, the second embodiment can produce the same effect as the first embodiment by the adoption of the integrated unit 20.

Third Embodiment

In the first embodiment, both of the ejector 14 and the capillary tube 17a are arranged in a common tank, that is, in the top tank 18b of the second evaporator 18. However, in a third embodiment, as shown in FIG. 9 to FIG. 11, only the capillary tube 17a is arranged in the top tank 18b of the second evaporator 18, while the ejector 14 is arranged in an exclusive separate tank 34.

The second connection block 24 in the first embodiment is eliminated in accordance with removing the ejector 14 from the top tank 18b of the second evaporator 18. Instead, a partition plate 35 is arranged in the center area in the direction of the length in the top tank 18b and the inside space of the top tank 18b is partitioned into left and right spaces by this partition plate 35. The tip portion of the capillary tube 17a passes through the partition plate 35 and communicates with the right space 28 in the top tank 18b.

The above-mentioned separate tank 34, as shown in FIG. 11, is arranged in a middle portion between the top tank 15b of the first evaporator 15 and the top tank 18b of the second evaporator 18 and is shaped like a cylinder. In this example, this separate tank 34 is formed integrally with the top tanks 15b, 18b.

The ejector 14 and this cylindrical separate tank 34, as shown in FIG. 10, extend closer to the back side (right side in FIG. 10) than the partition plates 30, 35 of both tanks 15b, 18b. The outlet portion of the ejector 14 (outlet portion of the diffuser part 14d) passes through a through hole (lateral hole) 34a passing through the circumferential wall of the separate tank 34 and communicates with the right inside space 32 of the top tank 15b of the first evaporator 15.

Similarly, also the refrigerant suction port 14b of the ejector 14 passes through a through hole (lateral hole) 34b passing the circumferential wall of the separate tank 34 and communicates with the left inside space 27 of the top tank 18b of the second evaporator 18.

In this manner, in the third embodiment, the same refrigerant passage as in the first embodiment can be constructed in the construction of arranging the ejector 14 in the exclusive separate tank 34. With this, the third embodiment can produce the same effect as the first embodiment.

4th Embodiment

A 4th embodiment is a modification of the third embodiment and eliminates the capillary tube 17a in the third embodiment and instead adopts the fixed throttle hole 17b and the connection pipe 160 described in the second embodiment.

That is, in the 4th embodiment, as shown in FIG. 12 to FIG. 14, the fixed throttle hole 17b as pressure reducing means is formed in the branch passage 16 of the first connection block 23, and the downstream side of this fixed throttle hole 17b communicates with the right space 28 of the top tank 18b of the second evaporator 18 through the connection pipe 160.

5th Embodiment

In the first to 4th embodiments is employed the construction of arranging the ejector 14 in the top tank 18b of the second evaporator 18 or in the separate tank 34 adjacent to the top tank 18b. In a 5th embodiment, as shown in FIG. 15, the ejector 14 is arranged in an external cassette part 36 arranged outside the first and second evaporators 15, 18.

This cassette part 36 is an external part fixed to the outside of the first and second evaporators 15, 18 and is broadly constructed of an ejector part 14 (ejector 14) and a bottom case part 37 and a top case part 38 which house this ejector 14.

The main portion of the ejector 14 (i.e., a portion housing the nozzle part 14a) is formed in the shape of a circular cylinder extending in the up and down direction along the side surface of one of the first and second evaporators 15, 18. Here, the main portion of the ejector 14 may be formed of metal such as aluminum or resin.

Seal members S1, S2 of O-rings are arranged in the outer peripheral wall of the main portion of the ejector 14. The main portion of the ejector 14 may be formed in the shape of a rectangle other than a circular cylinder.

The bottom case part 37 is fixed previously to the side surface portions of the first and second evaporators 15, 18. Specifically, the bottom case part 37 is formed in the shape of a rectangle which is longitudinally elongated and is closed at the bottom and is opened at the top. The material of the bottom case part 37 may be either metal such as aluminum or resin. The bottom case 37 is fixed to the side surface portions of the first and second evaporators 15, 18 by means of screwing or the like.

The ejector 14 (ejector part) is inserted into the bottom case part 37 through the top opening portion of this bottom case part 37. Here, the top of the ejector 14, that is, a portion closer to the top than the refrigerant suction port 14b of the ejector 14 (i.e., inlet side portion of the nozzle part 14a) projects upward above the bottom case part 37.

Then, while the top case part 38 is fitted to the upward projecting portion of the ejector 14, the top case part 38 is put on the top opening portion of the bottom case part 37 as a cover part. Then, the top case part 38 is fastened integrally to the bottom case part 37 by means of screwing or the like.

With this, the ejector 14 (ejector part) can be held and fixed in the bottom case part 37 and the top case part 38. In FIG. 15, the direction A of the air flow is reverse to that in FIG. 2 and the like, so the left and right of the first and second evaporators 15, 18 are also reverse to those in FIG. 2 and the like.

The top case part 38 has also the function of the first connection block 23 in the first to fourth embodiments in an integrated manner. That is, the refrigerant inlet 25 and the refrigerant outlet 26 are formed adjacently in parallel in the top case part 38. The refrigerant inlet 25 is branched into the main passage 25a toward the inlet side of the ejector 14 and a branch passage 25b. The fixed throttle hole 17b is formed as pressure reducing means in this branch passage 16. This fixed throttle hole 17b is the same as the throttle hole 17b in the second and fourth embodiments.

The main passage 25a bends in the shape of a letter L from the direction of the passage of the refrigerant inlet 25 and extends in the direction of the length (up and down direction) of the ejector 14. The nozzle part 14a, the mixing part 14c and the diffuser part 14d of the ejector 14 are formed in order from the top to the bottom in this main passage 25a.

The outlet portion (outlet portion of the diffuser part 14d) of the ejector 14 is located near the other end portion (bottom end portion) in the direction of the length of the ejector 14. The outlet portion of this ejector 14 is connected to one end portion of connection piping 39 through the communication hole 37a of the bottom case part 37, and the other end portion of this connection piping 39 is connected to the right space portion 32 of the top tank 15b of the first evaporator 15.

Moreover, the passage of the refrigerant outlet 26 of the top case part 38 is connected to the left space portion 31 of the top tank 15b of the first evaporator 15.

Moreover, the refrigerant suction port 14b of the ejector 14 is formed in such a way as to pass through the wall surface of the main portion of the ejector 14 in a radial direction and communicates with the downstream portion of the nozzle part 14a of the ejector 14. This refrigerant suction port 14b is connected to one end portion of connection piping 40 through the communication hole 38a of the top case part 38 and the other end portion of this connection piping 40 is connected to the left space 27 of the top tank 18b of the second evaporator 18.

Moreover, the outlet side of the fixed throttle hole 17b of the branch passage 16 is connected to the right space 28 of the top tank 18b of the second evaporator 18 through connection piping 41.

The passage of the external cassette part 36 is connected to the four left and right spaces 27, 28, 31, 32 of the top tanks 15b, 18b of the first and second evaporators 15, 18, as described above. With this, refrigerant after passing through the ejector 14 passes through the connection piping 39 and then flows through a passage shown by arrows "a" to "e" in the first evaporator 15 and then flows to the outside passage (suction side of the compressor) from the refrigerant outlet 26 of the external cassette part 36.

In contrast, refrigerant branched to the branch passage 16 at the refrigerant inlet 25 and reduced in pressure by the fixed throttle hole 17b passes through the connection piping 41 and then flows a passage shown by arrows "f" to "i" in the second evaporator 18 and reaches the left space 27 of the top tank 18b. Then, the refrigerant is drawn from this left space 27 into the refrigerant suction port 14b of the ejector 14 through the connection piping 40.

6th Embodiment

In the 5th embodiment, a part corresponding to the first connection block 23 is constructed integrally on the top case part 38 of the external cassette part 36. However, in a 6th embodiment, the first connection block 23 is constructed as a separate part separated from the external cassette part 36.

In the 6th embodiment, as shown in FIG. 16, the first connection block 23 is arranged on one (right) side of both of the left and right side surface portions of the first and second evaporators 15, 18, and the external cassette part 36 is arranged on the other (left) side.

Just as with the 5th embodiment, the external cassette part 36 has the construction of holding and fixing the ejector 14 (ejector part) in the bottom case part 37 and the top case part 38. However, in the 6th embodiment, not the bottom case part 37 but the top case part 38 is fixed previously to the side surface portion of one of the first and second evaporators 15, 18.

Then, the ejector 14 is inserted into the top case part 38 through the bottom opening portion of the top case part 38 and then the bottom case part 37 is put as a cover part on the bottom opening portion of the top case part 38, and both of the top and bottom case parts 37, 38 are fastened integrally to each other by means of screwing or the like.

Here, the direction of combining the ejector 14 is opposite to that in the 5th embodiment, that is, the ejector 14 is combined in such a way that the nozzle part 14a side (inlet side) is located below and that the diffuser part 14d side (outlet side) is located above.

The refrigerant suction port 14b of the ejector 14 is connected to the left side portion of the bottom tank 18c of the second evaporator 18 through the communication hole 37b of the bottom case part 37. The diffuser part 14d is connected to the left space portion 31 of the top tank 15b of the first evaporator 15 through the communication hole 38b of the top case part 38.

In contrast, the refrigerant inlet 25 of the first connection block 23 is branched into the main passage 25a and the branch passage 16. The main passage 25a is connected to the connection hole 37c of the bottom case part 37 of the external cassette part 36 by connection piping 42, and this connection hole 37c communicates with the inlet portion 43 of the nozzle part 14a of the ejector 14.

The branch passage 16 is connected to the right side portion of the bottom tank 18c of the second evaporator 18 through the capillary tube 17a forming pressure reducing means.

In the second evaporator 18 of the 6th embodiment, the partition plate 35 of the top tank 18b is eliminated and instead a partition plate 35a is arranged in the center in the longitudinal direction (left and right direction) of the bottom tank 18c, such that the inside space of the bottom tank 18c is partitioned into left and right spaces by this partition plate 35a.

For this reason, low-pressure refrigerant passing through the capillary tube 17a flows the through refrigerant passage shown by arrows "f" to "i" in the second evaporator 18 and then is drawn into the refrigerant suction port 14b of the ejector 14 through the communication hole 37b from the left side portion of the bottom tank 18c.

In contrast, refrigerant in the main passage 25a of the refrigerant inlet 25 passes through the connection piping 42 and flows into the inlet portion 43 of the ejector 14 of the external cassette part 36 through the communication hole 37c and is reduced in pressure by the nozzle part 14a, thereby being expanded. Low-pressure refrigerant of the outlet portion of the ejector 14 flows into the left space portion 31 of the top tank 15b of the first evaporator 15 through the communication hole 38b of the top case part 38.

Thereafter, the low-pressure refrigerant flows through the refrigerant passage shown by arrows "a" to "d" in the first evaporator 15 and flows to the refrigerant outlet 26 of the first connection block 23.

7th Embodiment

The first embodiment employs a cycle construction of an expansion valve type in which the liquid receiver 12a is arranged on the outlet side of the radiator 12 and in which the expansion valve 13 is arranged on the outlet side of this liquid receiver 12a. However, in a 7th embodiment, as shown in FIG. 17, an accumulator 50 as a vapor/liquid separator that separates refrigerant into vapor and liquid and accumulates extra refrigerant as liquid is arranged on the outlet side of the first evaporator 15, such that vapor-phase refrigerant is introduced into the suction side of the compressor 11 from this accumulator 50.

In this cycle construction of an accumulator type, a vapor/liquid interface of vapor-phase refrigerant and liquid-phase refrigerant is formed in the accumulator 50. Accordingly, the control of the degree of superheat of refrigerant at the outlet of the first evaporator 15 does not need to be performed by the expansion valve 1.

Hence, in the cycle construction of an accumulator type, the liquid receiver 12a and the expansion valve 13 can be eliminated. In this case, the refrigerant inlet of the integrated unit 20 needs only to be connected directly to the outlet side of the radiator 12. The refrigerant outlet 26 of the integrated unit 20 is connected to the inlet side of the accumulator 50 and the outlet side of the accumulator is connected to the suction side of the compressor 11.

8th Embodiment

An 8th embodiment is a modification of the 7th embodiment, and as shown in FIG. 18, is constructed in such a way that the accumulator 50 is also assembled integrally as one element of the integrated unit 20 and the outlet portion of the accumulator 50 is constructed as the refrigerant outlet 26 of the whole integrated unit 20.

9th Embodiment

Any of the first to 8th embodiments is constructed in such a way that the branch passage 16 branched at the inlet side of the ejector 14 is connected to the refrigerant suction port 14b of the ejector 14 and that the throttle mechanism 17 and the second evaporator 18 are arranged in this branch passage 16. However, as shown in FIG. 19, the ninth embodiment is constructed in such a way that the accumulator 50 as a vapor/liquid separator is provided at the outlet side of the first evaporator 15; and that a branch passage 16 for connecting a liquid-phase refrigerant outlet portion 50a of this accumulator 50 to the refrigerant suction port 14b of the ejector 14 is provided; and that the throttle mechanism 17 and the second evaporator 18 are arranged in this branch passage 16.

In the 9th embodiment, the integrated unit 20 is constructed of the ejector 14, the first and second evaporators 15, 18, the throttle mechanism 17, and the accumulator 50. Here, as the whole of the integrated unit 20 of the 9th embodiment, one refrigerant inlet 25 is provided at the inlet side of the ejector 14 and this refrigerant inlet 25 is connected to the outlet side of the radiator 12.

Moreover, as the whole of the integrated unit 20 of the 9th embodiment, one refrigerant outlet 26 is provided at the vapor-phase refrigerant outlet portion of the accumulator 50 and this refrigerant outlet 26 is connected to the suction side of the compressor 11.

10th Embodiment

Any integrated unit 20 of the first to 9th embodiments is provided with the first evaporator 15 connected to the outlet side of the ejector 14 and the second evaporator 18 connected to the refrigerant suction port 14b of the ejector 14. However, in a 10th embodiment, as shown in FIG. 20, an integrated unit 20 constructed in the ejector cycle refrigeration cycle 10 is provided with only the evaporator 18 (second evaporator 18) connected to the refrigerant suction port 14b of the ejector 14.

The integrated unit 20 of the 10th embodiment is constructed of the ejector 14, the evaporator 18, the throttle mechanism 17 and the accumulator 50. Furthermore, the integrated unit 20 has one refrigerant inlet 25 and one refrigerant outlet 26 as the whole of the unit 20. In other words, the 10th embodiment corresponds to a structure in which the first evaporator 15 of the 9th embodiment is eliminated.

11th Embodiment

In some of the first to 10th embodiments, the throttle mechanism 17 is also integrated in the integrated unit 20. In an 11th embodiment, as shown in FIG. 21, the integrated unit 20 is constructed of the first and second evaporators 15, 18 and the ejector 14, but the throttle mechanism 17 is provided separately from the integrated unit 20.

Moreover, in the 11th embodiment is shown an example in which vapor/liquid separator is not arranged on any of the high pressure side and the low pressure side of the cycle.

12th Embodiment

FIG. 22 shows a 12th embodiment. In the 12th embodiment, as compared with the 11th embodiment, the accumulator 50 forming a vapor/liquid separator is provided on the outlet side of the first evaporator 15 and this accumulator 50 is integrated in the integrated unit 20. That is, in the 12th embodiment, the integrated unit 20 is constructed with the ejector 14, the first and second evaporators 15, 18 and the accumulator 50. However, the throttle mechanism 17 is provided separately from the integrated unit 20.

13th Embodiment

In the first embodiment has been described an example (see FIG. 2) in which the heat exchange core parts 15a, 18a of the first and second evaporators 15, 18 are constructed of a lamination structure of the flat tubes 21 and the corrugated fins 22. However, as shown in FIG. 23, in a 13th embodiment, the heat exchange parts 15a, 18a of the first and second evaporators 15, 18 are constructed of a plate fin type heat exchange structure.

Specifically, many tube insertion holes 221 are formed in flat plate fins 220 and many flat plate fins 220 are arranged in layers at specified intervals and tubes 210 are inserted into and bonded to the tube insertion holes 221 of these plate fins 220. In FIG. 23, circular tubes having a circular cross section are used as the tubes 210 and are expanded in diameter, thereby being fixed to the inner wall surfaces of the tube insertion holes (circular holes) 221 of the plate fins 220.

Flat tubes having a flat cross section may be used as the tubes 210 and these flat tubes 210 may be fixed to the inner wall surface of the tube insertion holes (flat holes) 221 of the plate fins 220.

14th Embodiment

FIG. 24 shows a 14th embodiment. The heat exchange parts 15a, 18a of the first and second evaporators 15, 18 are constructed of a serpentine type heat exchange structure.

Specifically, a flat tube having many holes is used as a tube 230. This flat tube 230 having many holes is formed, for example, by extruding an aluminum material. Many refrigerant passage holes (not shown) are formed in the flat cross section of the tube material.

FIG. 24(a) shows the first example of the 14th embodiment. A refrigerant inlet pipe 231 is bonded to one end of the flat tube 230 having many holes bent in a serpentine shape, and a refrigerant outlet pipe 232 is bonded to the other end of the flat tube 230 having many holes. With this, refrigerant is distributed to many refrigerant passage holes (not shown) of the flat tube 230 having many holes from the refrigerant inlet pipe 231 and then flows through these refrigerant passage holes in parallel, and then refrigerant streams are collected in the refrigerant outlet pipe 232.

The corrugated fins 22 are bonded to the straight tube portions arranged adjacently to each other in the serpentine shape of the flat tube 230 having many holes and air passes through the portions of these corrugated fins 22.

FIG. 24(b) shows the second example of the 14th embodiment. Two tubes are used as the flat tube 230 having many holes and two flat tubes 230 having many holes are arranged in parallel between the refrigerant inlet pipe 231 and the refrigerant outlet pipe 232. With this, the second example of FIG. 24(b) is constructed as a two-pass type in which refrigerant flows in parallel in the two flat tubes 230 having many holes.

15th Embodiment

FIGS. 25 to 27 show a 15th embodiment and are drawings corresponding to FIGS. 2 to 4 in the first embodiment. In the first embodiment, the capillary tube 17a constructing the throttle mechanism 17 on the inlet side of the second evaporator 18 connected to the suction side of the ejector 14 is arranged in the top tank 18b of the second evaporator 18, just as with the ejector 14. However, in the 15th embodiment, only the ejector 14 is arranged in the top tank 18b and the capillary tube 17a is arranged outside the top tank 18b.

More specifically, as clearly shown in FIG. 27, the capillary tube 17a is arranged in a valley portion 51 formed by a curved shape having a circular arc-shaped cross section of the top tank 15b of the first evaporator (windward evaporator) 15 on the ejector outlet side and by a curved shape having a circular arc-shaped cross section of the top tank 18b of the second evaporator (leeward evaporator) 18 on the ejector outlet side.

The capillary tube 17a is arranged in contact with the outer surfaces of the top tanks 15b, 18b in the valley portion 51 and is fixed to the outer surfaces of the top tanks 15b, 18b by brazing.

The inlet side of the capillary tube 17a is connected to the branch passage 16 of the first connection block 23 in the outside of the top tanks 15b, 18b. Moreover, the outlet side of the capillary tube 17a, as shown in FIG. 25 and FIG. 26, passes through the wall surface of the right side portion of the top tank 18b of the second evaporator (leeward evaporator) 18 and communicates with the right space 28 of the top tank 18b.

The above-mentioned valley portion 51 is a not-yet-used dead space formed along the longitudinal direction of the top tank 15b, 18b and over the entire length in the longitudinal direction of the tank. In contrast, the capillary tube 17a is a small pipe shape extending slenderly along the longitudinal direction of the tank. Hence, the valley portion 51 is very appropriate for the arrangement space of the capillary tube 17*a* and the whole small pipe shape of the capillary tube 17*a* can be put in the depressed shape of the valley portion 51.

For this reason, even if the capillary tube 17*a* is arranged in the valley portion 51 outside of the tanks 15*b*, 18*b*, there is no need to worry about the whole size of the integrated unit 20 being enlarged.

Moreover, when the capillary tube 17*a* is arranged in the valley portion 51, the capillary tube 17*a* is located outside of the second evaporator tank 18. Hence, as compared with the first embodiment, the area of the refrigerant passage in the top tank 18*b* of the second evaporator (leeward evaporator) 18 can be increased by the capillary tube 17*a* and hence the resistance of the refrigerant passage in the top tank 18*b* can be reduced.

The other points of the 15th embodiment are the same as those in the first embodiment and hence their descriptions will be omitted.

16th Embodiment

FIGS. 28 to 30 show a 16th embodiment. The capillary tube 17*a* in the 15th embodiment is eliminated and instead the fixed throttle hole 17*b* such as an orifice for throttling the area of the branch passage 16 to a set value is provided in the branch passage 16 of the first connection block 23.

With this, a connection pipe 160 having a sufficiently larger diameter of the passage than the capillary tube 17*a* is arranged in a portion where the capillary tube 17*a* of the 15th embodiment is arranged, that is, in the valley portion 51. This connection pipe 160 is fixed by brazing to the outer surfaces of the top tanks 15*b*, 18*b*, just as with the capillary tube 17*a* of the 15th embodiment.

In the 16th embodiment, low-pressure refrigerant having pressure-reduced by the fixed throttle hole 17*b* formed in the branch passage 16 of the first connection block 23 is introduced into the right space of the top tank 18*b* of the second evaporator 18 through the connection pipe 160.

Also in the 16th embodiment, the arrangement of the capillary tube 17*a* is eliminated in the top tank 18*b* of the second evaporator 18, and the connection pipe 160 is arranged in the valley portion 51 of the top tanks 15*b*, 18*b*. Hence, it is also possible to prevent the integrated unit 20 from being enlarged and, at the same time, to produce the effect of reducing the resistance of the refrigerant passage in the top tank 18*b* of the second evaporator (leeward evaporator) 18.

Incidentally, the 16th embodiment is the same as the second embodiment (FIG. 6 to FIG. 18) in that in place of the capillary tube 17*a* the fixed throttle hole 17*b* is provided in the branch passage 16 of the first connection block 23.

17th Embodiment

FIGS. 31 to 33 show a 17th embodiment in which the formation position of the fixed throttle hole 17*b* such as an orifice in the 16th embodiment is changed.

This fixed throttle hole 17*b* is constructed as the throttle mechanism of the second evaporator 18 on the ejection suction side. In an example shown in FIG. 31, the formation position of this fixed throttle hole 17*b* is set at the refrigerant inlet portion of the second evaporator 18, specifically, at the refrigerant passage portion of the right space 28 of the top tank 18*b* of the second evaporator 18.

In contrast, in an example shown in FIG. 32, the formation position of this fixed throttle hole 17*b* is set at a portion directly behind the outlet of the branch passage 16 of the first connection block 23. Alternatively, the fixed throttle hole 17*b* may be formed in the middle of the connection pipe 160.

In this manner, the fixed throttle hole 17*b* may be formed in any portion in the refrigerant passage from a portion directly behind the outlet of the branch passage 16 of the first connection block 23 to the refrigerant inlet passage portion of the top tank 18*b* of the second evaporator 18.

The 17th embodiment is the same in the other points as the 16th embodiment and hence can produce the same effect as the 16th embodiment.

18th Embodiment

In the 15th to 17th embodiments, just as with the first embodiment, the second connection block 24 is arranged in the middle position in the longitudinal direction of the top tank 18*b* of the second evaporator (leeward evaporator) 18; and the inside space of the top tank 18*b* is partitioned into left and right spaces 27, 28; and the outlet side (downstream side) refrigerant passage of the ejector 14 is made to communicate with the right space 32 of the top tank 15*b* forming the refrigerant inlet portion of the first evaporator (windward evaporator) 15 via the communication hole 24*c* of the second connection block 24 and the through holes 33*a* formed in the middle wall surface 33. However, the 18th embodiment is constructed in such a way that the outlet side refrigerant passage of the ejector 14 communicates with the refrigerant inlet portion of the first evaporator (windward evaporator) 15 without using the second connection block 24.

FIGS. 34 to 38 show an 18th embodiment. FIG. 34 is a schematic perspective view of the whole of the first and second evaporators 15, 18. FIG. 35(*a*) is a top view of the top tanks 15, 18*b* of the first and second evaporators 15, 18. FIG. 35(*b*) is a longitudinal sectional view of the top tanks 15*b*, 18*b*. FIG. 36 is a lateral sectional view of the top tanks 15*b*, 18*b*. FIG. 37 is an enlarged sectional view of a portion B in FIG. 35(*b*). FIG. 38 are explanatory diagrams of a sub-tank part for forming a communication space, which is an additional part in the 18th embodiment.

In the 18th embodiment, the top tanks 15, 18*b* of the first and second evaporators 15, 18 are formed within a region of a length L1 in FIG. 35(*a*) and a sub-tank part 52 for forming a communication space is arranged across a range of a length L2 on the right side of this length L1 (side opposite to the refrigerant inlet side of the ejector 14).

This sub-tank part 52 is a part that is also formed of the aluminum material and is brazed integrally to the first and second evaporators 15, 18. One end side (left end side in FIG. 34, FIG. 35(*a*)) of the sub-tank part 52 is formed in the same sectional shape as the top tanks 15*b*, 18*b*, that is, in a shape having a double arc curved shape 52*a*, 52*b* (see FIG. 38(*c*)). The one end side of the sub-tank part 52 is bonded integrally to the ends of the top tanks 15*b*, 18*b*.

A valley wall surface 52*c* located in the middle of the double arc-shaped curved shape 52*a*, 52*b*, as shown in FIG. 38(*b*, *d*), is formed in a slant surface extending outward of the tank from one end side of the sub-tank part 52 to the other end side.

With this, the inside space of the sub-tank part 52 forms a communication space 52*d* formed across both of a region on the top tank 15*b* side of the windward first evaporator 15 and a region on the top tank 18*b* side of the leeward second evaporator 18.

The other end side of the inside space (communication space 52*d*) of the sub-tank part 52 is hermetically closed by a cap part 56. This cap part 56 is also a part that is formed of the aluminum material and is brazed integrally to the first and second evaporators 15, 18.

In the 18th embodiment, as shown in FIG. 34 and FIG. 35, the second connection block 24 is eliminated, and instead a ring-shaped first partition plate 53 is arranged in a middle position in the longitudinal direction of the top tank 18b of the second evaporator (leeward evaporator) 18.

Moreover, a ring-shaped second partition plate 54 is arranged at the right end portion of the top tank 18b (i.e., end portion opposite to the refrigerant inlet side of the ejector 14).

The first partition plate 53 is arranged to partition the inside space of the top tank 18b into the left space 27 and the right space 28. The second partition plate 54 is arranged to separate this right space 28 from the communication space 52d formed by the sub-tank part 52 located on the right end side of the right space 28. FIG. 37 is an enlarged sectional view of a portion near the right end of the top tank 18b (a portion B in FIG. 35(b)) and shows the communication space 52d by a portion with small dots.

Portions close to both ends of the connection pipe 55 constructed of a circular pipe are fitted in the central holes of the two O-ring-shaped first and second partition plates 53, 54. This connection pipe 55 is fixed air-tightly by brazing to the inner wall surface of the top tank 18b via the first and second partition plates 53, 54.

The tip portion in the longitudinal direction of the ejector 14 (portion corresponding to the outlet portion of the diffuser part 14d in FIG. 1) is inserted into one end portion of the connection pipe 55 and is fixed in a sealed manner to the one end portion by the use of an O-ring 29a. The end portion of the connection pipe 55 passes through the second partition plate 54 and projects into and opens to the communication space 52d.

With this, the outlet side refrigerant passage of the diffuser part 14d of the ejector 14 does not communicate with the inside spaces 27, 28 of the top tank 18b but communicates with only the communication space 52d by the connection pipe 55.

In contrast, a partition plate is not arranged at the right end portion of the top tank 15b of the first evaporator (windward evaporator) 15, so an area on the first evaporator side of the communication space 52d communicates directly with the right space 32 of the top tank 15b.

Therefore, the refrigerant outlet passage of the ejector 14 communicates with the right space 32 of the top tank 15b forming the refrigerant inlet portion of the first evaporator 15 via the connection pipe 55 and the communication space 52d of the sub-tank part 52.

The capillary tube 17a, as shown in FIG. 36, is arranged in the valley portion 51 of the top tanks 15b, 18b and is brazed integrally to the outer surfaces of the top tanks 15b, 18b, just as with the 15th embodiment. Moreover, the outlet portion of the capillary tube 17a, as shown in FIG. 35(b), communicates with the right space 28 of the top tank 18b forming the refrigerant inlet portion of the second evaporator 18 in a middle portion of the first and second partition plates 53, 54.

According to the 18th embodiment, refrigerant from the diffuser part 14d of the ejector 14 passes through the connection pipe 55 and is discharged to the top tank 18b side of the second evaporator 18. However, the discharged refrigerant does not flow into the top tank 18b but passes through the communication space 52d of the sub-tank part 52 and flows into the right space 32 of the top tank 15b forming the refrigerant inlet portion of the first evaporator 15. The sub-tank part 52 can be manufactured effectively only by pressing a sheet of metal plate.

19th Embodiment

FIGS. 39 to 41 show a 19th embodiment. The 19th embodiment corresponds to a modification of the 18th embodiment, in which the capillary tube 17a is replaced by a connection pipe 160 and the fixed throttle hole 17b is formed as the throttle mechanism of the second evaporator (leeward evaporator) 18 in the branch passage 16 of the first connection block 23. The 19th embodiment is the same in the other parts (sub-tank part 52 and the like) as the 18th embodiment.

20th Embodiment

FIGS. 42 to 44 show a 20th embodiment. The 20th embodiment arranges the fixed throttle hole 17b in the 19th embodiment not in the branch passage 16 of the first connection block 23 but in the refrigerant passage on the downstream side of the branch passage 16 of the first connection block 23.

In the 20th embodiment, the fixed throttle hole 17b is used as the throttle mechanism for the second evaporator 18 on the ejector suction side. Furthermore, the formation position of this fixed throttle hole 17b, just as with the 17th embodiment, may be arranged at any portion of the refrigerant passage from a portion directly behind the branch passage 16 of the first connection block 23 to the refrigerant inlet portion of the top tank 18b of the second evaporator 18.

Other Embodiments

The present invention is not limited to the above-mentioned embodiments but can be modified variously as described below.

(1) In the first embodiment, when the respective parts of the integrated unit 20 are assembled integrally, other parts except the ejector 14, that is, the first evaporator 15, the second evaporator 18, the first and second connection blocks 23, 24, and the capillary tube 17 can be brazed integrally to each other. However, the integration of these parts can be performed by various fixing means of screwing, caulking, welding, or bonding as well as brazing.

Moreover, in the first embodiment, screwing has been shown as means for fixing the ejector 14 as an example. However, if fixing means is secure from the possibility of thermal deformation, the fixing means other than the screwing can be used. Specifically, the ejector 14 may be fixed by the use of fixing means such as caulking or bonding.

(2) In the respective embodiments described above has been a vapor compression type subcritical pressure cycle using refrigerant whose high pressure is not higher than a critical pressure, for example, fron-based refrigerant (chlorofluorocarbons-based refrigerant) and HC-based refrigerant. The present invention may be applied to a vapor compression type supercritical pressure cycle using refrigerant whose high pressure is higher than a critical pressure, for example, carbon dioxide ($CO_2$).

However, in the supercritical pressure cycle, refrigerant discharged from the compressor only dissipates heat as the refrigerant is in the state of supercritical pressure and does not condense, so the liquid receiver 12a arranged on the high pressure side cannot exert the function of separating refrigerant into vapor and liquid and the function of storing extra liquid refrigerant. Hence, in the supercritical pressure cycle, it is recommended to adopt the construction of arranging the accumulator 50 forming a low-pressure side vapor/liquid separator on the outlet side of the first evaporator 15 as shown in FIG. 17 to FIG. 20.

(3) In the embodiments described above, the throttle mechanism 17 is constructed of the fixed throttle hole 17b such as the capillary tube 17a or an orifice. However, the throttle mechanism 17 may be constructed of an electric control valve having the degree of opening of a valve (degree of throttle of a passage) adjusted by an electrically operated actuator. Moreover, the throttle mechanism 17 may be constructed of a combination of a fixed throttle such as the capillary tube 17a or the fixed throttle hole 17b and an electromagnetic valve.

(4) In the respective embodiments described above, a fixed ejector having a nozzle part 14a whose passage area is constant has been described by way of example. However, a variable ejector having a variable nozzle part whose passage area can be adjusted may be employed as the ejector 14.

As a specific example of the variable nozzle part may be employed, for example, a mechanism such that the position of a needle, which is inserted into a passage of a variable nozzle part, is controlled by an electric actuator to adjust the area of the passage.

(5) In the first embodiment and the like has been a case where a space to be cooled of the first and second evaporators 15, 18 is a space in a vehicle compartment or a space in a freezer and refrigerator of a refrigeration vehicle. However, the present invention can be widely applied to a refrigeration cycle not only for these vehicles but also for various uses such as stationary use.

(6) In the first embodiment and the like, the temperature type expansion valve 13 and the temperature sensing part 13a are constructed separately from the unit for the ejector type refrigeration cycle. However, the temperature type expansion valve 13 and the temperature sensing part 13a may be combined with the unit for the ejector type refrigeration cycle. For example, it is possible to employ the construction of housing the temperature type expansion valve 13 and the temperature sensing part 13a in the first connection block 23 of the integrated unit 20. In this case, the refrigerant inlet 25 is located between the liquid receiver 12a and the temperature type expansion valve 13 and the refrigerant outlet 26 is located between a passage portion where the temperature sensing part 13a is arranged and the compressor 11.

BRIEF DESCRIPTION OF THE DRAWINGS

FIG. 24(*b*) is a schematic front view of the second example of an evaporator structure according to the 14th embodiment.

Figure 1:
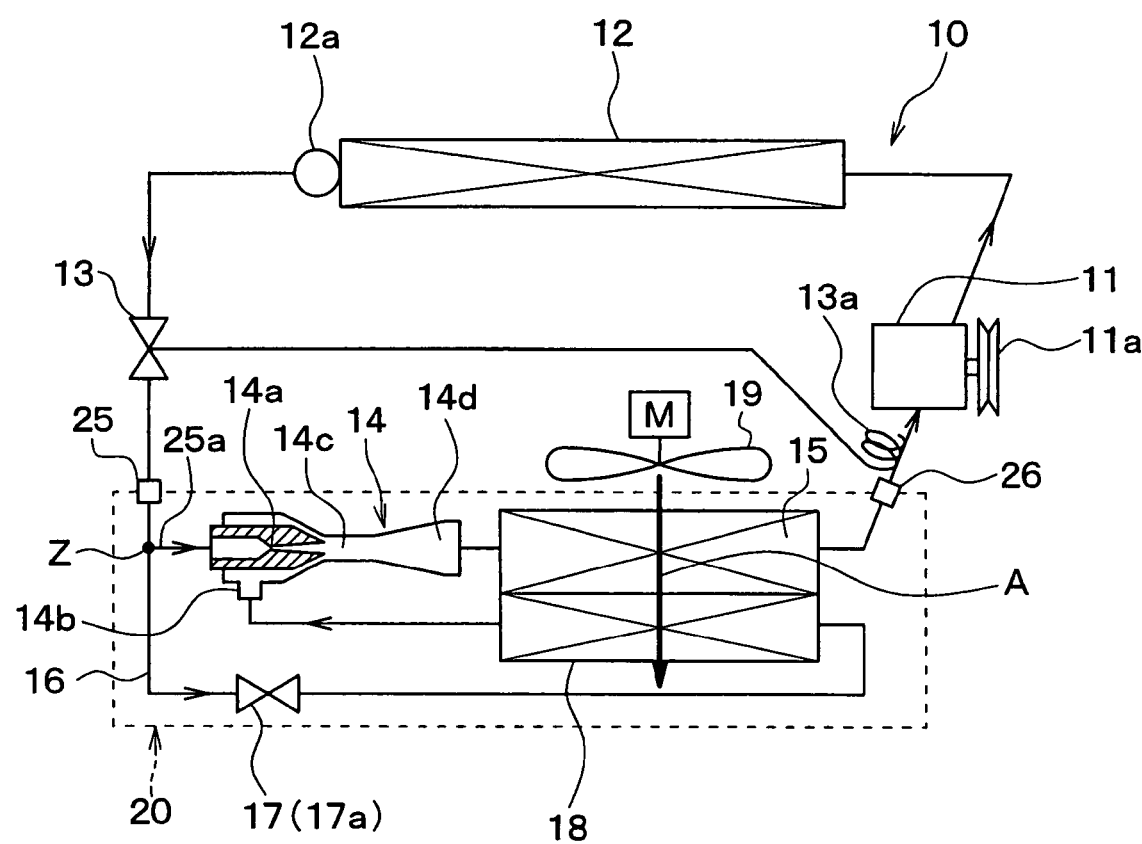
FIG. 1 is a refrigerant circuit diagram of an ejector type refrigeration cycle for a vehicle according to a first embodiment of the present invention.
Figure 2:
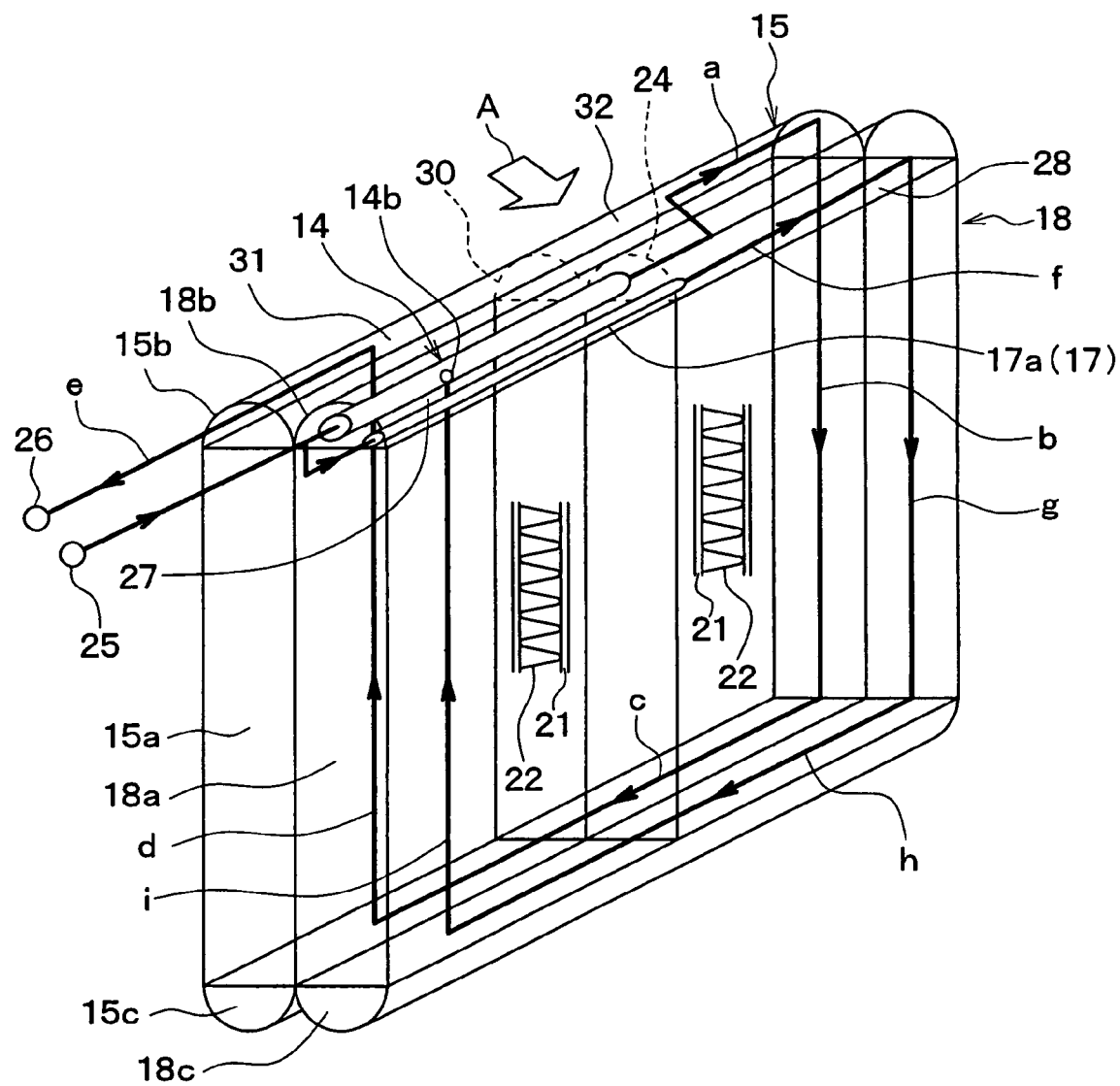
FIG. 2 is a perspective view to show the schematic construction of an integrated unit according to the first embodiment.
Figure 3:
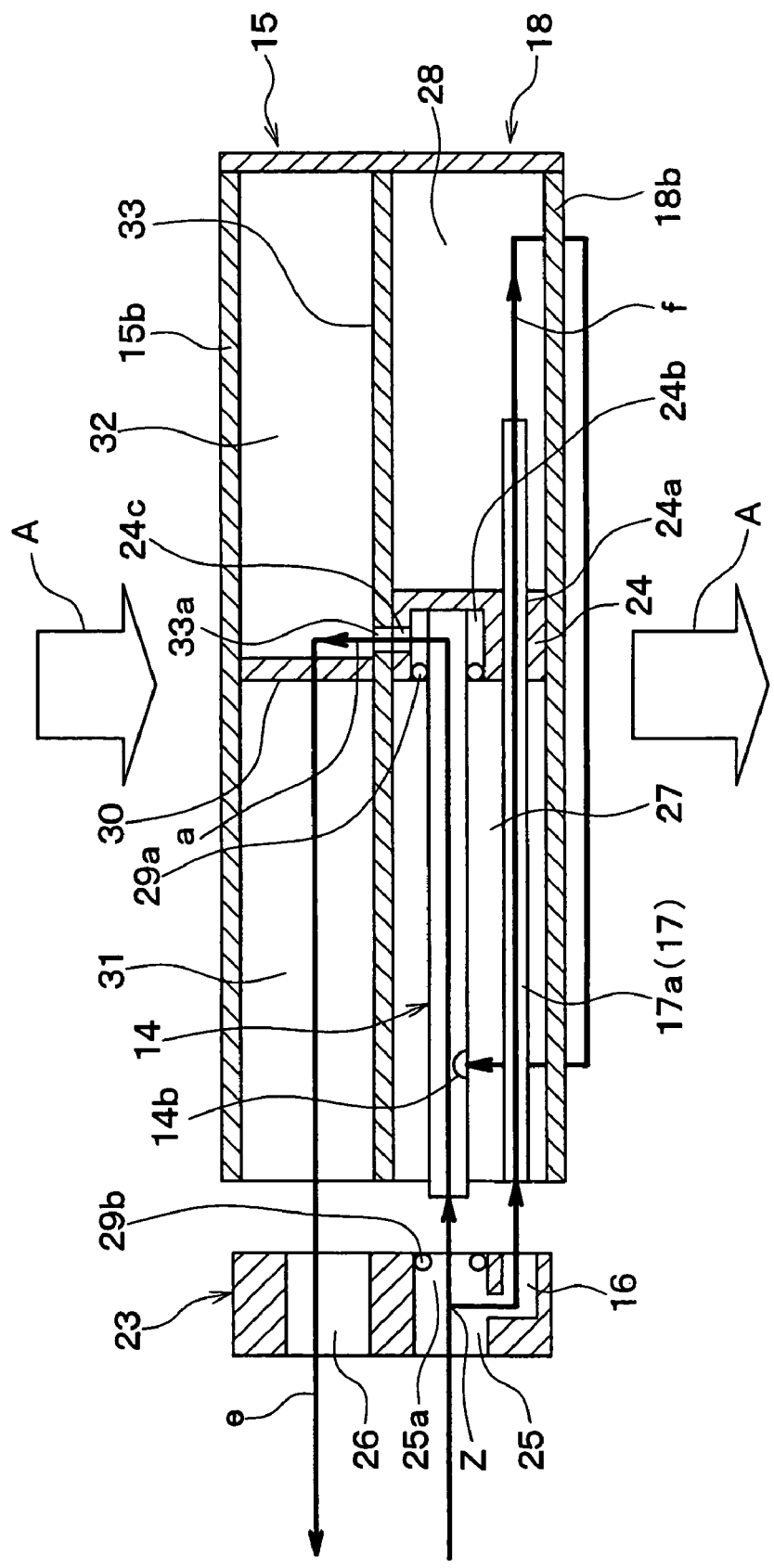
FIG. 3 is a longitudinal sectional view of an evaporator tank of the integrated unit in FIG. 2.
Figure 4:
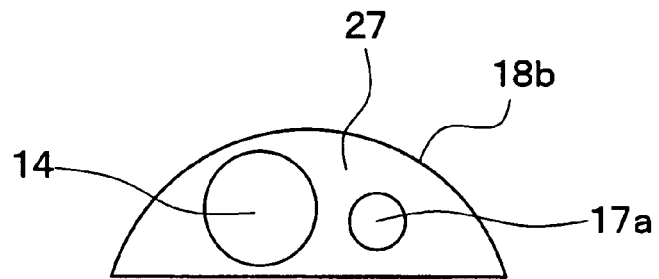
FIG. 4 is a lateral sectional view of the evaporator tank of the integrated unit in FIG. 2.
Figure 5:
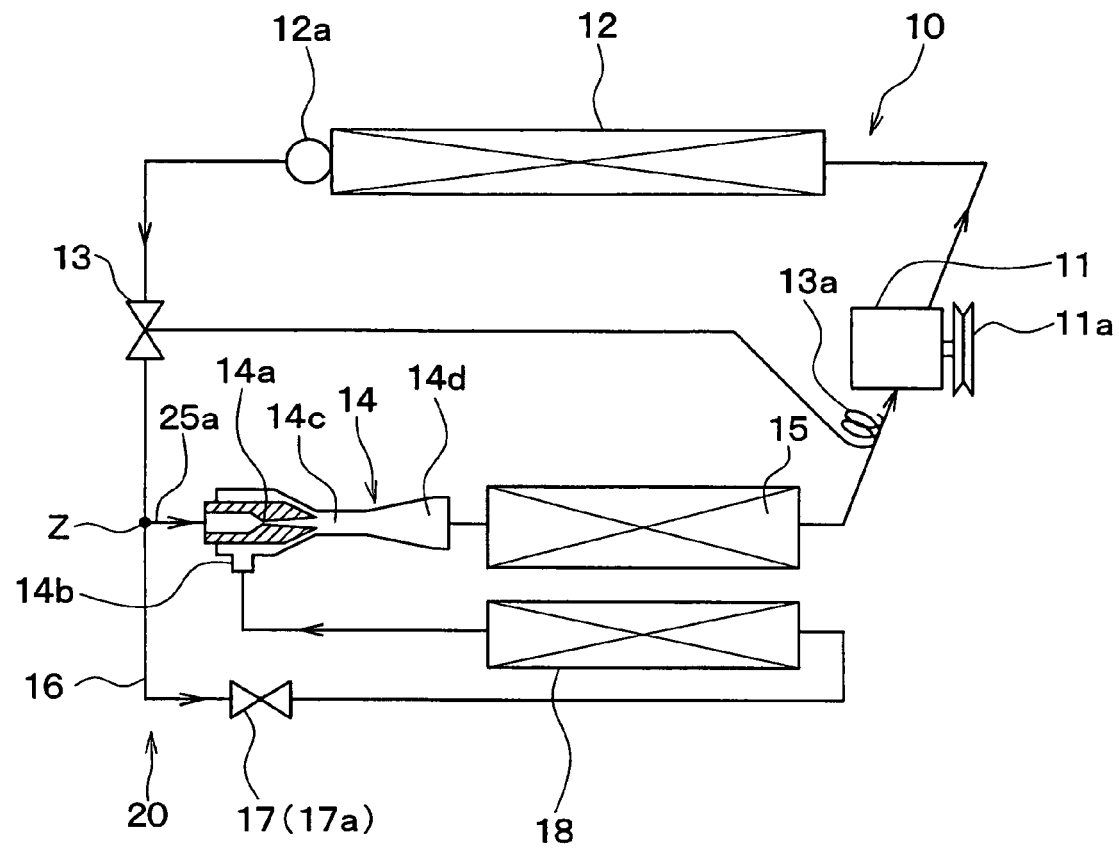
FIG. 5 is a refrigerant circuit diagram of an ejector type refrigeration cycle of a comparative example.
Figure 6:
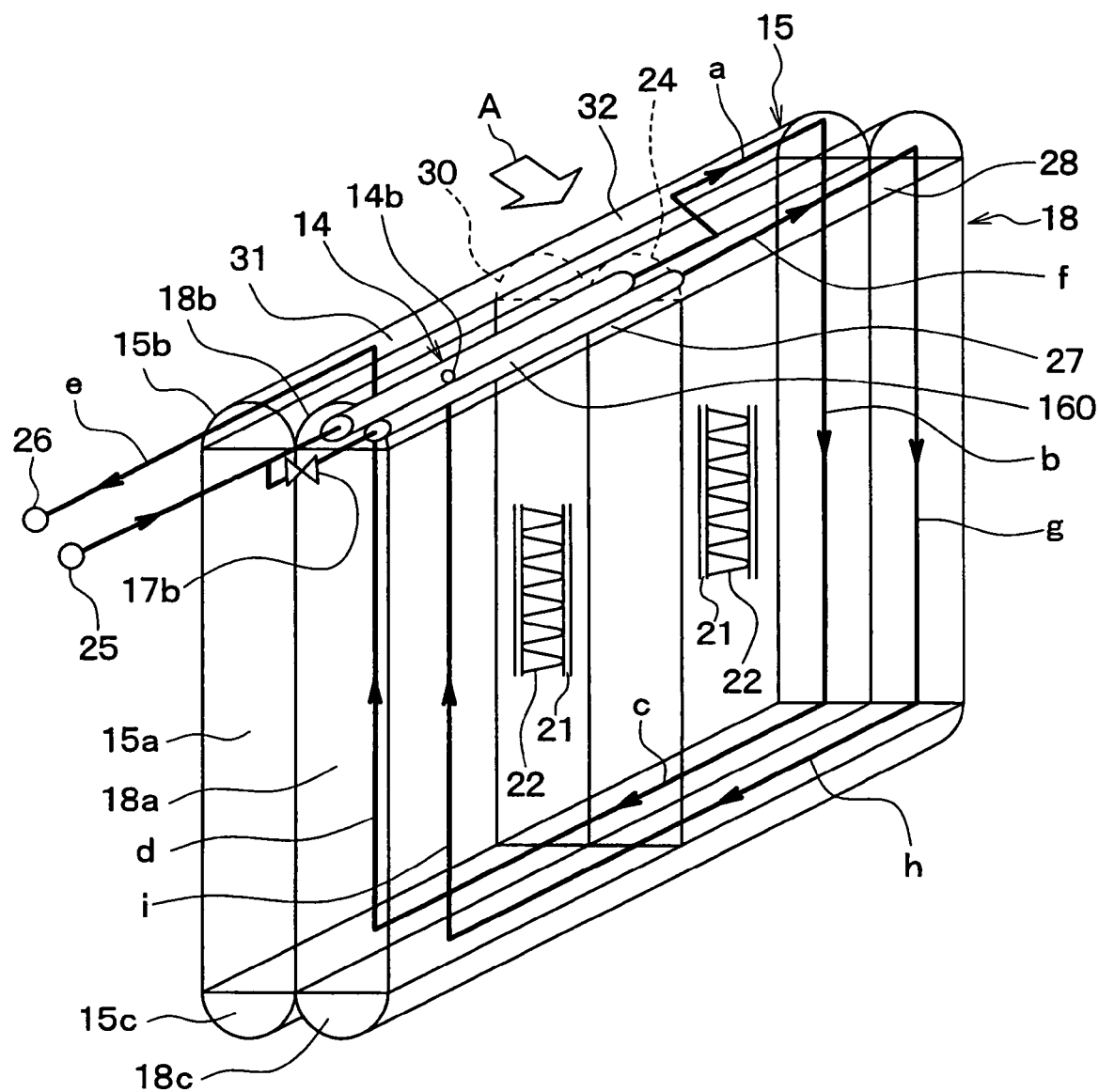
FIG. 6 is a perspective view to show the schematic construction of an integrated unit according to a second embodiment.
Figure 7:
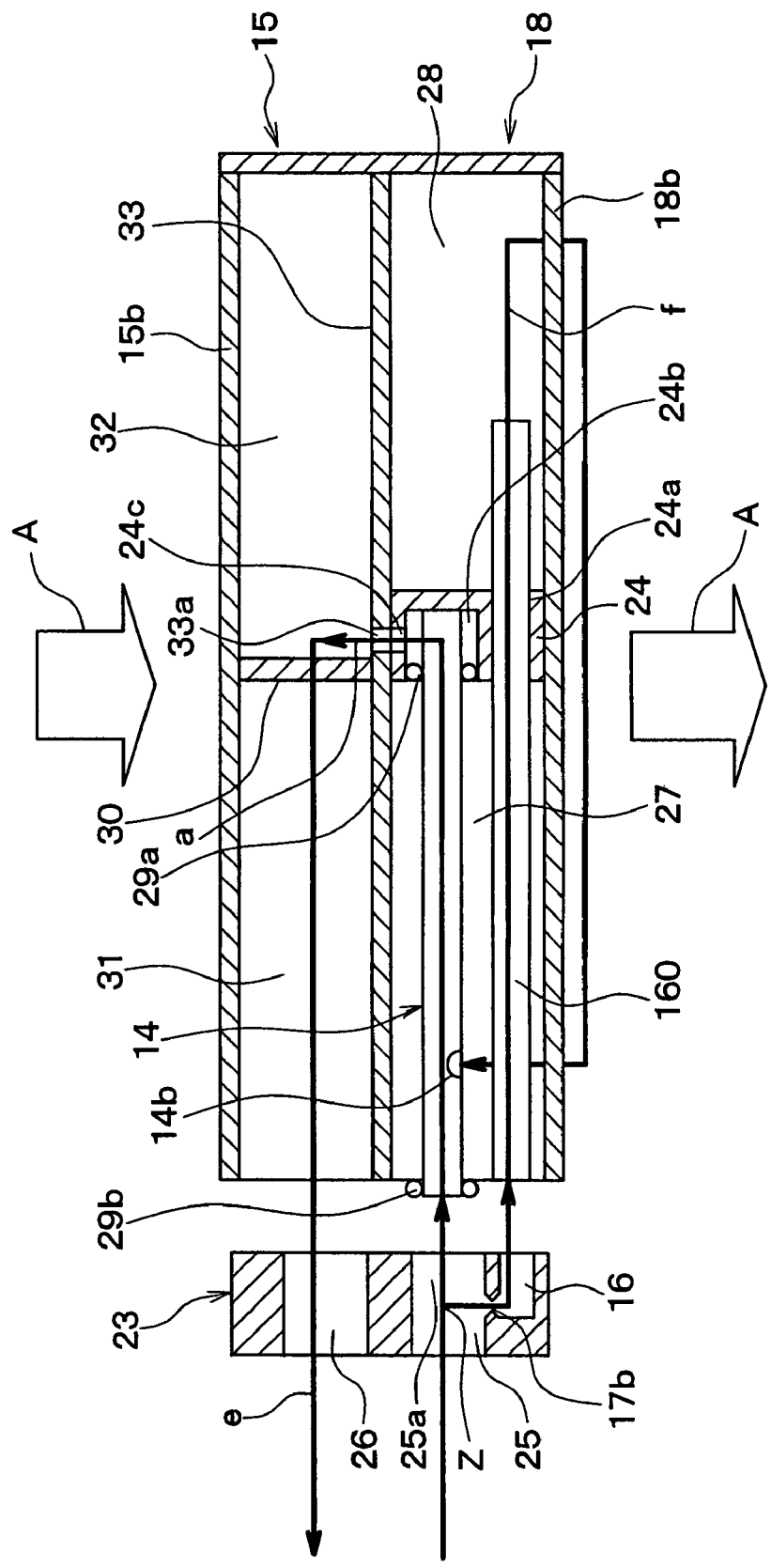
FIG. 7 is a longitudinal sectional view of an evaporator tank of the integrated unit in FIG. 6.
Figure 8:
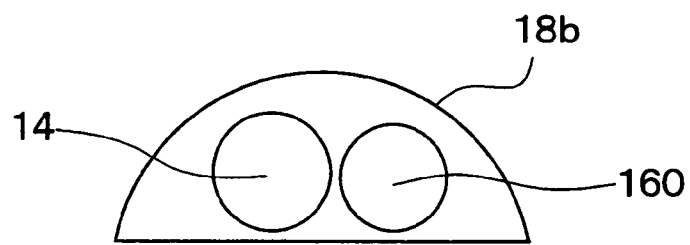
FIG. 8 is a lateral sectional view of the evaporator tank of the integrated unit in FIG. 6.
Figure 9:
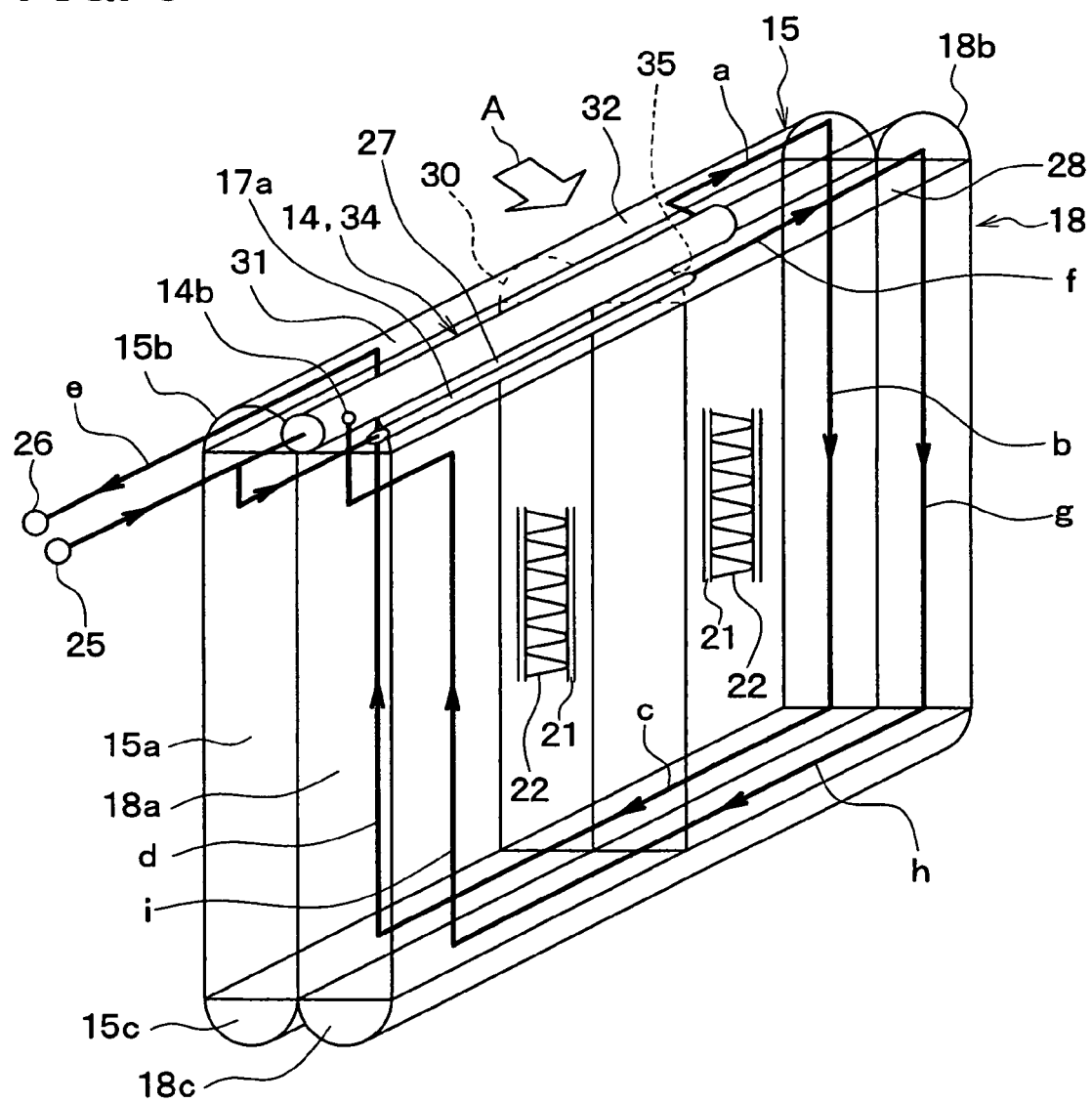
FIG. 9 is a perspective view to show the schematic construction of an integrated unit according to a third embodiment.
Figure 10:
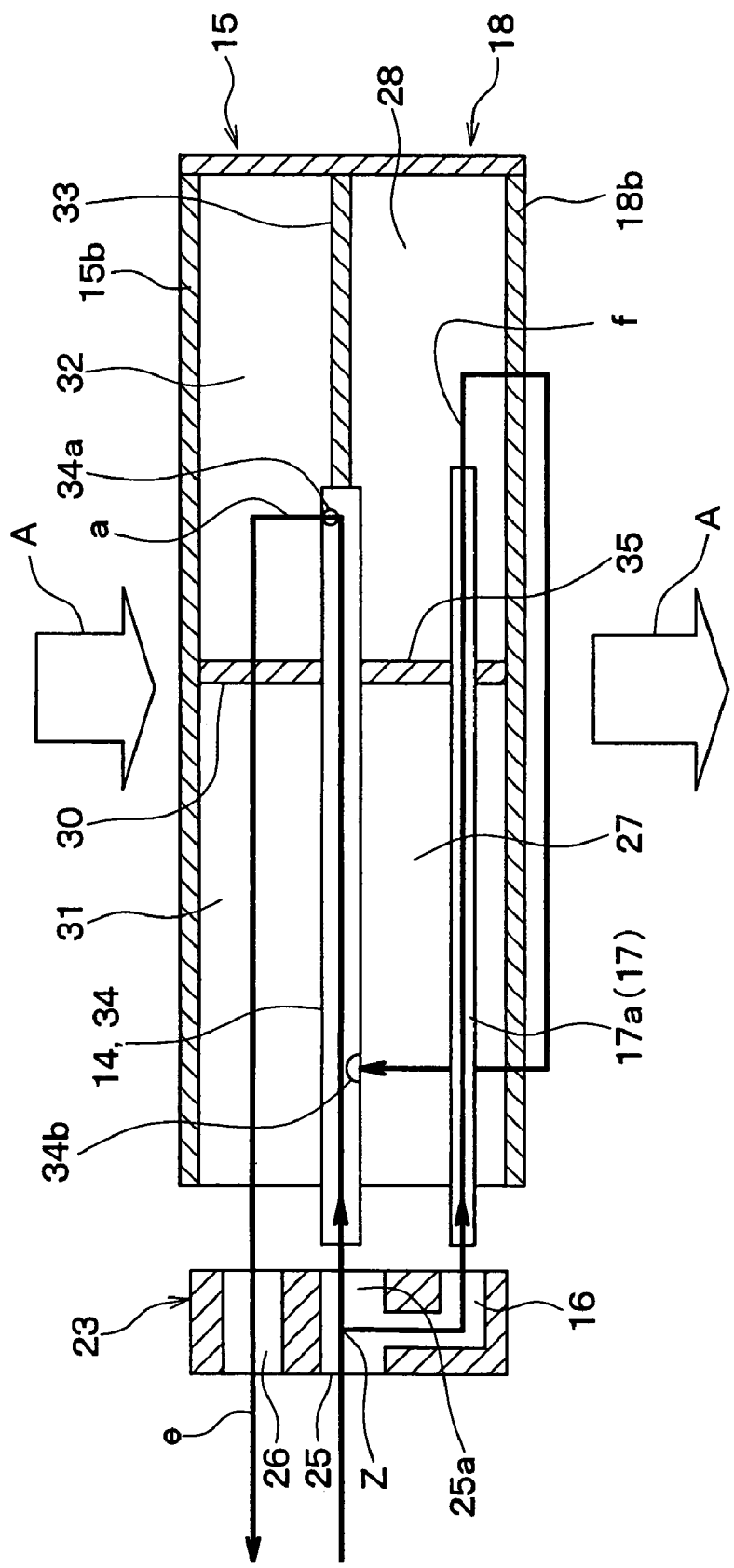
FIG. 10 is a longitudinal sectional view of an evaporator tank of the integrated unit in FIG. 9.
Figure 11:
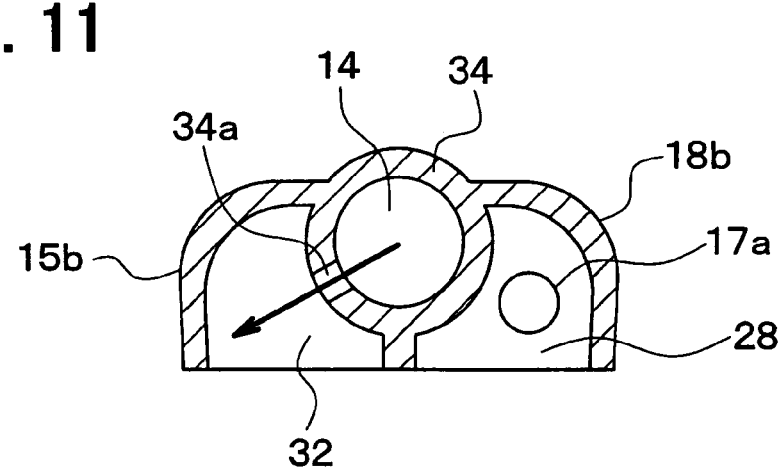
FIG. 11 is a lateral sectional view of the evaporator tank of the integrated unit in FIG. 9.
Figure 12:
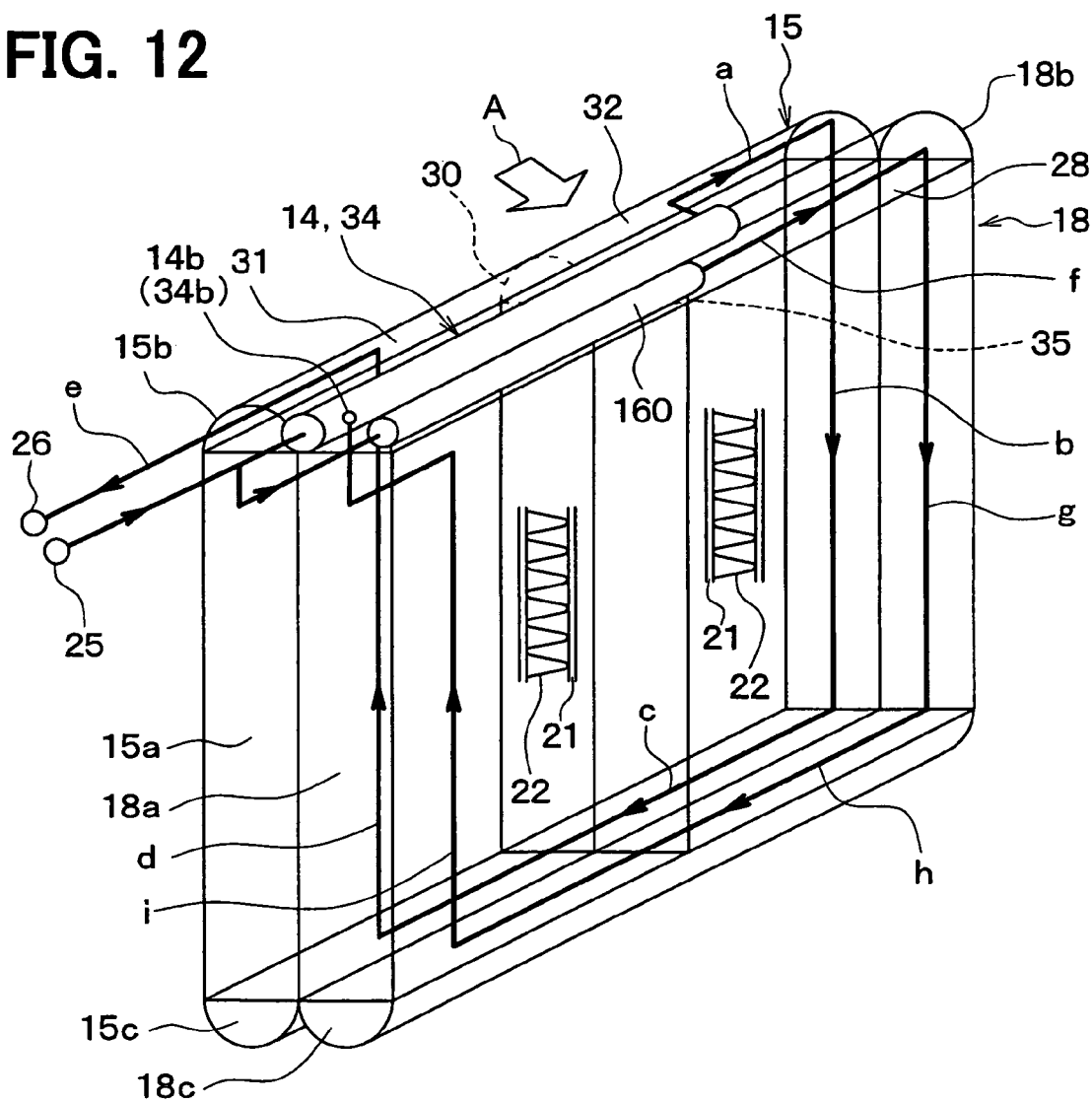
FIG. 12 is a perspective view to show the schematic construction of an integrated unit according to a 4th embodiment.
Figure 13:
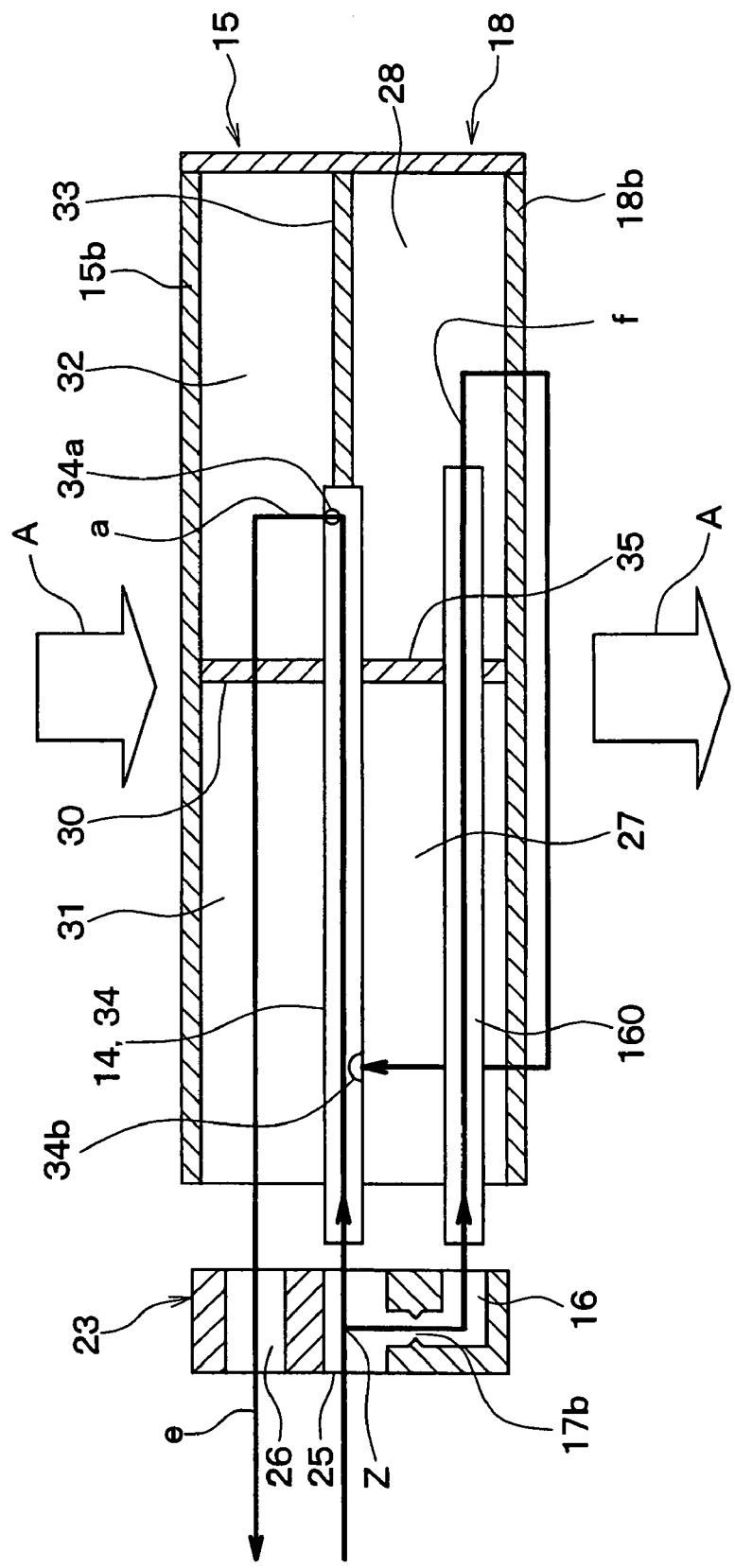
FIG. 13 is a longitudinal sectional view of an evaporator tank of the integrated unit in FIG. 12.
Figure 14:
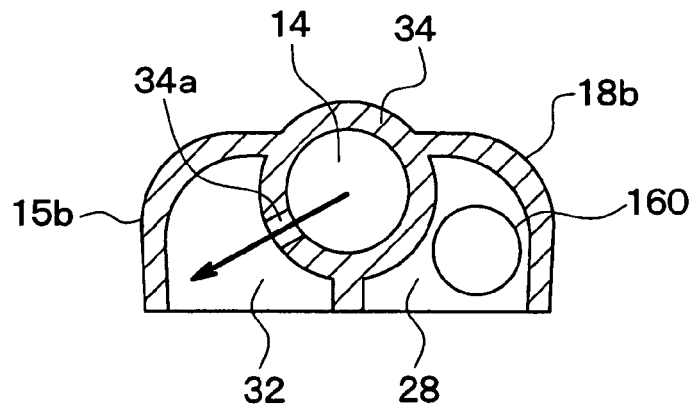
FIG. 14 is a side view of the evaporator tank when viewed from a side shown by an arrow A in FIG. 13.
Figure 15:
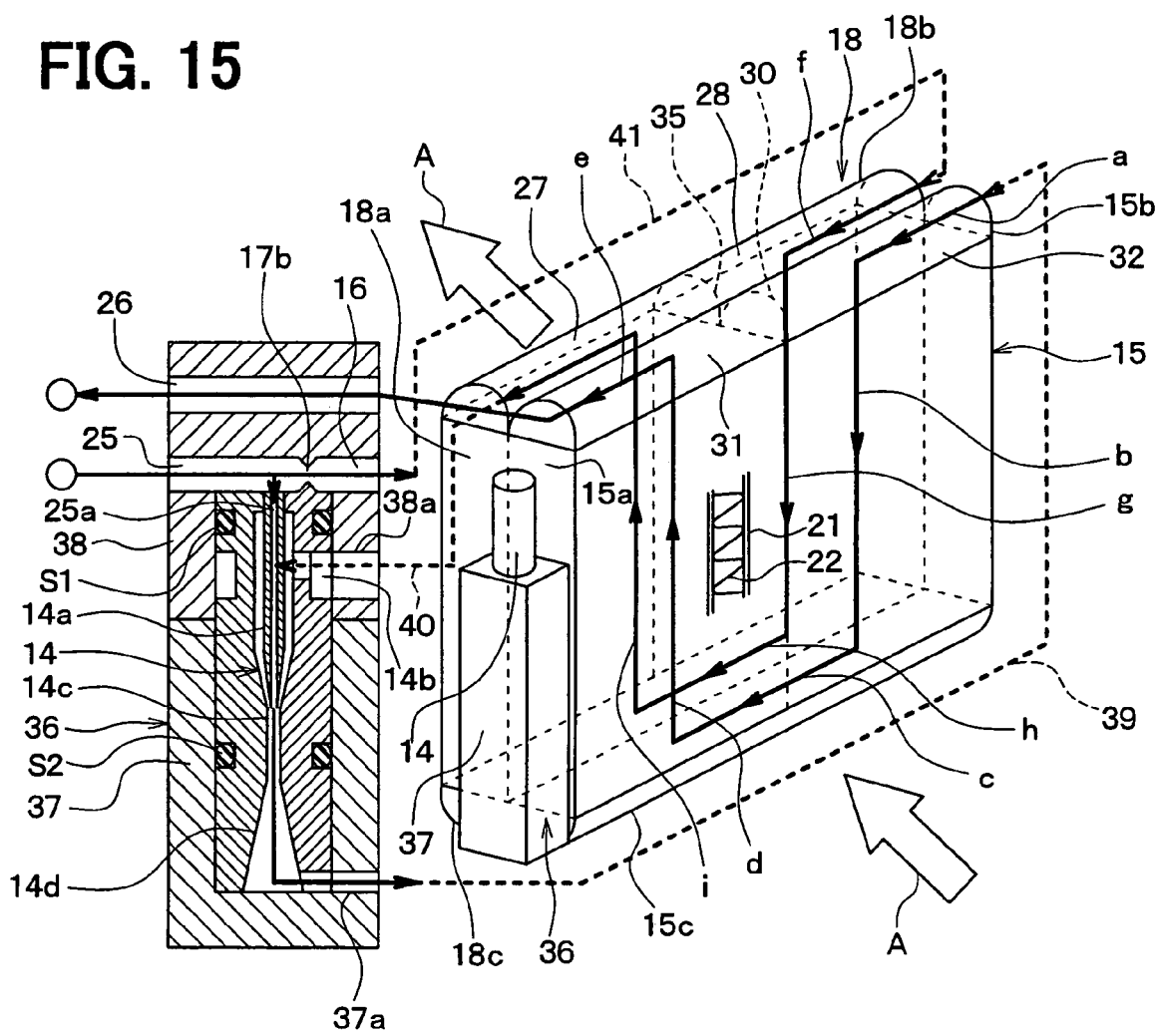
FIG. 15 is a perspective view to show the schematic construction of an integrated unit according to a 5th embodiment and is combined with a sectional view of an external cassette part.
Figure 16:
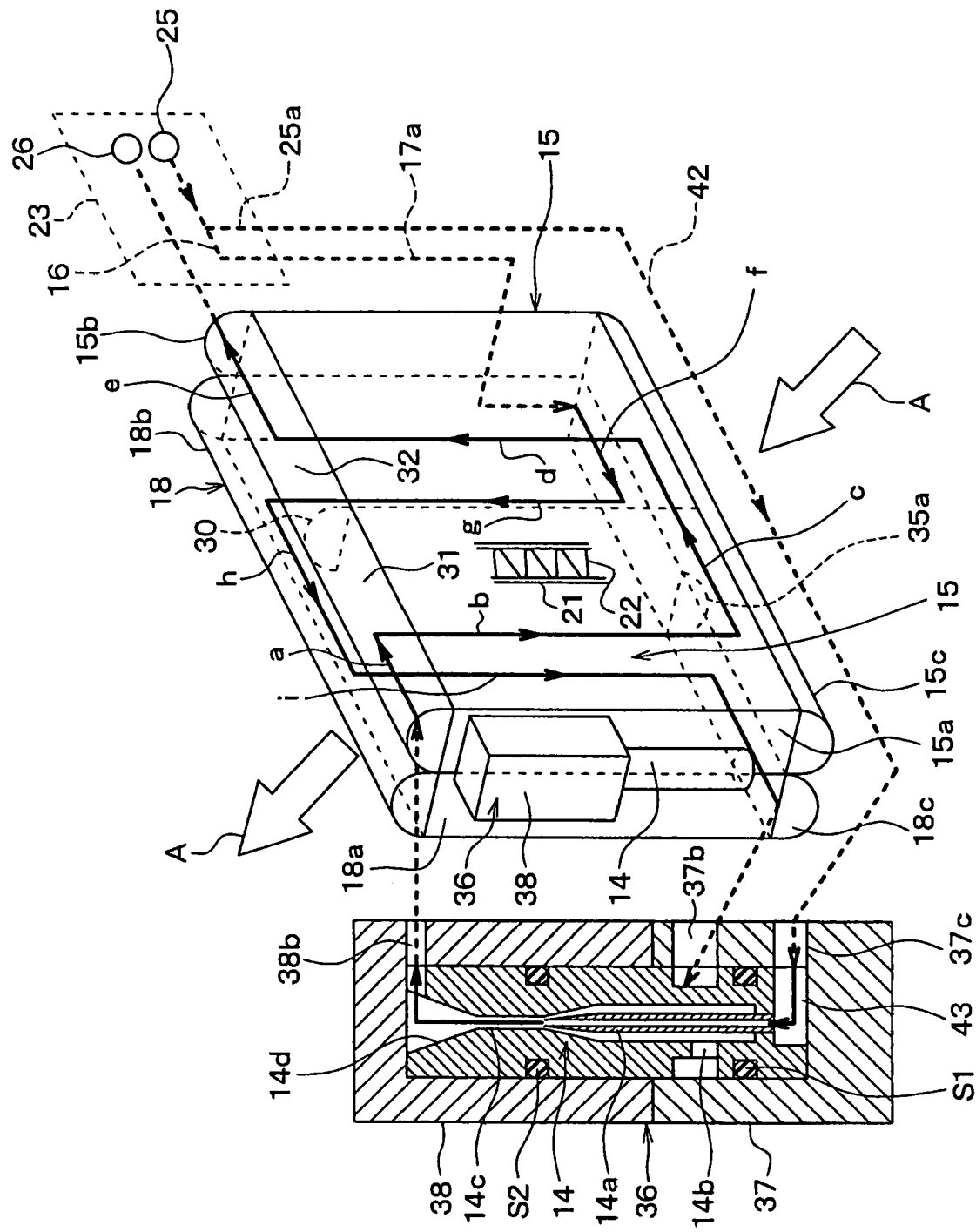
FIG. 16 is a perspective view to show the schematic construction of an integrated unit according to a 6th embodiment and is combined with a sectional view of an external cassette part.
Figure 17:
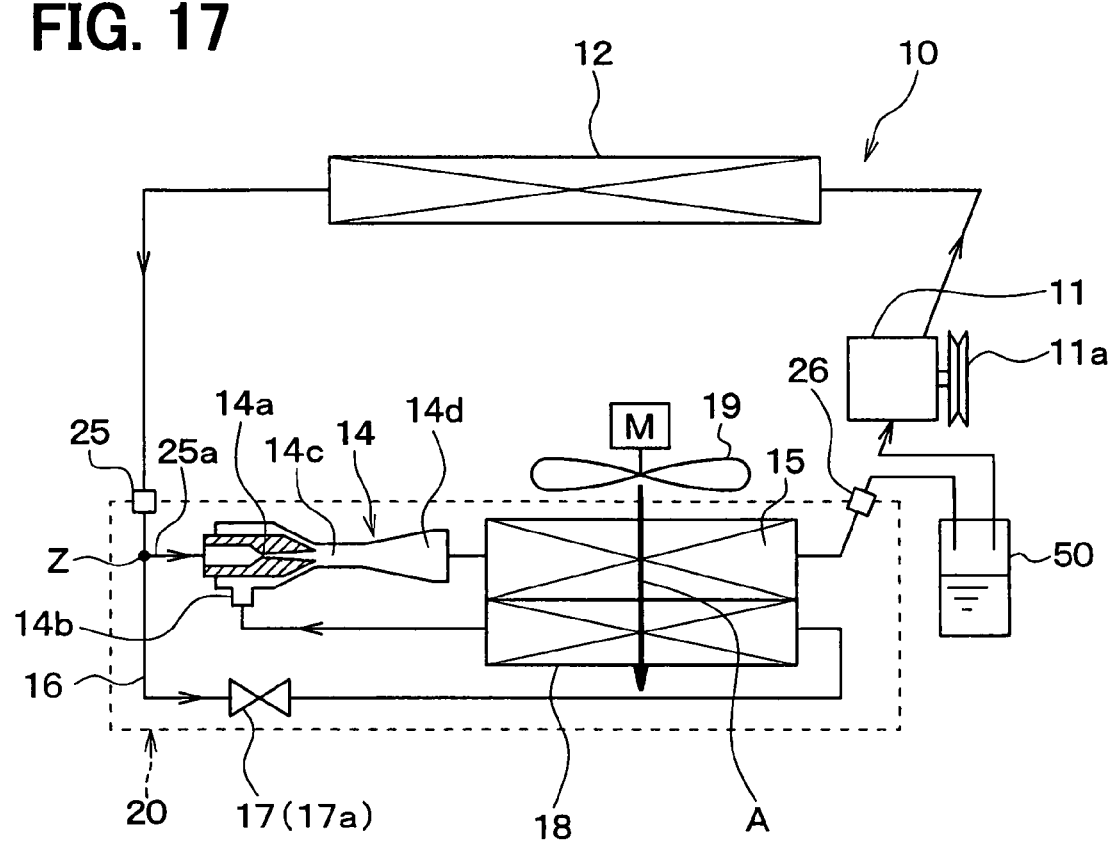
FIG. 17 is a refrigerant circuit diagram of an ejector type refrigeration cycle for a vehicle according to a 7th embodiment.
Figure 18:
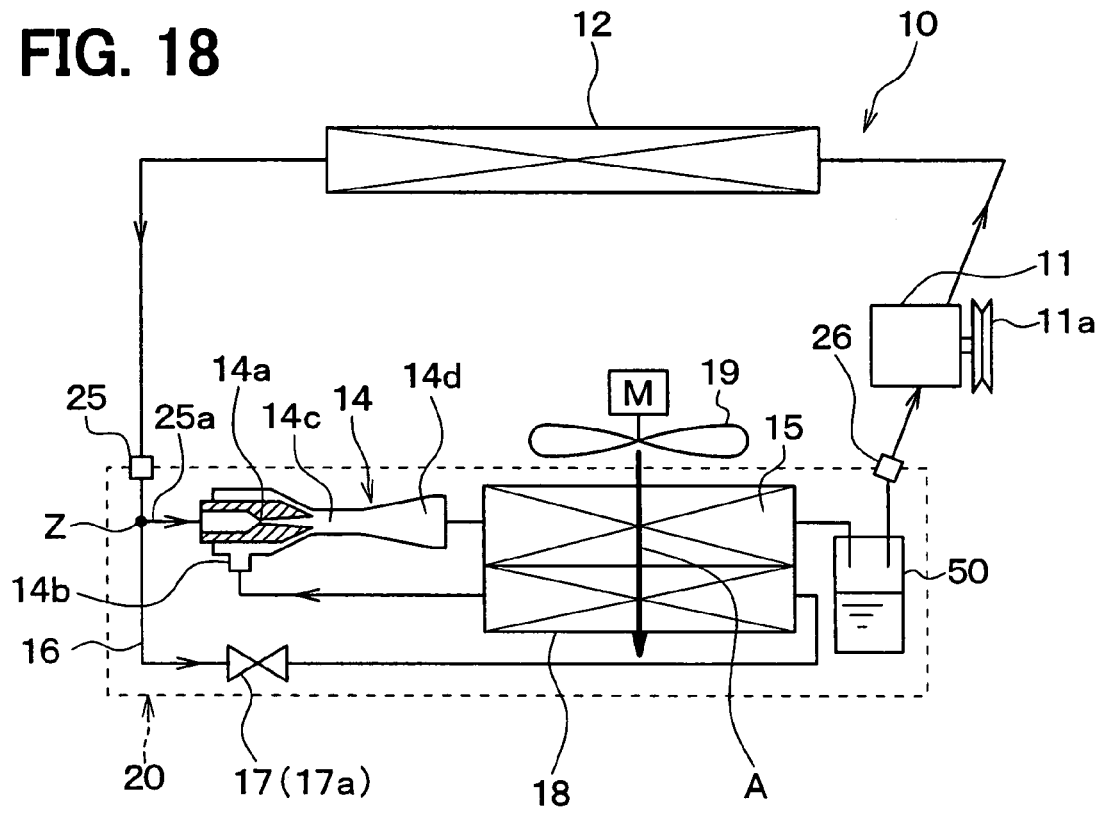
FIG. 18 is a refrigerant circuit diagram of an ejector type refrigeration cycle for a vehicle according to an 8th embodiment.
Figure 19:
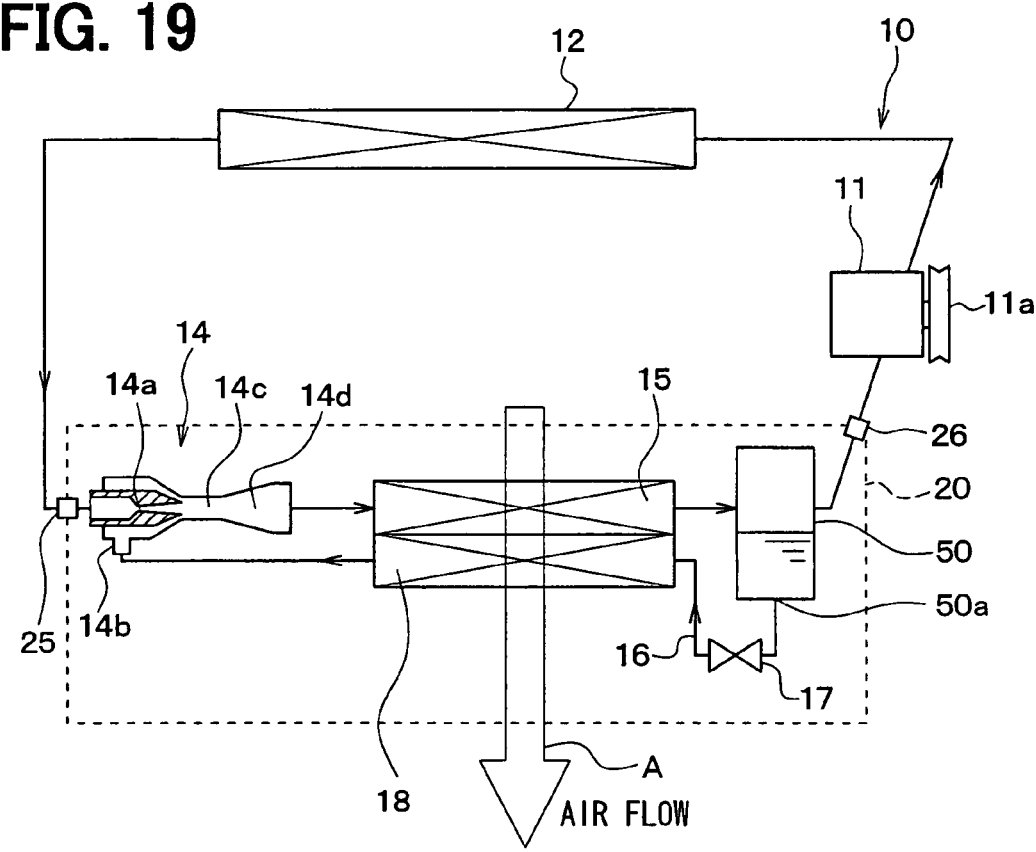
FIG. 19 is a refrigerant circuit diagram of an ejector type refrigeration cycle for a vehicle according to a 9th embodiment.
Figure 20:
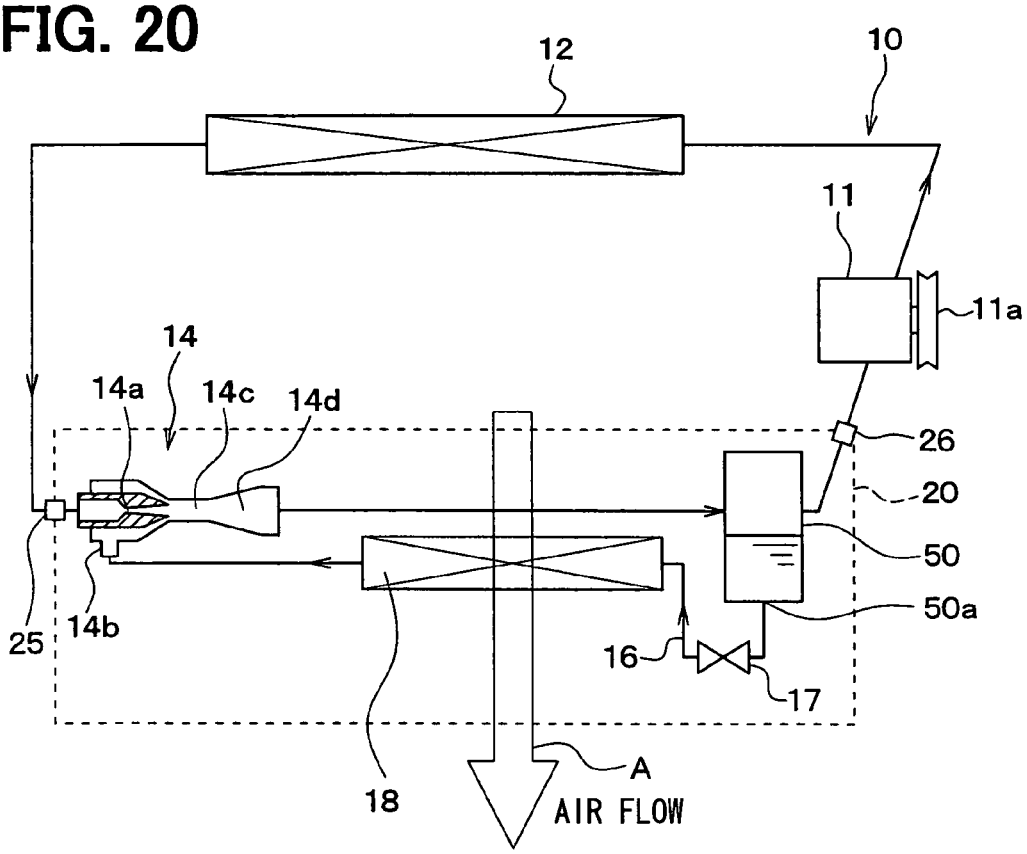
FIG. 20 is a refrigerant circuit diagram of an ejector type refrigeration cycle for a vehicle according to a 10th embodiment.
Figure 21:
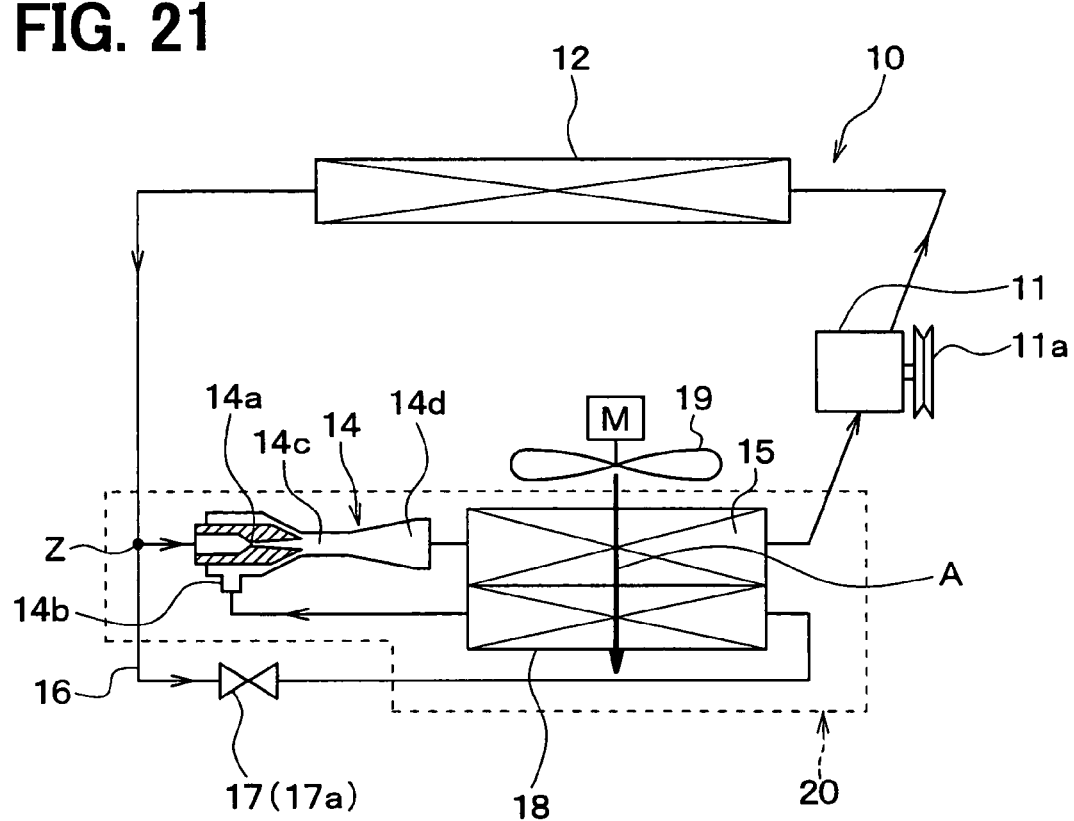
FIG. 21 is a refrigerant circuit diagram of an ejector type refrigeration cycle for a vehicle according to an 11th embodiment.
Figure 22:
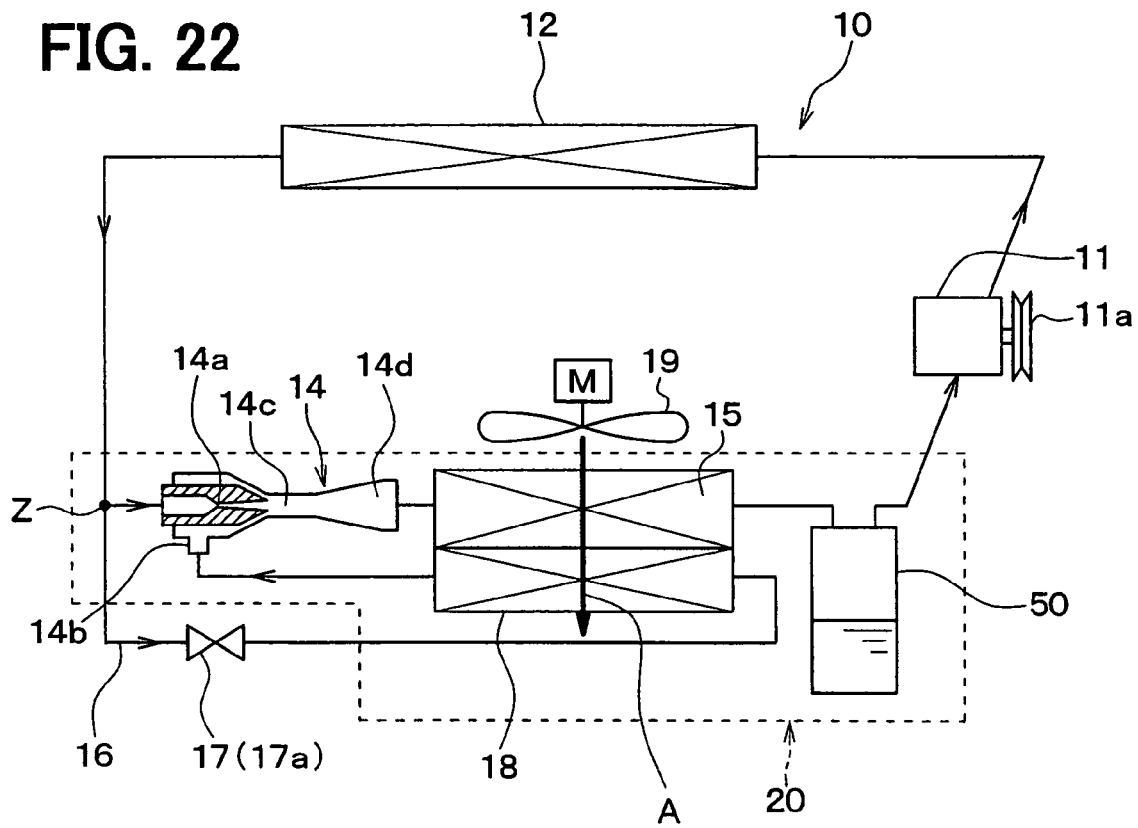
FIG. 22 is a refrigerant circuit diagram of an ejector type refrigeration cycle for a vehicle according to a 12th embodiment.
Figure 23:
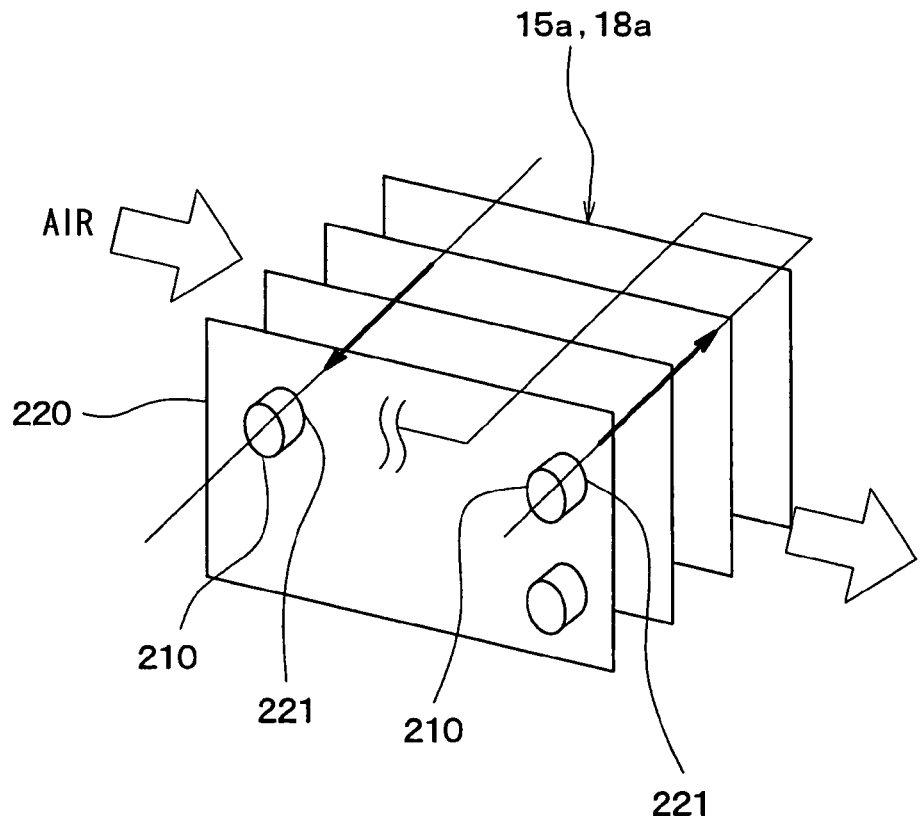
FIG. 23 is a schematic perspective view of an evaporator structure according to a 13th embodiment.
Figure 24:
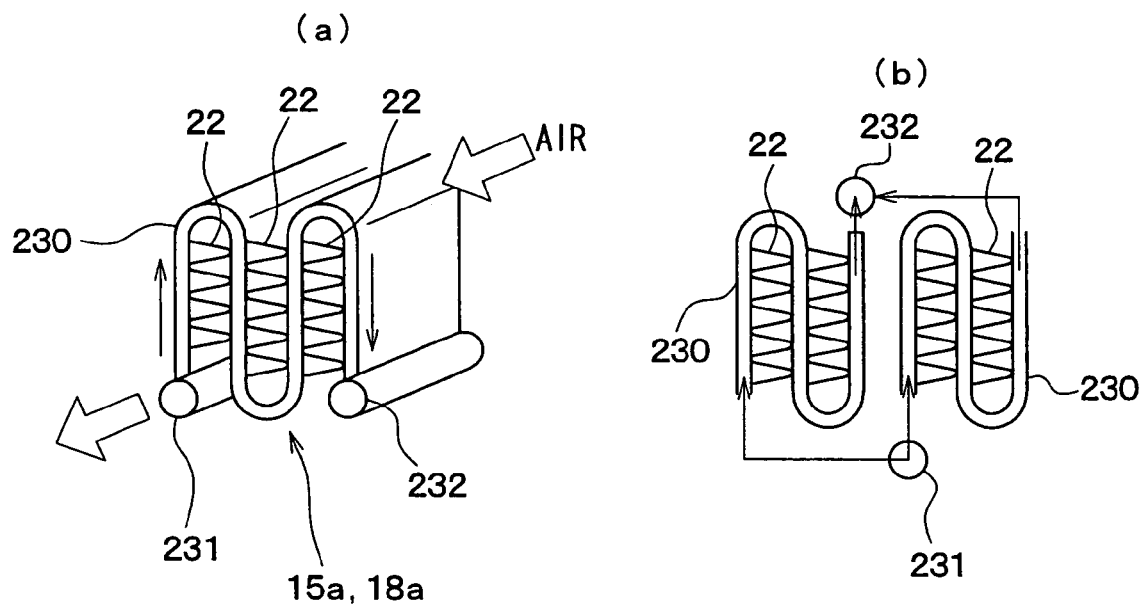
FIG. 24(*a*) is a schematic perspective view of the first example of an evaporator structure according to a 14th embodiment.
Figure 25:
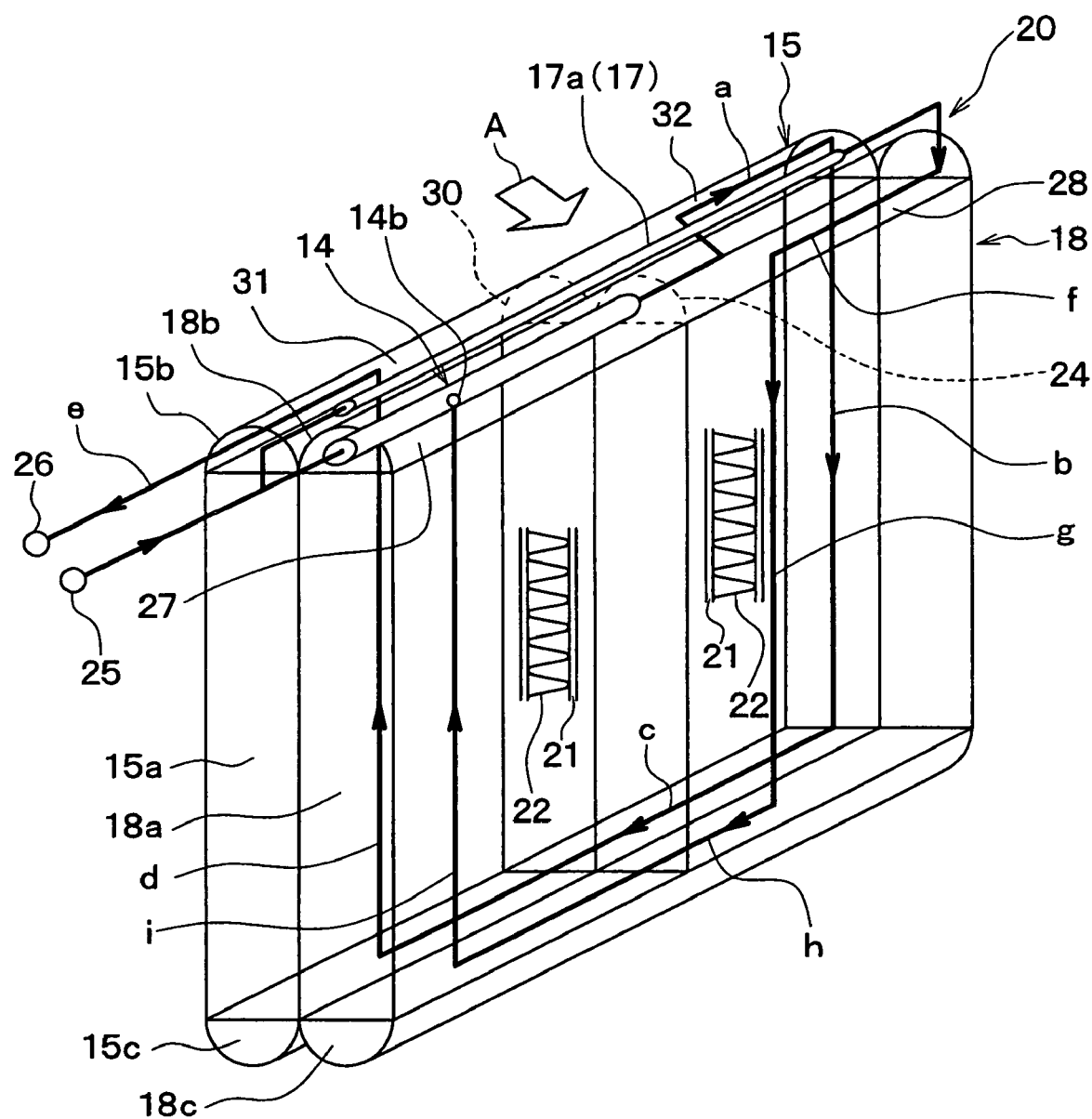
FIG. 25 is a perspective view to show the schematic construction of an integrated unit according to a 15th embodiment.
Figure 26:
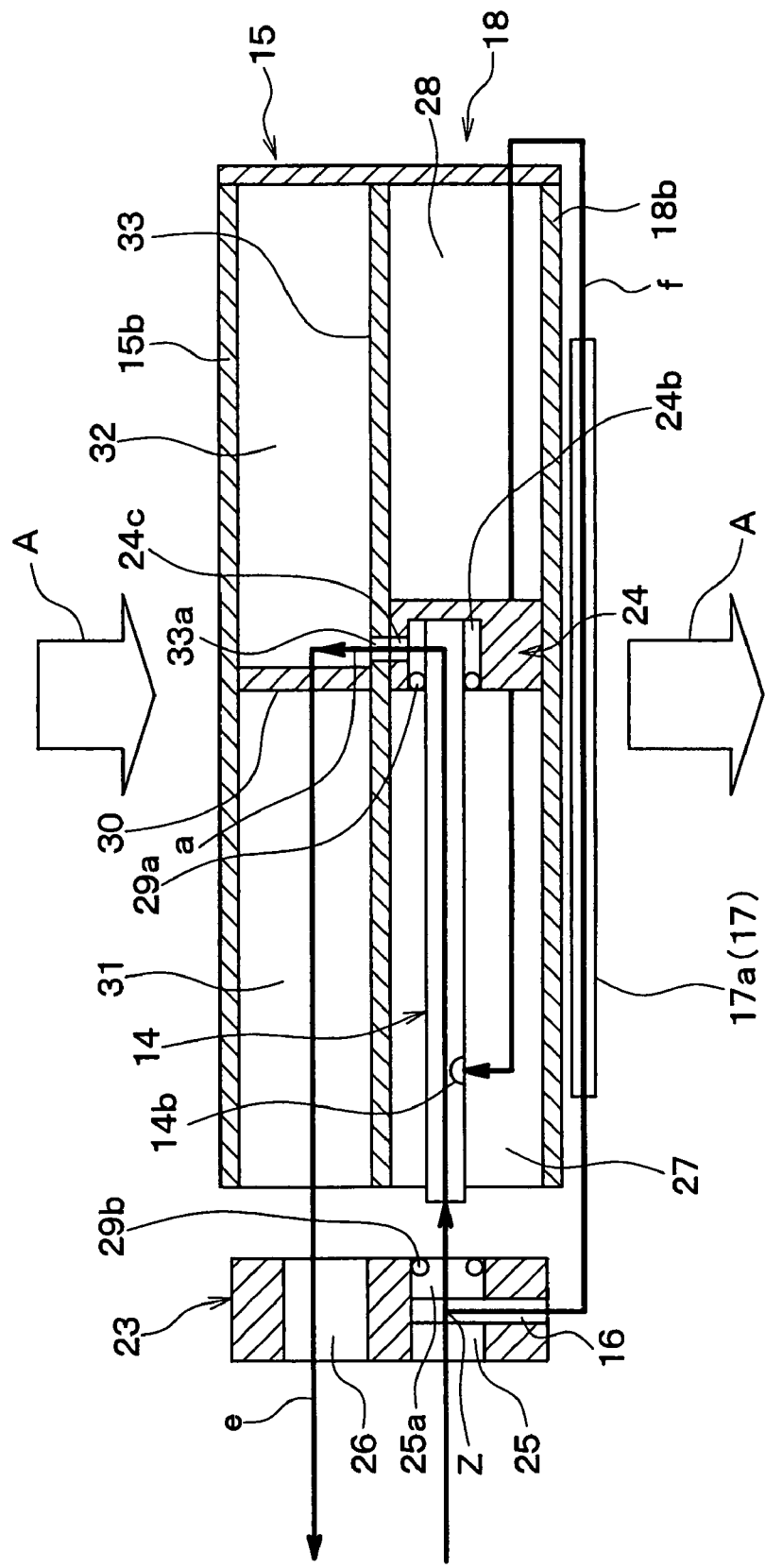
FIG. 26 is a longitudinal sectional view of an evaporator tank of the integrated unit in FIG. 25.
Figure 27:
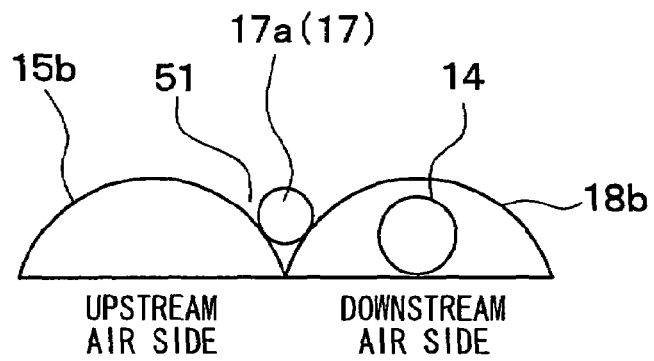
FIG. 27 is a lateral sectional view of the evaporator tank of the integrated unit in FIG. 25.
Figure 28:
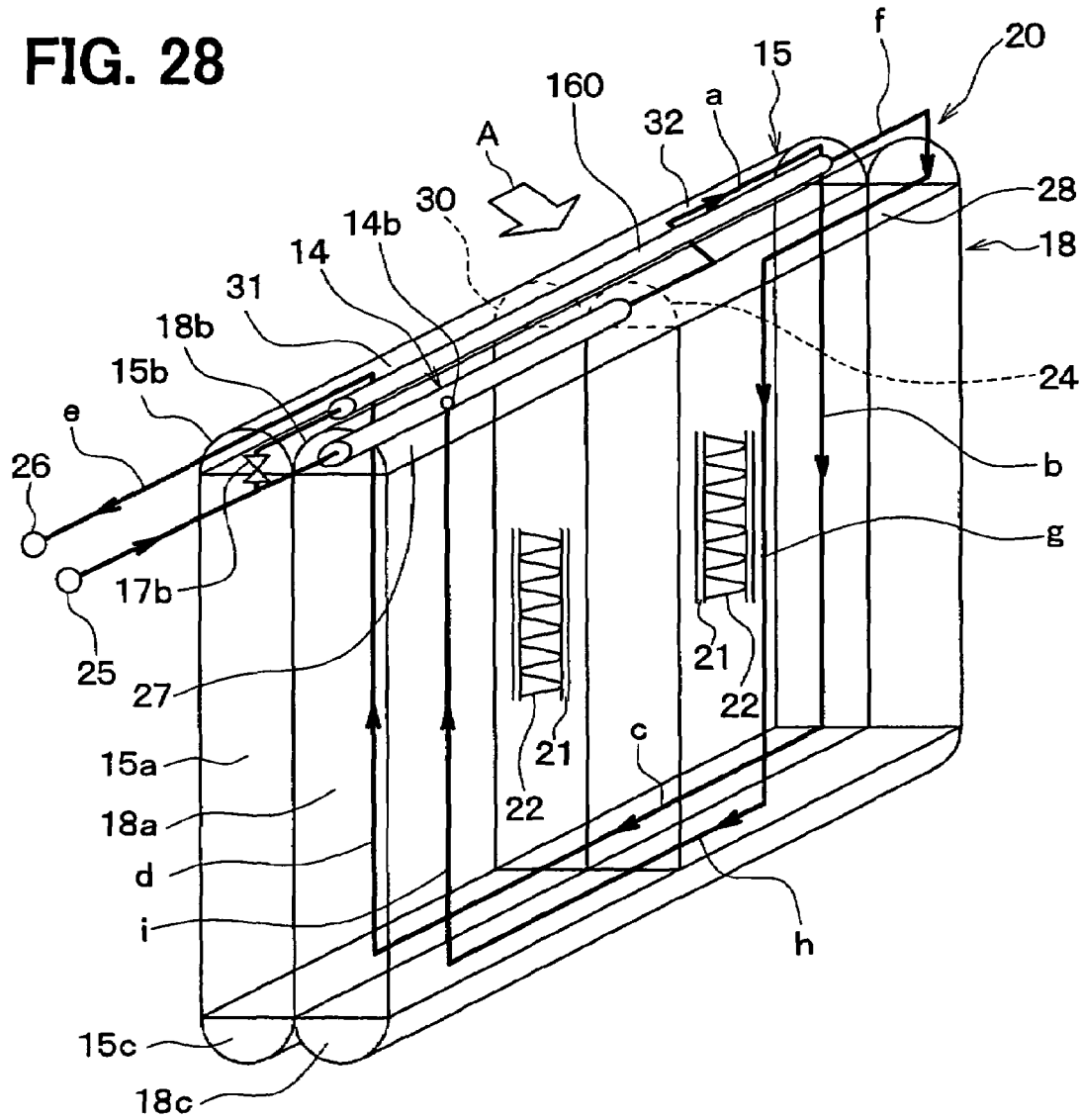
FIG. 28 is a perspective view to show the schematic construction of an integrated unit according to a 16th embodiment.
Figure 29:
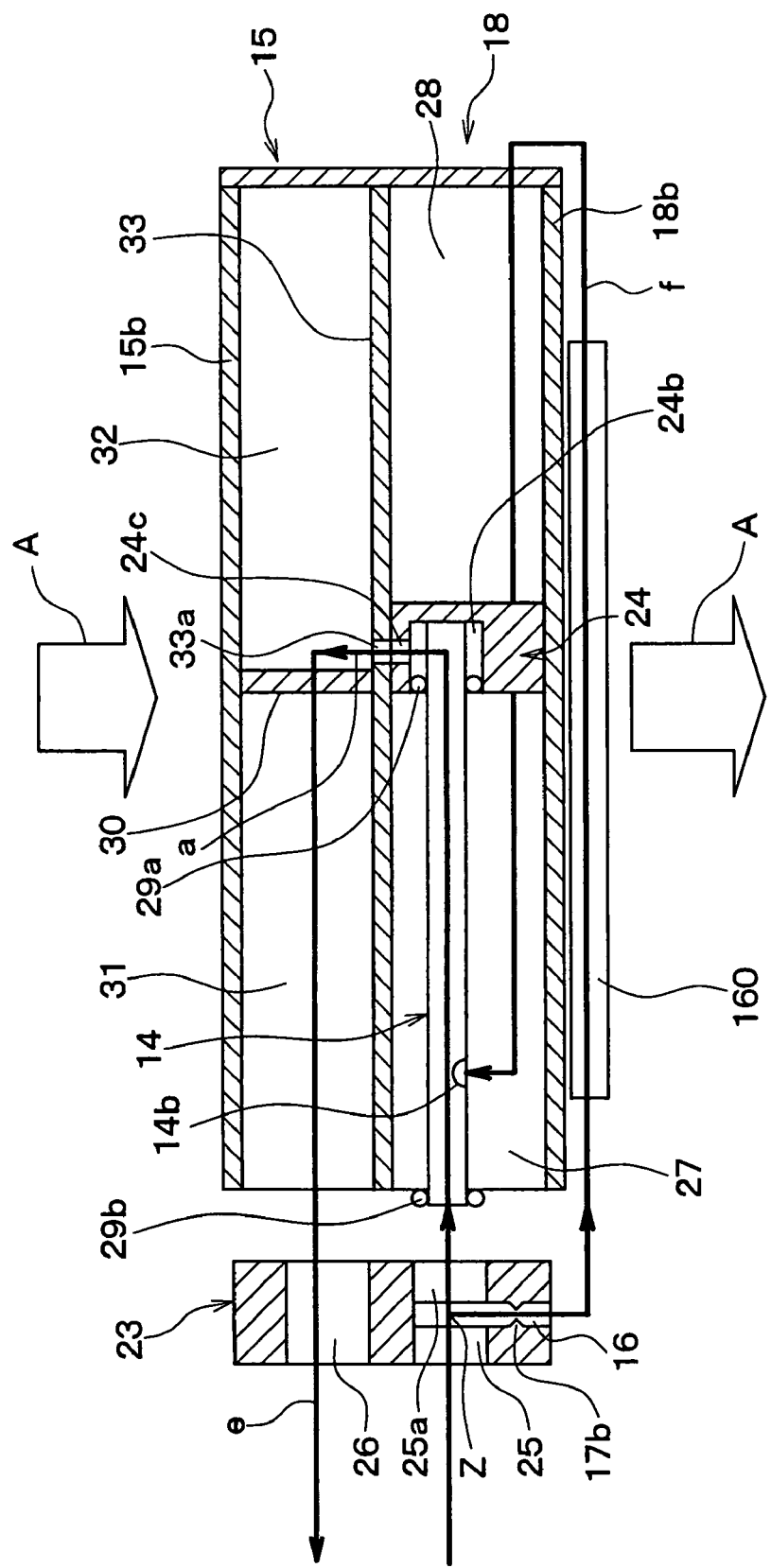
FIG. 29 is a longitudinal sectional view of an evaporator tank of the integrated unit in FIG. 28.
Figure 30:
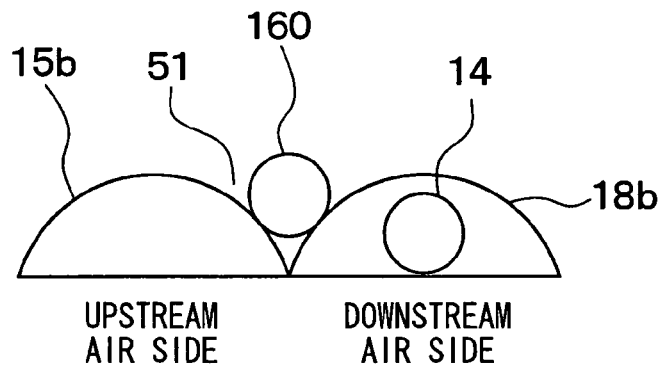
FIG. 30 is a lateral sectional view of the evaporator tank of the integrated unit in FIG. 28.
Figure 31:
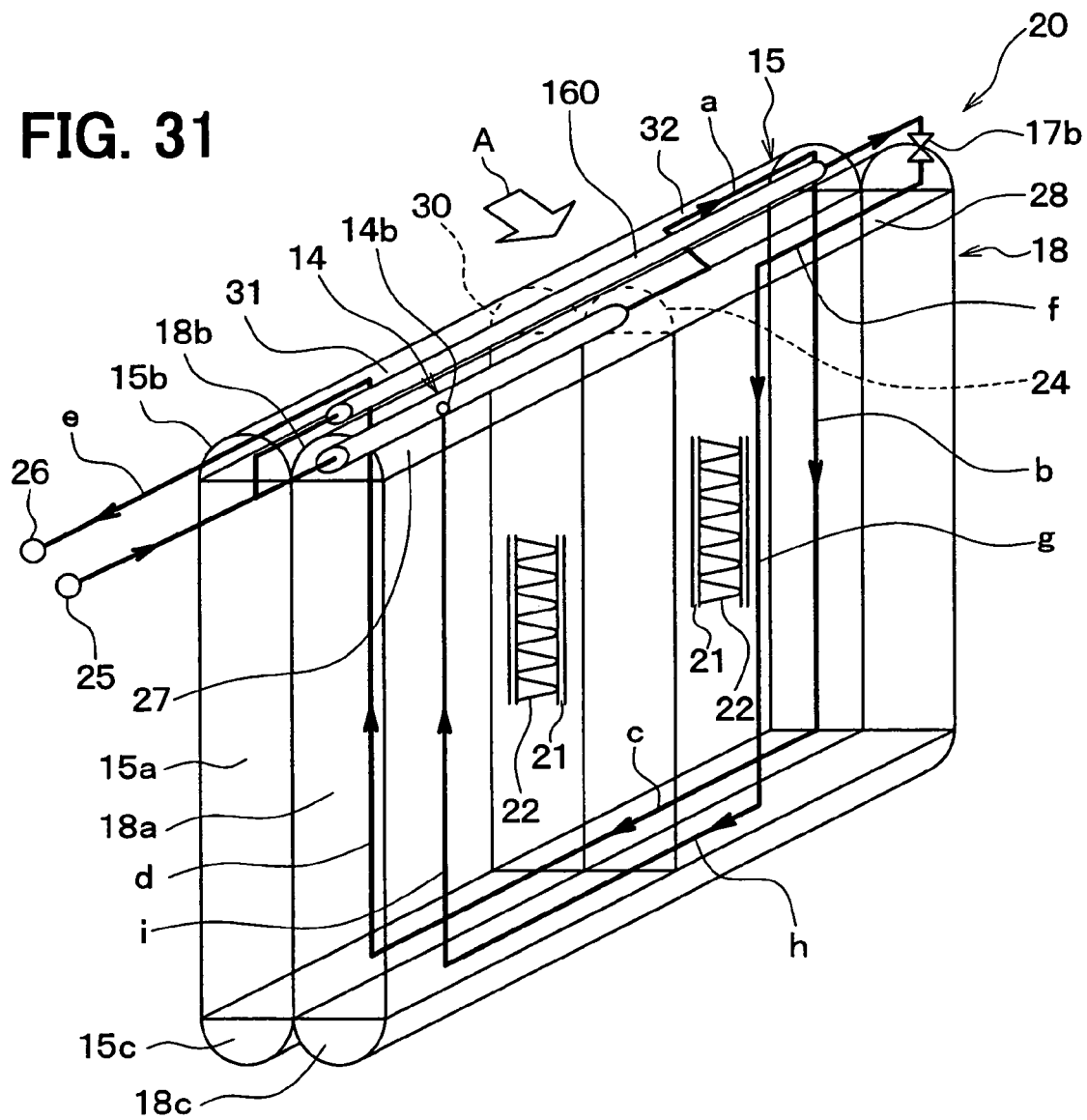
FIG. 31 is a perspective view to show the schematic construction of an integrated unit according to a 17th embodiment.
Figure 32:
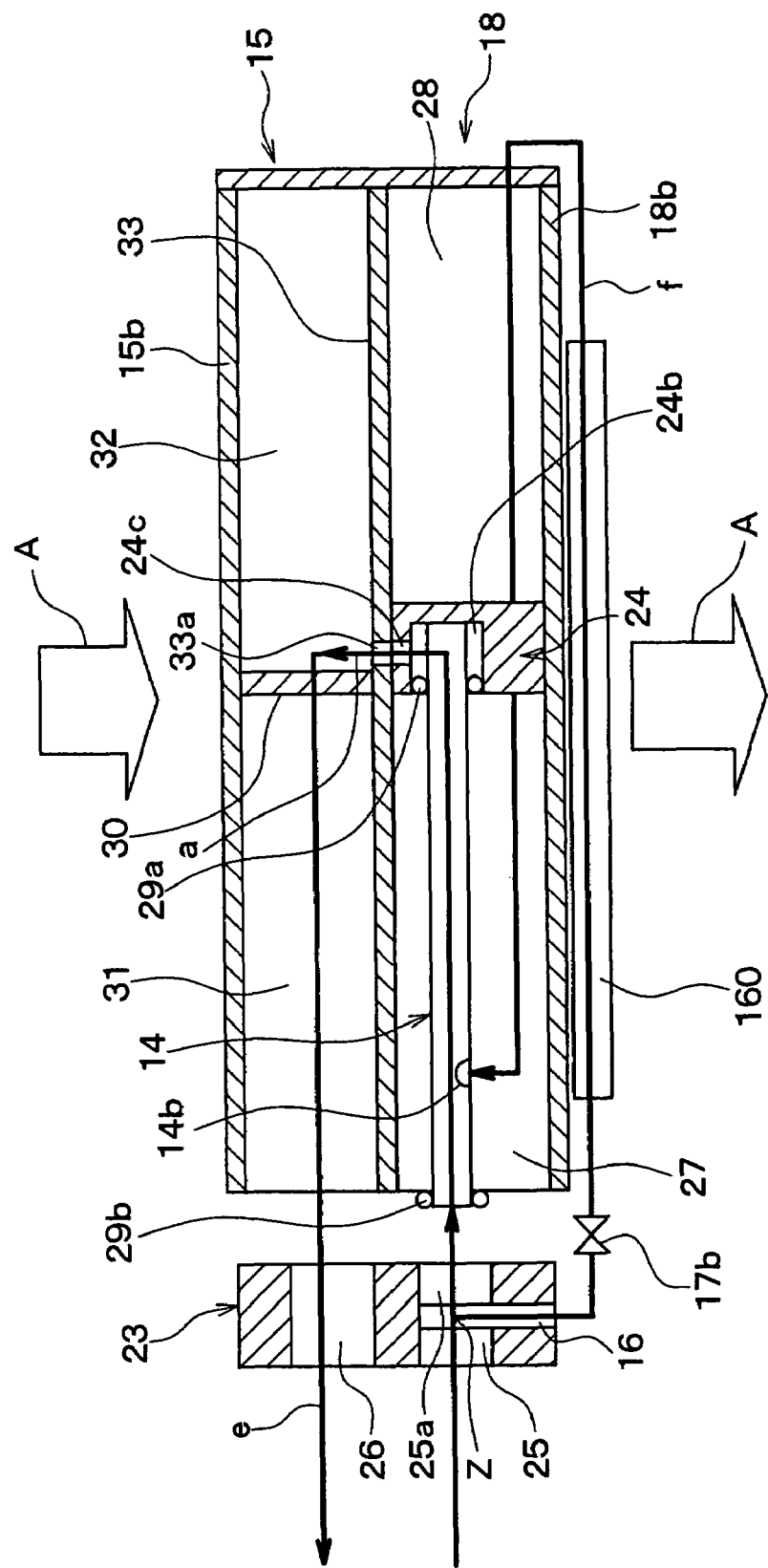
FIG. 32 is a longitudinal sectional view of an evaporator tank of the integrated unit in FIG. 31.
Figure 33:
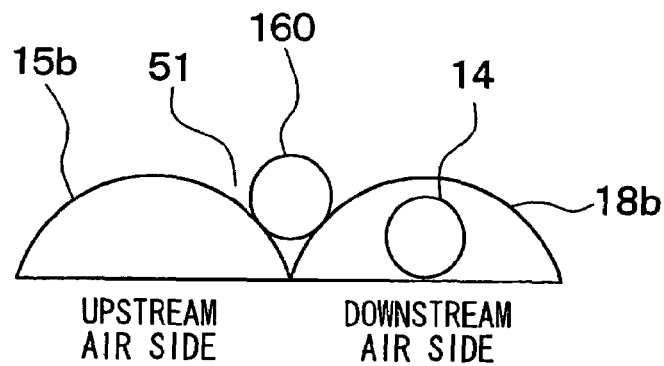
FIG. 33 is a lateral sectional view of the evaporator tank of the integrated unit in FIG. 31.
Figure 34:
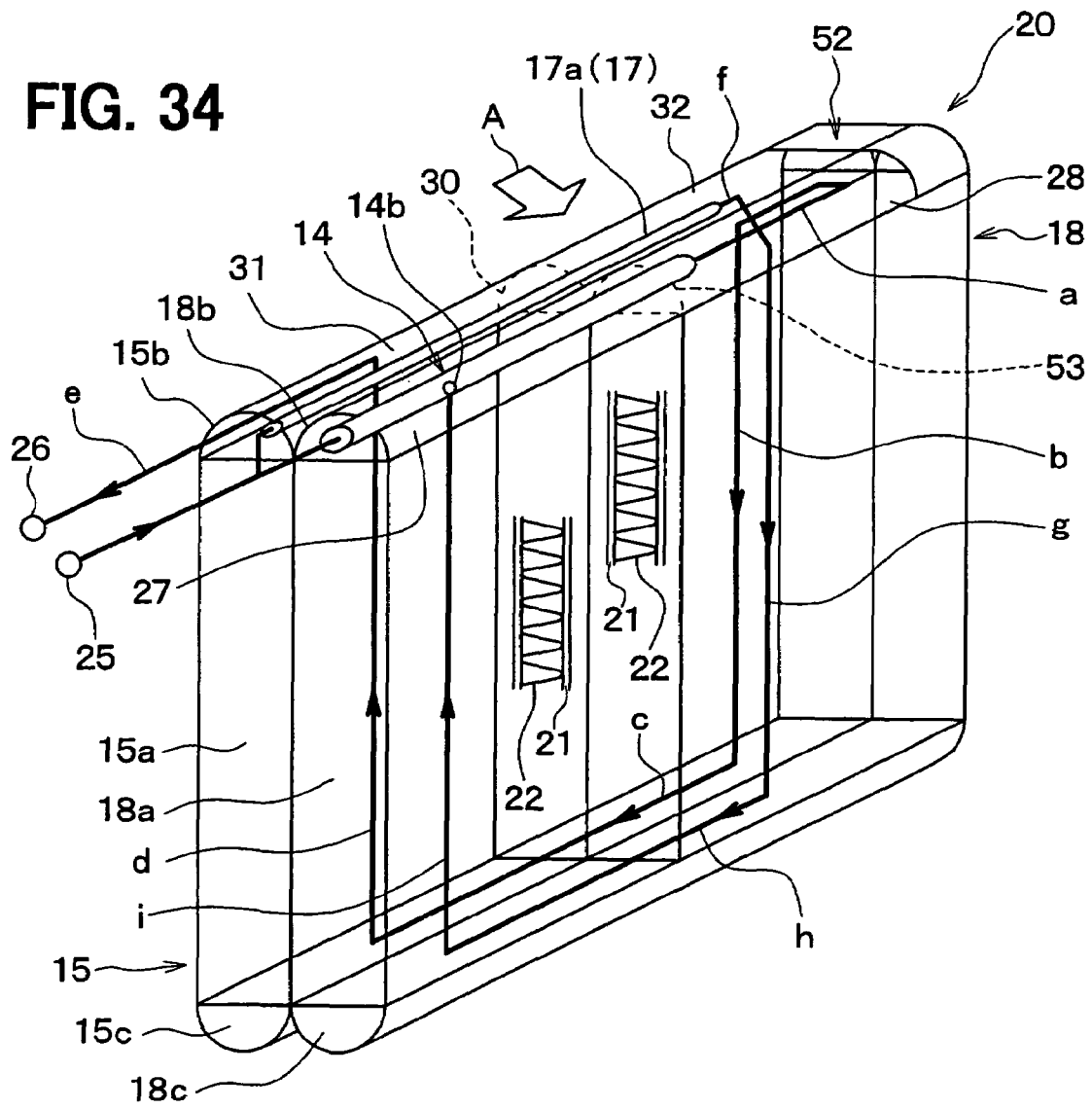
FIG. 34 is a perspective view to show the schematic construction of an integrated unit according to an 18th embodiment.
Figure 35:
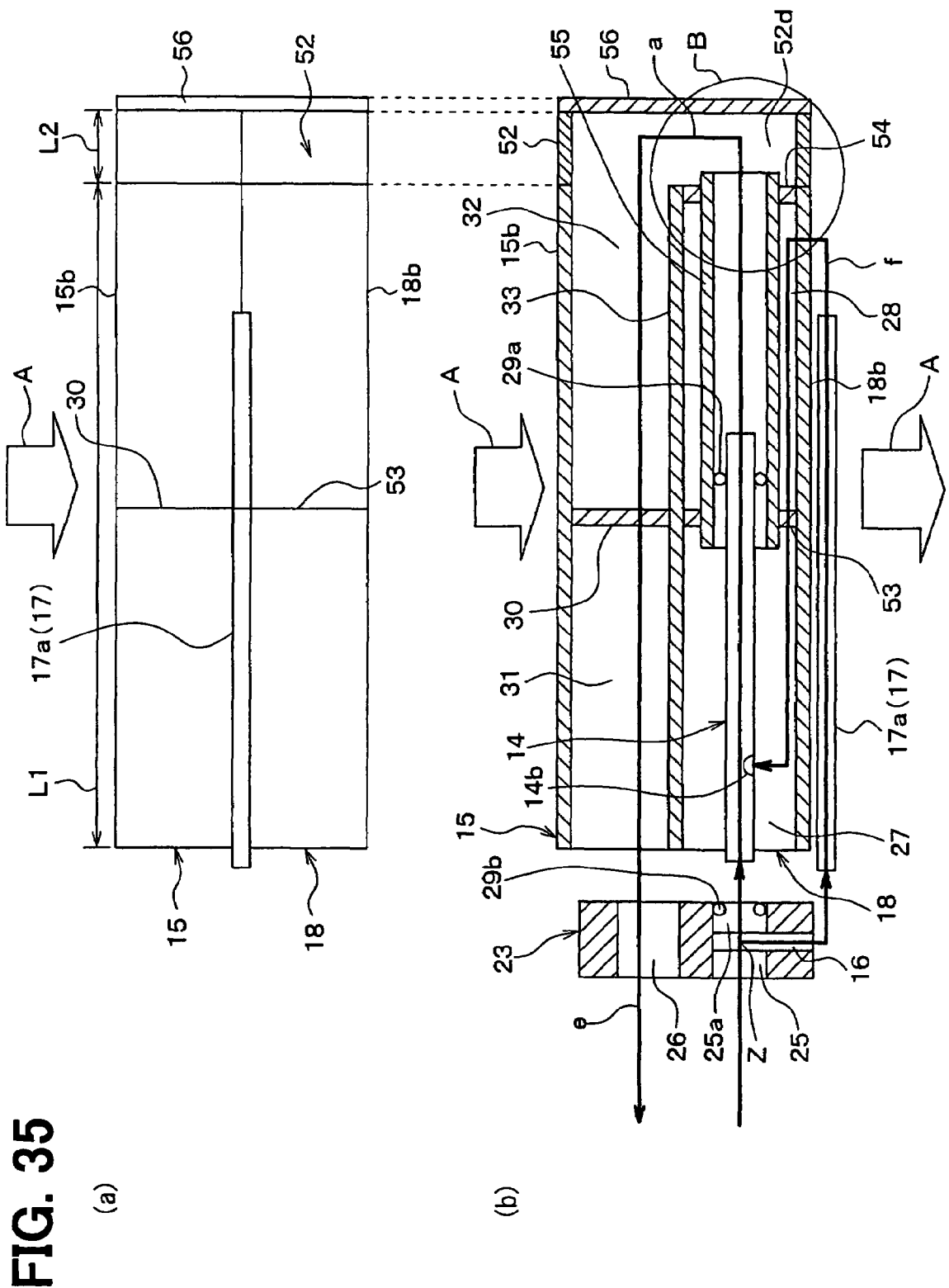
FIG. 35(a) is a top view of an evaporator tank of the integrated unit in FIG. 34.
FIG. 35(b) is a longitudinal sectional view of the evaporator tank of the integrated unit in FIG. 34.
Figure 36:
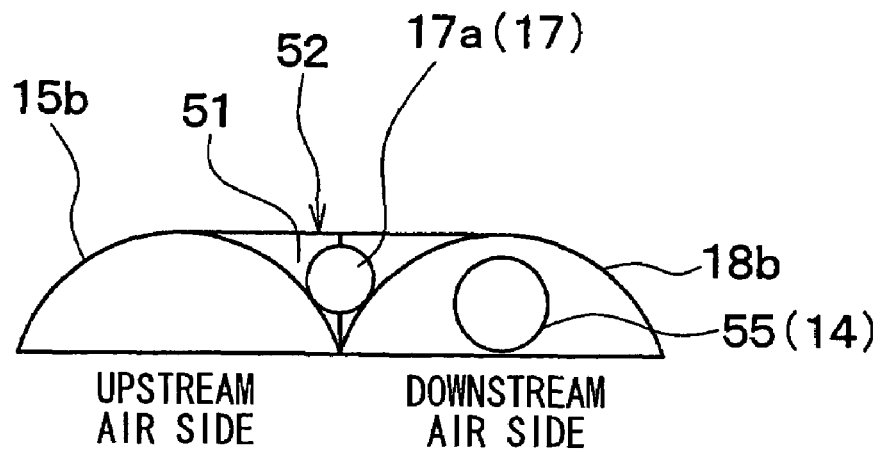
FIG. 36 is a lateral sectional view of the evaporator tank of the integrated unit in FIG. 34.
Figure 37:
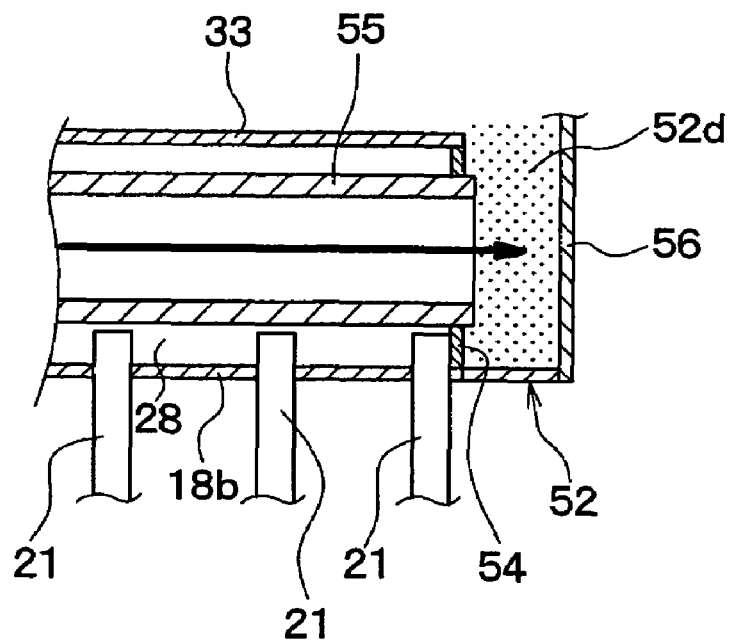
FIG. 37 is an enlarged sectional view of a portion B in FIG. 35(b).
Figure 38:
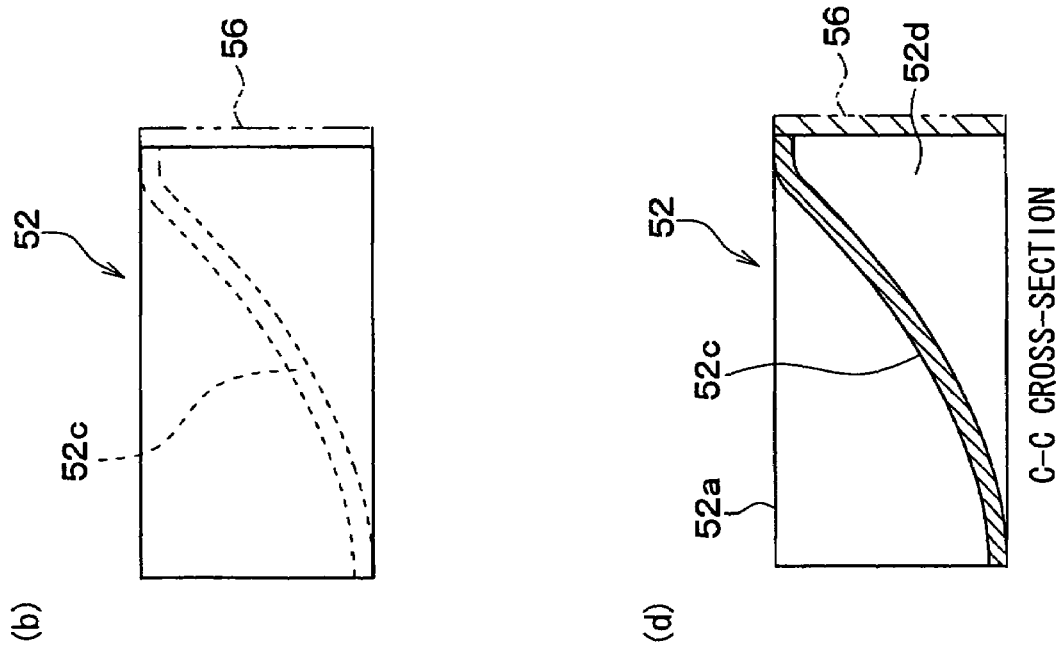
FIG. 38(a) is a perspective view of a sub-tank part according to an 18th embodiment.
FIG. 38(b) is a side view of the sub-tank part according to the 18th embodiment.
FIG. 38(c) is a front view of the sub-tank part according to the 18th embodiment.
FIG. 38(d) is a sectional view along a line C-C of FIG. 38(c).
Figure 38:
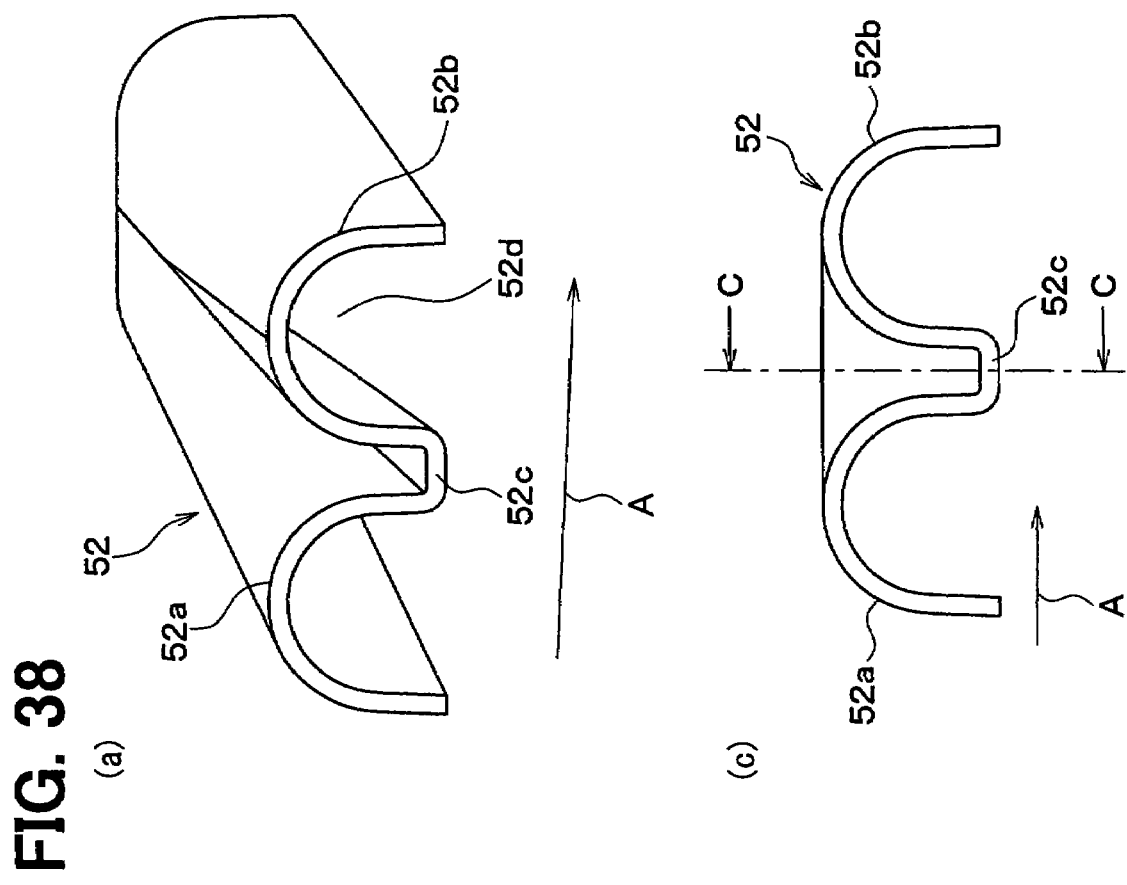
Figure 39:
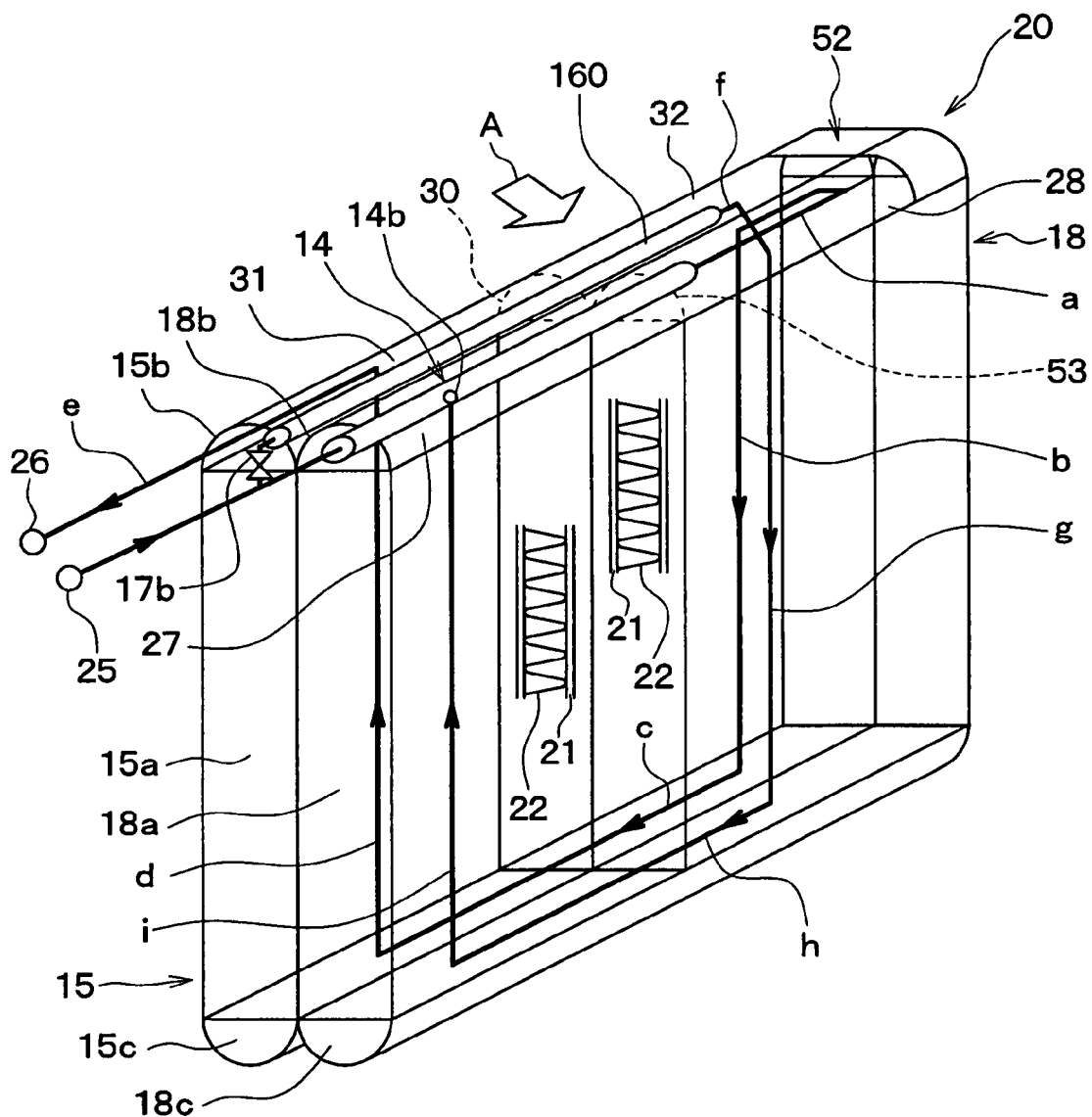
FIG. 39 is a perspective view to show the schematic construction of an integrated unit according to a 19th embodiment.
Figure 40:
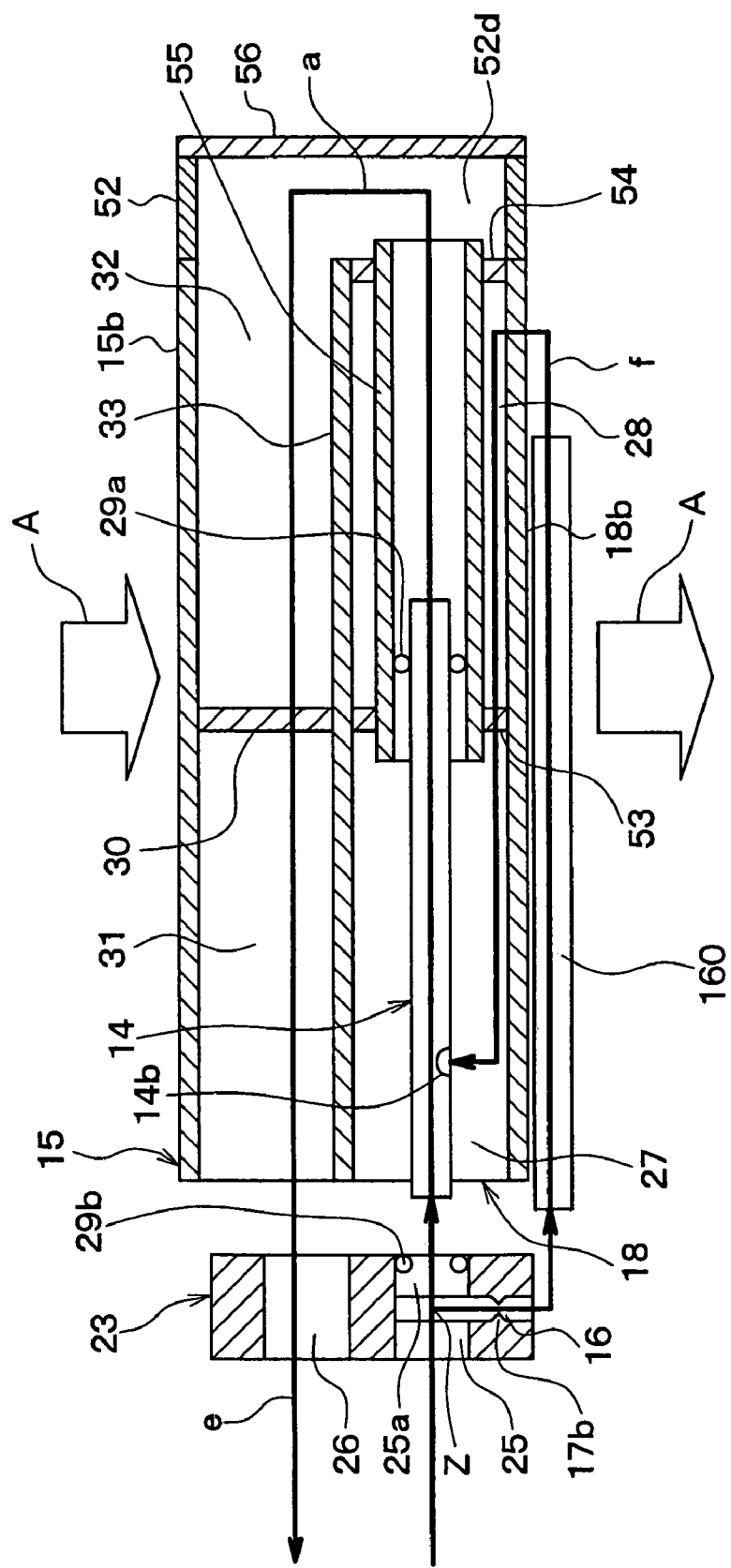
FIG. 40 is a longitudinal sectional view of an evaporator tank of the integrated unit in FIG. 39.
Figure 41:
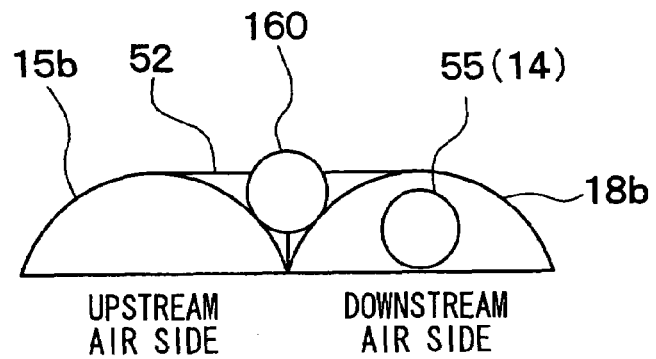
FIG. 41 is a lateral sectional view of the evaporator tank of the integrated unit in FIG. 39.
Figure 42:
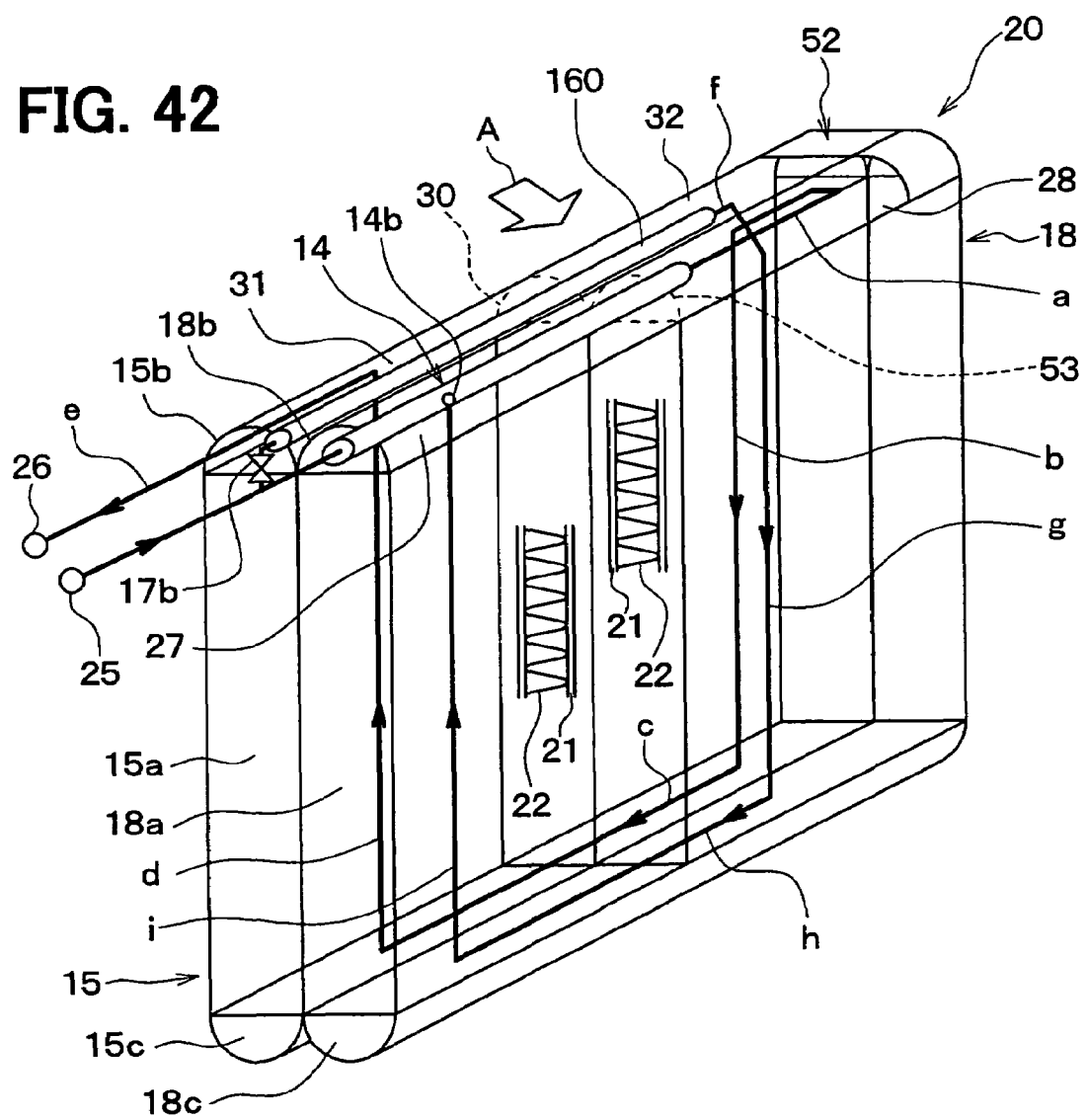
FIG. 42 is a perspective view to show the schematic construction of an integrated unit according to a 20th embodiment.
Figure 43:
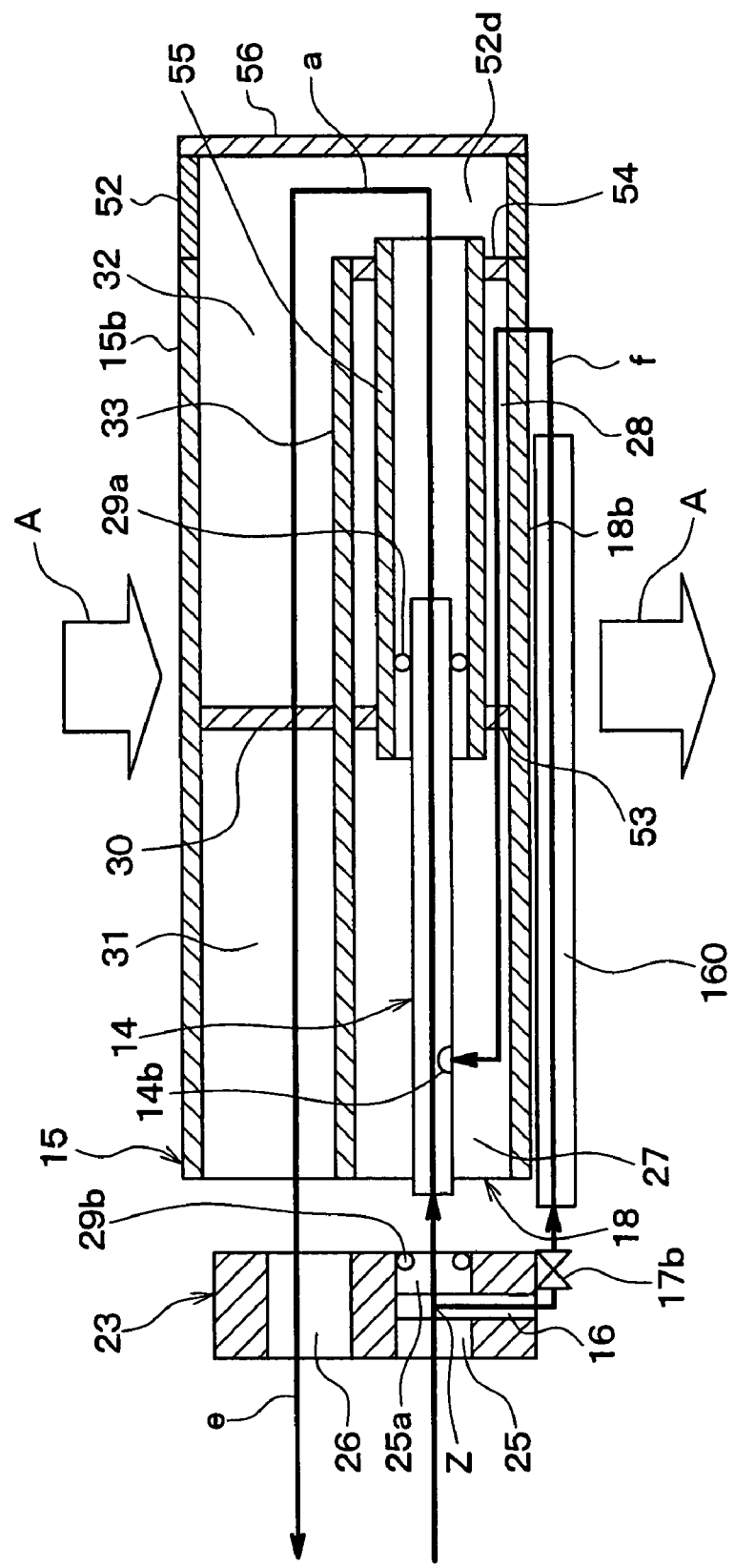
FIG. 43 is a longitudinal sectional view of an evaporator tank of the integrated unit in FIG. 42.
Figure 44:
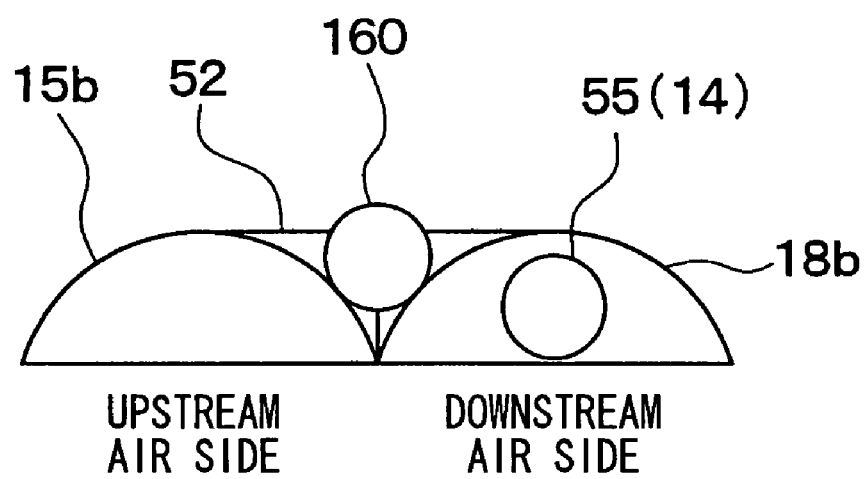
FIG. 44 is a lateral sectional view of the evaporator tank of the integrated unit in FIG. 42.

The invention claimed is:

1. A unit for an ejector type refrigeration cycle, comprising:
an ejector that has a nozzle part for decompressing refrigerant and a refrigerant suction port from which refrigerant is drawn by a high-velocity flow of refrigerant jetted from the nozzle part, wherein the ejector mixes the refrigerant jetted from the nozzle part and the refrigerant drawn from the refrigerant suction port, and discharges the mixed refrigerant; and
an evaporator that evaporates the refrigerant to be drawn by the ejector or the refrigerant discharged from the ejector,
wherein the evaporator is assembled integrally with the ejector to construct an integrated member; and
wherein the evaporator includes a heat exchanging core portion having a plurality of refrigerant passages in which refrigerant flows to perform heat exchange with air passing therethrough, and a tank for distributing refrigerant to or for collecting refrigerant from the plurality of refrigerant passages, and
wherein the ejector is arranged in the tank of the evaporator in the integrated member.

2. The unit for an ejector type refrigeration cycle as in claim 1, wherein the evaporator of the integrated member is an evaporator connected to the refrigerant suction port of the ejector and for evaporating the refrigerant to be drawn into the refrigerant suction port.

3. The unit for an ejector type refrigeration cycle as in claim 2, further comprising
a throttle mechanism, arranged on an inlet side of a refrigerant flow of the evaporator connected to the refrigerant suction port of the ejector, for reducing pressure of the refrigerant flow,
wherein the throttle mechanism is assembled in the integrated member.

4. The unit for an ejector type refrigeration cycle as in claim 3,
wherein the integrated member has one refrigerant inlet from which refrigerant is introduced, and one refrigerant outlet from which refrigerant is discharged, and
wherein the refrigerant inlet is branched into a first passage connected to an inlet side of the nozzle part of the ejector and a second passage connected to an inlet side of the throttle mechanism.

5. The unit for an ejector type refrigeration cycle as in claim 3,
wherein the throttle mechanism is arranged in the tank of the evaporator of the integrated member.

6. The unit for an ejector type refrigeration cycle as in claim 3,
wherein the ejector and the throttle mechanism are arranged in one tank among the plurality of tanks.

7. The unit for an ejector type refrigeration cycle as in claim 3,
wherein the throttle mechanism is arranged outside of the tank.

8. The unit for an ejector type refrigeration cycle as in claim 3, wherein the throttle mechanism is a capillary tube.

9. The unit for an ejector type refrigeration cycle as in claim 3, wherein the throttle mechanism is a fixed throttle hole.

10. The unit for an ejector type refrigeration cycle as in claim 1, wherein the evaporator of the integrated member includes a first evaporator connected to an outlet side of the ejector and for evaporating the refrigerant discharged from the ejector, the evaporator of the integrated member further comprising
a second evaporator connected to the refrigerant suction port of the ejector.

11. The unit for an ejector type refrigeration cycle as in claim 10,
wherein the tank includes a tank of the first evaporator and a tank of the second evaporator for distributing refrigerant to or for collecting refrigerant from the plurality of refrigerant passages,
wherein the ejector is arranged in an inside space of the tank of the second evaporator which constructs an outlet portion of the refrigerant passages,
wherein the integrated member includes a connection bock for fixing a portion adjacent to a refrigerant outlet portion of the ejector, and the connection block is arranged in an inside space of the tank of the second evaporator,
wherein the connection block has a connection hole communicating with a refrigerant outlet portion of the ejector formed therein, and
wherein the communication hole communicates with an inside space constructing an inlet portion of a refrigerant passage of the first evaporator, in the tank of the first evaporator.

12. The unit for an ejector type refrigeration cycle as in claim 10,
wherein the tank includes a tank of the first evaporator and a tank of the second evaporator for distributing refrigerant to or for collecting refrigerant from the plurality of refrigerant passages,
wherein the ejector is arranged in an inside space of the tank of the second evaporator which constructs an outlet portion of a refrigerant passage of the second evaporator,
wherein the integrated member has a communication space that is separated from the refrigerant passage of the second evaporator and is partitioned off at an end portion opposite to the inside space where the ejector is arranged, and
wherein the ejector has a refrigerant outlet side passage that communicates with an inside space of the tank of the first evaporator which constructs an inlet portion of a refrigerant passage of the first evaporator, via the communication space.

13. The unit for an ejector type refrigeration cycle as in claim 1, wherein the integrated member has one refrigerant inlet from which refrigerant is introduced, and one refrigerant outlet from which refrigerant is discharged.

14. The unit for an ejector type refrigeration cycle as in claim 13, wherein the integrated member includes a connection block in which the refrigerant inlet and the refrigerant outlet are provided.

15. The unit for an ejector type refrigeration cycle as in claim 1, wherein
the ejector includes a mixing part for mixing refrigerant jetted from the nozzle part and having a high velocity with refrigerant drawn into the refrigerant suction port, and a pressure increasing part for converting velocity energy of the refrigerant mixed in the mixing part to pressure energy.

16. An ejector type refrigeration cycle including the unit according to claim 1, comprising:
a compressor that sucks and compresses refrigerant from the evaporator; and
a radiator for radiating high-pressure refrigerant discharged from the compressor.

17. A unit for an ejector type refrigeration cycle, comprising:
an ejector that has a nozzle part for decompressing refrigerant and a refrigerant suction port from which refrigerant is drawn by a high-velocity flow of refrigerant jetted from the nozzle part, wherein the ejector mixes the refrigerant jetted from the nozzle part and the refrigerant drawn from the refrigerant suction port, and discharges the mixed refrigerant;
a first evaporator connected to an outlet side of the ejector and for evaporating the refrigerant discharged from the ejector; and
a second evaporator connected to the refrigerant suction port of the ejector,
wherein the second evaporator is assembled integrally with the ejector to construct an integrated member, and
wherein the first evaporator is arranged on an upstream side of the second evaporator in an air flow direction.

18. The unit for an ejector type refrigeration cycle as in claim 17, wherein
the second evaporator includes a heat exchanging core portion having a plurality of refrigerant passages in which refrigerant flows to perform heat exchange with air passing therethrough, and a tank for distributing refrigerant to or for collecting refrigerant from the plurality of refrigerant passages, and
wherein the tank at one side of the plurality of refrigerant passages has a first space part for collecting the refrigerant from the refrigerant passages and a second space part for distributing the refrigerant into the refrigerant passages, and
wherein the refrigerant suction port of the ejector is located in the first space part of the tank to communicate with the first space part.

19. A unit for an ejector type refrigeration cycle, comprising:
an ejector that has a nozzle part for decompressing refrigerant and a refrigerant suction port from which refrigerant is drawn by a high-velocity flow of refrigerant jetted from the nozzle part, wherein the ejector mixes the refrigerant jetted from the nozzle part and the refrigerant drawn from the refrigerant suction port, and discharges the mixed refrigerant; and
an evaporator that evaporates the refrigerant to be drawn by the ejector or the refrigerant discharged from the ejector, wherein the evaporator is assembled integrally with the ejector to construct an integrated member,
wherein the evaporator includes a heat exchanging core portion having a plurality of refrigerant passages in which refrigerant flows to perform heat exchange with air passing therethrough, and a tank for distributing refrigerant to or for collecting refrigerant from the plurality of refrigerant passages, and
wherein the ejector is arranged substantially in parallel with a longitudinal direction of the tank of the evaporator.

20. The unit for an ejector type refrigeration cycle as in claim 19,
wherein the ejector is disposed within the tank of the evaporator.

21. The unit for an ejector type refrigeration cycle as in claim 19,
wherein the tank at one side of the plurality of refrigerant passages has a first space part for collecting the refrigerant from the refrigerant passages and a second space part for distributing the refrigerant into the refrigerant passages, and
wherein the refrigerant suction port of the ejector is located in the first space part of the tank to communicate with the first space part.

22. A unit for an ejector type refrigeration cycle comprising
an ejector that has a nozzle part for decompressing refrigerant and a refrigerant suction port from which refrigerant is drawn by a high-velocity flow of refrigerant jetted from the nozzle part, wherein the ejector mixes the refrigerant jetted from the nozzle part and the refrigerant drawn from the refrigerant suction port, and discharges the mixed refrigerant; and
an evaporator that evaporates the refrigerant to be drawn by the ejector or the refrigerant discharged from the ejector, wherein the evaporator is assembled integrally with the ejector to construct an integrated member,
a separate tank part for mounting the ejector,
wherein the ejector is located in the separate tank part; and
wherein the suction port of the ejector is located in the separate tank part.

23. The unit for an ejector type refrigeration cycle as in claim 22, wherein
the evaporator includes a heat exchanging core portion having a plurality of refrigerant passages in which refrigerant flows to perform heat exchange with air passing therethrough, and a tank for distributing refrigerant to or for collecting refrigerant from the plurality of refrigerant passages, and
the separate tank part is separated from the tank to the evaporator, and communicates with the tank of the evaporator via a through hole.

24. The unit for an ejector type refrigeration cycle as in claim 22,
wherein the evaporator is a suction side evaporator that is connected to the refrigerant suction port of the ejector and is configured to evaporate the refrigerant to be drawn to the refrigerant suction port,
wherein the suction side evaporator includes a heat exchange core portion having the plurality of refrigerant passages through which the refrigerant to be drawn to the refrigerant suction port passes, and a tank having an inner space positioned at a refrigerant outlet side of the refrigerant passages of the heat exchange core portion, and wherein the through hole is a hole through which the inner space of the tank communicates with the refrigerant suction port of the ejector.

25. The unit for an ejector type refrigeration cycle according to claim 22,
wherein the evaporator is a discharge side evaporator that is connected to a refrigerant outlet side of the ejector and is configured to evaporate the refrigerant flowing out of the ejector,
wherein the discharge side evaporator includes a heat exchange core portion having the plurality of refrigerant passages through which the refrigerant discharged from the ejector passes, and a tank having an inner space positioned at a refrigerant inlet side of the refrigerant passages of the heat exchange core portion, and
wherein the through hole is a hole through which the inner space of the tank communicates with the refrigerant outlet side of the ejector.

26. The unit for an ejector type refrigeration cycle according to claim 22,
wherein the evaporator includes a discharge side evaporator that is connected to a refrigerant outlet side of the ejector and is configured to evaporate the refrigerant flowing out of the ejector, and a suction side evaporator that is connected to the refrigerant suction port of the ejector and is configured to evaporate the refrigerant to be drawn to the refrigerant suction port,
wherein the discharge side evaporator includes a heat exchange core portion having the plurality of refrigerant passages through which the refrigerant discharged from the ejector passes,
wherein the suction side evaporator includes a heat exchange core portion having the plurality of refrigerant passages through which the refrigerant to be drawn to the refrigerant suction port passes,
wherein the tank of the discharge side evaporator has an inner space positioned at a refrigerant inlet side of the refrigerant passages of the heat exchange core portion of the discharge side evaporator, and the tank of the suction side evaporator has an inner space positioned at a refrigerant outlet side of the refrigerant passages of the heat exchange core portion of the suction side evaporator, and
wherein the through hole includes a first through hole through which the inner space of the tank of the discharge side evaporator communicates with the refrigerant discharge side of the ejector, and a second through hole through which the inner space of the tank of the suction side evaporator communicates with the refrigerant suction port of the ejector.

27. The unit for an ejector type refrigeration cycle as in claim 26,
wherein the discharge side evaporator includes a heat exchange core portion having the plurality of refrigerant passages through which the refrigerant discharged from the ejector passes, and a tank for distributing the refrigerant into the plurality of refrigerant passages of the heat exchange core portion of the discharge side evaporator and for collecting the refrigerant from the plurality of refrigerant passages of the heat exchange core portion of the discharge side evaporator,
wherein the suction side evaporator includes a heat exchange core portion having the plurality of refrigerant passages through which the refrigerant to be drawn to the refrigerant suction port passes, and a tank for distributing the refrigerant into the plurality of refrigerant passages of the heat exchange core portion of the suction side evaporator and for collecting the refrigerant from the plurality of refrigerant passages of the heat exchange core portion of the suction side evaporator,
wherein the separate tank part is inserted between the tank of the discharge side evaporator and the tank of the suction side evaporator which are adjacent each other, and the separate tank part extends in a tank longitudinal direction of the tanks of the suction and discharge side evaporators, and
wherein the ejector is located in the separate tank part of the evaporator.

28. The unit for an ejector type refrigeration cycle as in claim 22,
wherein the evaporator includes a plurality of refrigerant passages, a tank for distributing the refrigerant into the plurality of refrigerant passages and for collecting the refrigerant from the plurality of refrigerant passages,
wherein the separate tank part is separated from the tank,
wherein the separate tank part extends in a tank longitudinal direction of the tank and is recessed into an inner side of the tank, and
wherein the ejector is located in the separate tank part of the evaporator so as to configure an integrated member of the ejector and the evaporator.

29. The unit for an ejector type refrigeration cycle as in claim 22,
wherein the evaporator includes a plurality of refrigerant passages, a tank for distributing the refrigerant into the plurality of refrigerant passages and for collecting the refrigerant from the plurality of refrigerant passages,
wherein the separate tank part is separated from the tank,
wherein the separate tank part extends in a tank longitudinal direction of the tank, and is overlapped with the tank in a flow direction of air, and
wherein the ejector is located in the separate tank part of the evaporator so as to configure an integrated member of the ejector and the evaporator.

30. The unit for an ejector type refrigeration cycle as in claim 22,
wherein the evaporator includes a plurality of refrigerant passages, a tank for distributing the refrigerant into the plurality of refrigerant passages and for collecting the refrigerant from the plurality of refrigerant passages,
wherein the separate tank part is separated from the tank,
wherein the ejector is located in the separate tank part of the evaporator so as to configure an integrated member of the ejector and the evaporator, and
wherein the separate tank part extends in a tank longitudinal direction of the tank and is located to form a tank space together with the tank.

31. The unit for an ejector type refrigeration cycle as in claim 22,
wherein the separate tank part has substantially a circular shape in cross section.

32. A unit for an ejector type refrigeration cycle, comprising:
an ejector that has a nozzle part for decompressing refrigerant and a refrigerant suction port from which refrigerant is drawn by a high-velocity flow of refrigerant jetted from the nozzle part, wherein the ejector mixes the refrigerant jetted from the nozzle part and the refrigerant drawn from the refrigerant suction port, and discharges the mixed refrigerant;
a first evaporator that is connected to an outlet side of the ejector and evaporates the refrigerant discharged from the ejector;

a second evaporator that is connected to the refrigerant suction port of the ejector and evaporates the refrigerant to be drawn by the ejector; and a capillary tube located at an inlet side of the second evaporator in a refrigerant flow direction, and decompresses the refrigerant flow, wherein the first evaporator, the second evaporator, the ejector and the capillary tube are assembled integrally with each other to construct an integrated member, wherein the first evaporator and the second evaporator each have a tank for distributing refrigerant to or for collecting refrigerant from a plurality of refrigerant passages, wherein the tank of the first evaporator and the tank of the second evaporator are arranged adjacent each other in an air flow direction to form a valley portion between the tank of the first evaporator and the tank of the second evaporator, and wherein the capillary tube is disposed in the valley portion and is fixed to an outer surface of the tanks.

33. A unit for an ejector type refrigeration cycle, comprising:

an ejector that has a nozzle part for decompressing refrigerant and a refrigerant suction port from which refrigerant is drawn by a high-velocity flow of refrigerant jetted from the nozzle part, wherein the ejector mixes the refrigerant jetted from the nozzle part and the refrigerant drawn from the refrigerant suction port, and discharges the mixed refrigerant; and an evaporator that evaporates the refrigerant to be drawn by the ejector or the refrigerant discharged from the ejector, a throttle mechanism, arranged on an inlet side of a refrigerant flow of the evaporator connected to the refrigerant suction port of the ejector, for reducing pressure of the refrigerant flow, wherein the evaporator is assembled integrally with the ejector to construct an integrated member, wherein the evaporator of the integrated member is an evaporator connected to the refrigerant suction port of the ejector and for evaporating the refrigerant to be drawn into the refrigerant suction port, wherein the throttle mechanism is assembled in the integrated member, wherein the integrated member has one refrigerant inlet from which refrigerant is introduced, and one refrigerant outlet from which refrigerant is discharged, and wherein the refrigerant inlet is branched into a first passage connected to an inlet side of the nozzle part of the ejector and a second passage connected to an inlet side of the throttle mechanism.

34. A unit for an ejector type refrigeration cycle, comprising:

an ejector that has a nozzle part for decompressing refrigerant and a refrigerant suction port from which refrigerant is drawn by a high-velocity flow of refrigerant jetted from the nozzle part, wherein the ejector mixes the refrigerant jetted from the nozzle part and the refrigerant drawn from the refrigerant suction port, and discharges the mixed refrigerant; and an evaporator that evaporates the refrigerant to be drawn by the ejector or the refrigerant discharged from the ejector, wherein the evaporator is assembled integrally with the ejector to construct an integrated member, wherein the evaporator of the integrated member is an evaporator connected to the refrigerant suction port of the ejector and for evaporating the refrigerant to be drawn into the refrigerant suction port, wherein the integrated member has one refrigerant inlet from which refrigerant is introduced, and one refrigerant outlet from which refrigerant is discharged, and wherein the refrigerant inlet is provided to be branched into a first passage connected to an inlet side of the nozzle part of the ejector and a second passage connected to an inlet side of the throttle mechanism.

35. A unit for an ejector type refrigeration cycle, comprising:

an ejector that has a nozzle part for decompressing refrigerant and a refrigerant suction port from which refrigerant is drawn by a high-velocity flow of refrigerant jetted from the nozzle part, wherein the ejector mixes the refrigerant jetted from the nozzle part and the refrigerant drawn from the refrigerant suction port, and discharges the mixed refrigerant;

a first evaporator connected to an outlet side of the ejector and for evaporating the refrigerant discharged from the ejector, a second evaporator connected to the refrigerant suction port of the ejector, wherein the first evaporator includes a heat exchange core portion having the plurality of refrigerant passages through which the refrigerant discharged from the ejector passes, and a tank for distributing the refrigerant into the plurality of refrigerant passages of the heat exchange core portion of the first evaporator and for collecting the refrigerant from the plurality of refrigerant passages of the heat exchange core portion of the first evaporator, wherein the second evaporator includes a heat exchange core portion having the plurality of refrigerant passages through which the refrigerant to be drawn to the refrigerant suction port passes, and a tank for distributing the refrigerant into the plurality of refrigerant passages of the heat exchange core portion of the second evaporator and for collecting the refrigerant from the plurality of refrigerant passages of the heat exchange core portion of the second evaporator, wherein the tank of the first evaporator and the tank of the second evaporator are arranged adjacent each other in an air flow direction, wherein the ejector extends in a direction parallel with a longitudinal direction of the tank of the first evaporator and a longitudinal direction of the tank of the second evaporator, and contacts both the tank of the first evaporator and the tank of the second evaporator.

36. A unit for an ejector type refrigeration cycle, comprising:

an ejector that has a nozzle part for decompressing refrigerant and a refrigerant suction port from which refrigerant is drawn by a high-velocity flow of refrigerant jetted from the nozzle part, wherein the ejector mixes the refrigerant jetted from the nozzle part and the refrigerant drawn from the refrigerant suction port, and discharges the mixed refrigerant; and an evaporator that evaporates the refrigerant to be drawn by the ejector or the refrigerant discharged from the ejector, wherein the evaporator is assembled integrally with the ejector to construct an integrated member, wherein the evaporator includes a heat exchanging core portion having a plurality of refrigerant passages in which refrigerant flows to perform heat exchange with air passing therethrough, and a tank for distributing refrigerant to or for collecting refrigerant from the plurality of refrigerant passages, wherein the heat exchanging core portion includes an upwind surface positioned at an upwind side, a downwind surface positioned at a downwind side, and a side surface perpendicular to the upwind surface and the downwind surface, and wherein the ejector is enlarged in a direction parallel to a longitudinal direction of the side surface.

37. The unit for an ejector type refrigeration cycle as in claim 36, wherein the evaporator is connected to a refrigerant outlet side of the ejector and is configured to evaporate the refrigerant flowing out of the ejector, wherein the evaporator includes a heat exchange core portion having the plurality of refrigerant passages through which the refrigerant discharged from the ejector passes, and a tank for distributing the refrigerant into the plurality of refrigerant passages of the heat exchange core portion and for collecting the refrigerant from the plurality of refrigerant passages of the heat exchange core portion, wherein the longitudinal direction of the ejector extends at a side surface of the heat exchanging core portion in a top-bottom direction such that the outlet side of the ejector is positioned at an upper side of the refrigerant suction port, and wherein the outlet side of the ejector communicates with a distribution inner space within the tank of the evaporator, for distributing the refrigerant to the refrigerant passages.

38. The unit for an ejector type refrigeration cycle as in claim 37, wherein the tank has therein a collection inner space for collecting the refrigerant from the refrigerant passage, and the distribution inner space is positioned near the ejector than the collection inner space.

39. The unit for an ejector type refrigeration cycle as in claim 36, the evaporator is connected to the refrigerant suction port of the ejector and is configured to evaporate the refrigerant to be drawn to the refrigerant suction port, wherein the evaporator includes a heat exchange core portion having the plurality of refrigerant passages through which the refrigerant to be drawn to the refrigerant suction port passes, and a tank for distributing the refrigerant into the plurality of refrigerant passages of the heat exchange core portion and for collecting the refrigerant from the plurality of refrigerant passages of the heat exchange core portion, wherein the longitudinal direction of the ejector extends at a side surface of the heat exchanging core portion in a top-bottom direction such that the outlet side of the ejector is positioned at an upper side of the refrigerant suction port, and wherein the refrigerant suction side of the ejector communicates with a collection inner space within the tank of the evaporator, for collecting the refrigerant from the refrigerant passages.

40. The unit for an ejector type refrigeration cycle as in claim 39, wherein the tank has therein a distribution inner space for distributing the refrigerant into the refrigerant passages, and the collection inner space is positioned near the ejector than the distribution inner space.

41. A unit for an ejector type refrigeration cycle, comprising:

an ejector that has a nozzle part for decompressing refrigerant and a refrigerant suction port from which refrigerant is drawn by a high-velocity flow of refrigerant jetted from the nozzle part, wherein the ejector mixes the refrigerant jetted from the nozzle part and the refrigerant drawn from the refrigerant suction port, and discharges the mixed refrigerant;

an evaporator that evaporates the refrigerant to be drawn by the ejector or the refrigerant discharged from the ejector, wherein the evaporator is assembled integrally with the ejector to construct an integrated member; and an external cassette part fixed externally to the evaporator of the integrated member, wherein the ejector is arranged in the external cassette part, wherein the evaporator includes a heat exchange core portion having a plurality of refrigerant passages through which the refrigerant flows, and a tank for distributing the refrigerant into the plurality of refrigerant passages of the heat exchange core portion and for collecting the refrigerant from the plurality of refrigerant passages of the heat exchange core portion, wherein the heat exchanging core portion includes an upwind surface positioned at an upwind side, a downwind surface positioned at a downwind side, and a side surface perpendicular to the upwind surface and the downwind surface, and wherein the external cassette part is attached to the side surface of the heat exchange core portion, and wherein the refrigerant suction port of the ejector is positioned inside the external cassette part.

42. The unit for an ejector type refrigeration cycle according to claim 41, wherein the external cassette part has a first communication hole communicating with the refrigerant suction port of the ejector, and a second communication hole communicating with the outlet side of the ejector, and wherein the first communication hole and the second communication hole are provided on a surface facing the side surface of the heat exchanging core portion.

* * * * *